(12) United States Patent
DeGroff et al.

(10) Patent No.: US 12,546,798 B2
(45) Date of Patent: Feb. 10, 2026

(54) SYSTEM FOR ENSURING FAILSAFE OPERATION OF PITOT TUBE COVERS FOR MULTIPLE TYPES OF PITOT TUBES

(71) Applicant: DeGroff Aviation Technologies, LLC, Berne, IN (US)

(72) Inventors: Steven A. DeGroff, Decatur, IN (US); Phillip R. Russell, Fort Wayne, IN (US); David J. Hockemeyer, Hoagland, IN (US)

(73) Assignee: DeGroff Aviation Technologies, LLC, Berne, IN (US)

( * ) Notice: Subject to any disclaimer, the term of this patent is extended or adjusted under 35 U.S.C. 154(b) by 253 days.

(21) Appl. No.: 18/213,503

(22) Filed: Jun. 23, 2023

(65) Prior Publication Data

US 2023/0333136 A1    Oct. 19, 2023

Related U.S. Application Data

(63) Continuation-in-part of application No. 17/179,774, filed on Feb. 19, 2021, now Pat. No. 11,740,257, which is a continuation-in-part of application No. 16/851,348, filed on Apr. 17, 2020, now Pat. No. 11,480,586.

(60) Provisional application No. 62/884,799, filed on Aug. 9, 2019, provisional application No. 62/862,873, filed on Jun. 18, 2019, provisional application No. 62/836,331, filed on Apr. 19, 2019.

(51) Int. Cl.
| | | |
|---|---|---|
| *G01P 1/02* | (2006.01) | |
| *B64D 45/00* | (2006.01) | |
| *B64F 1/00* | (2024.01) | |
| *G01F 1/46* | (2006.01) | |
| *G01P 5/165* | (2006.01) | |

(52) U.S. Cl.
CPC .............. *G01P 1/026* (2013.01); *B64D 45/00* (2013.01); *B64F 1/005* (2013.01); *G01F 1/46* (2013.01); *G01P 5/165* (2013.01)

(58) Field of Classification Search
CPC ......... G01P 1/026; G01P 5/165; B64D 45/00; B64F 1/005; G01F 1/46
See application file for complete search history.

(56) References Cited

U.S. PATENT DOCUMENTS

| | | |
|---|---|---|
| 2,488,310 A | 11/1949 | Mayer |
| 2,488,810 A | 11/1949 | Easterday |

(Continued)

FOREIGN PATENT DOCUMENTS

| | | |
|---|---|---|
| CN | 109100530 A | 12/2018 |
| CN | 110435906 A | 11/2019 |
| JP | H0599943 A  * | 4/1993 |

OTHER PUBLICATIONS

JP H0599943 A; English Translation (Year: 1993).*
(Continued)

*Primary Examiner* — Ryan D Walsh
(74) *Attorney, Agent, or Firm* — Innovation Law Office; Dennis S. Schell

(57) ABSTRACT

The present invention is a self-disengaging pitot tube cover which is constituted by at least two separable sections where separation of the sections is controlled by temperature sensing and effected by an SMA latch holding the sections together; so that the sections separate from the pitot tube when a particular temperature condition inside the pitot tube occurs.

23 Claims, 44 Drawing Sheets

(56) References Cited

U.S. PATENT DOCUMENTS

| | | |
|---|---|---|
| 2,532,316 A | 12/1950 | Larkin |
| 2,786,353 A | 3/1957 | Slabaugh |
| 3,106,374 A | 10/1963 | Olson et al. |
| 4,796,710 A | 1/1989 | Job |
| 5,026,001 A | 6/1991 | Burk et al. |
| 5,127,265 A | 7/1992 | Williamson et al. |
| D337,065 S | 7/1993 | Burk et al. |
| D361,730 S | 8/1995 | Burk |
| 5,926,091 A | 7/1999 | Svensson et al. |
| 5,938,147 A | 8/1999 | Degroff |
| 6,412,343 B1 | 7/2002 | Jefferson |
| 6,612,521 B1 | 9/2003 | Degroff |
| 6,901,793 B1 | 6/2005 | Jefferson |
| 8,132,471 B2 | 3/2012 | Degroff et al. |
| 8,636,240 B2 | 1/2014 | Jefferson et al. |
| 9,174,743 B2 * | 11/2015 | Dis .................... G01P 5/165 |
| 11,480,586 B2 | 10/2022 | Degroff et al. |
| 11,740,257 B2 | 8/2023 | Degroff et al. |
| 11,919,130 B2 | 3/2024 | Degroff et al. |
| 11,953,516 B2 | 4/2024 | DeGroff et al. |
| 12,066,456 B2 | 8/2024 | DeGroff et al. |
| 2019/0086438 A1 | 3/2019 | Conte et al. |

OTHER PUBLICATIONS

PCT International Searching Authority, International Search Report and Written Opinion for PCT/US2021/24591, dated Jun. 23, 2021, 7 pages.

DeGroff Aviation Technologies, Instructions for Proper Use of PitotShield Safety Pitot Cover, Feb. 25, 2002, 2 pages, DeGroff Aviation Technologies, Berne, Indiana.

DeGroff Aviation Technologies, PitotShield FAQ's, Jul. 18, 2002, 4 pages, DeGroff Aviation Technologies, Berne, Indiana.

DeGroff Aviation Technologies, PitotShields Fact Sheet, 2002, 3 pages, DeGroff Aviation Technologies, Berne, Indiana.

* cited by examiner

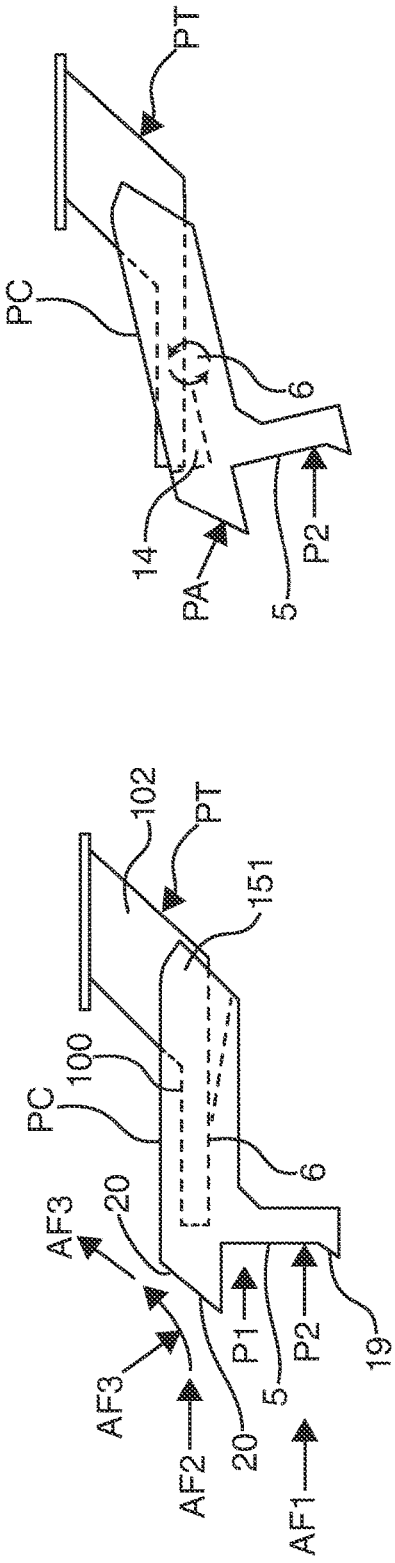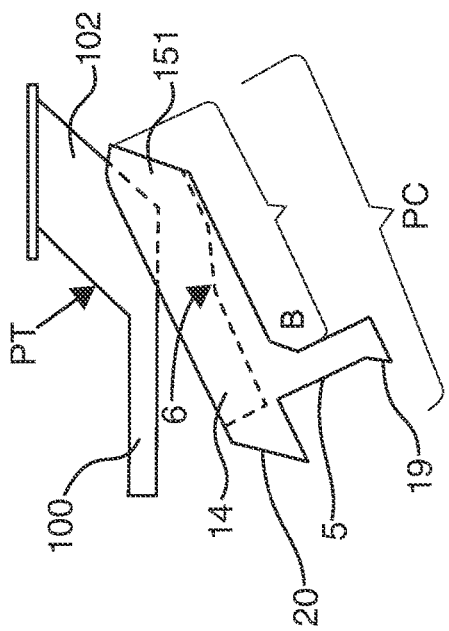

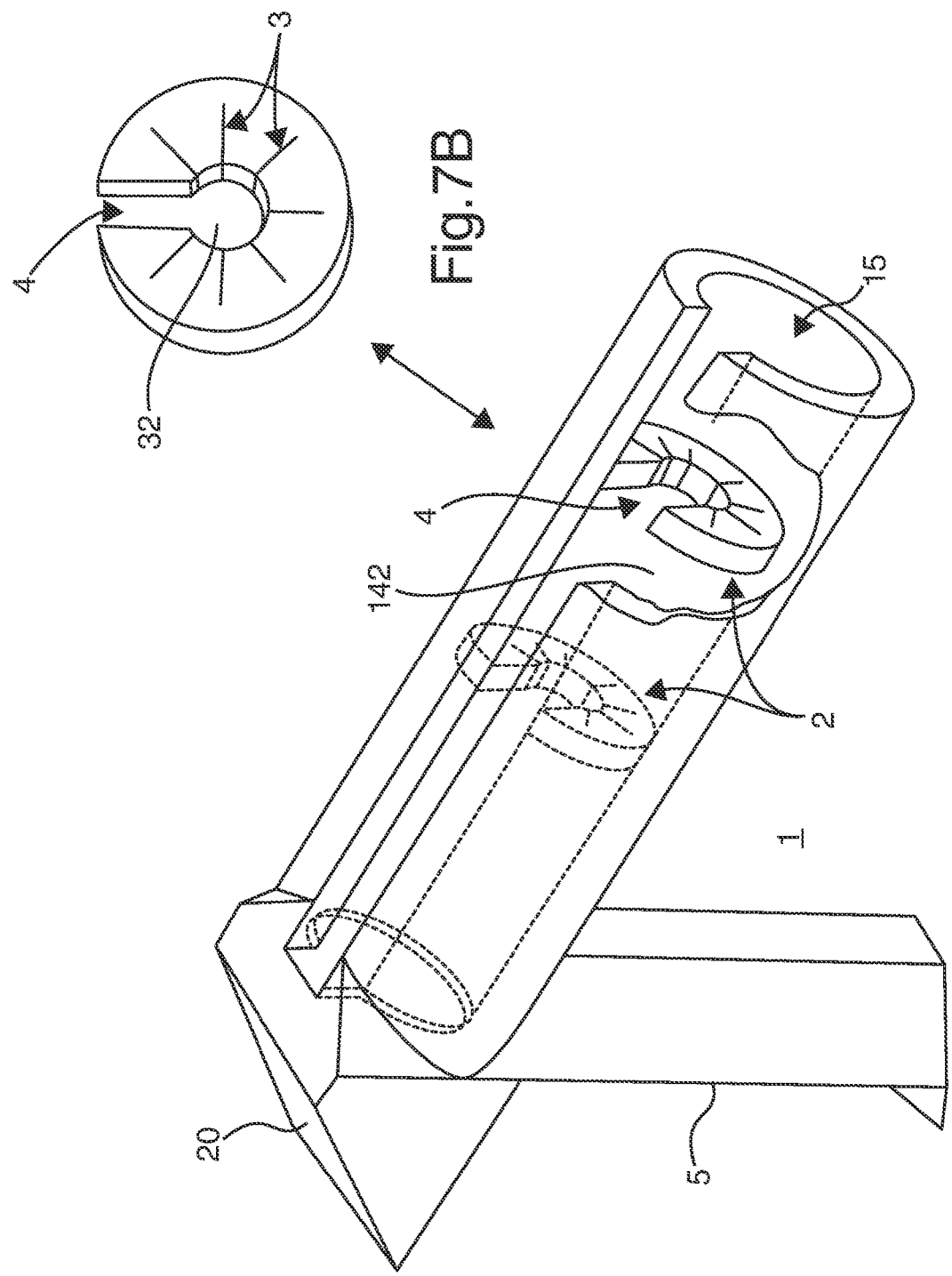

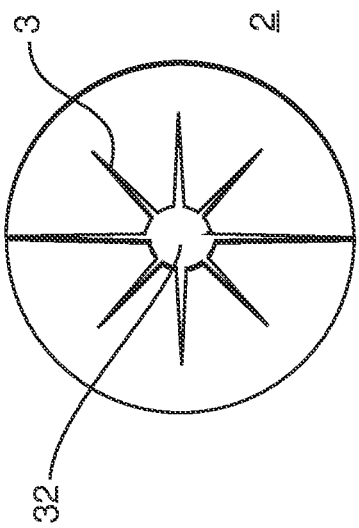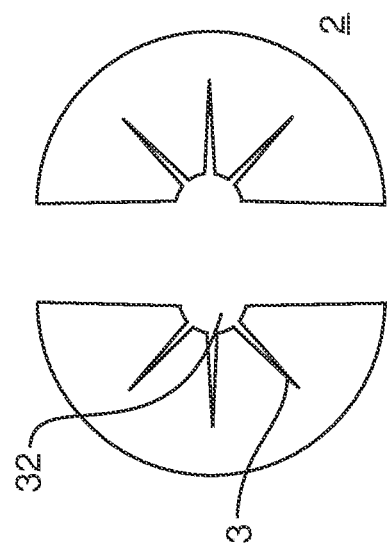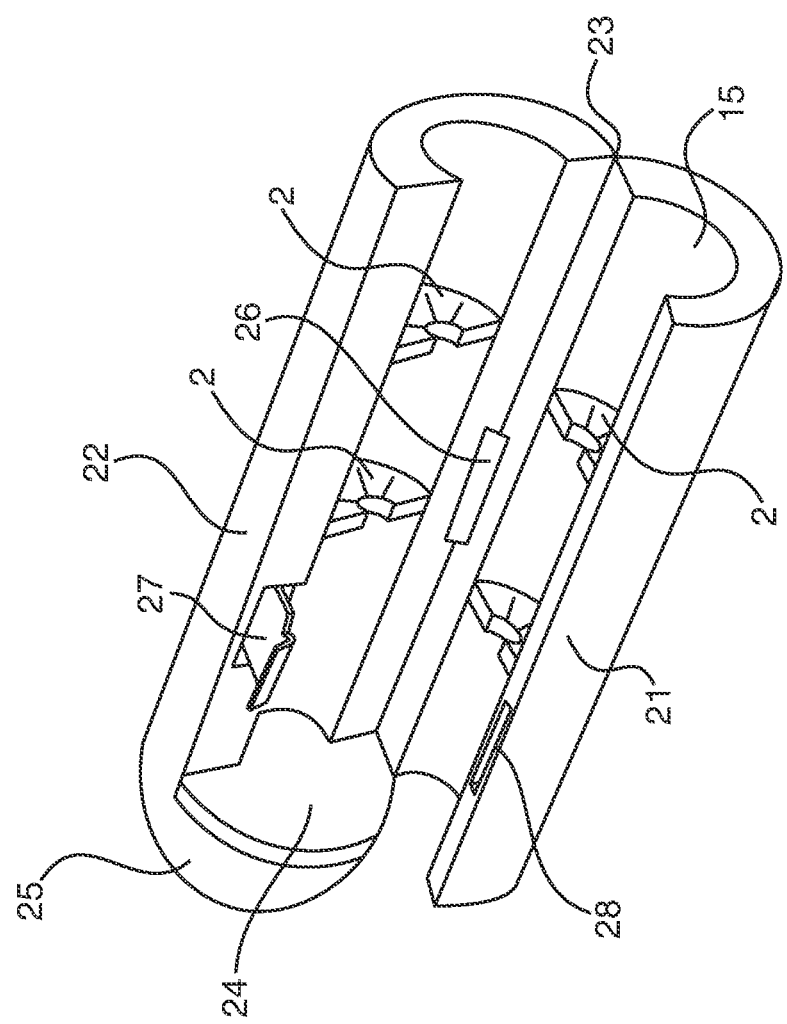

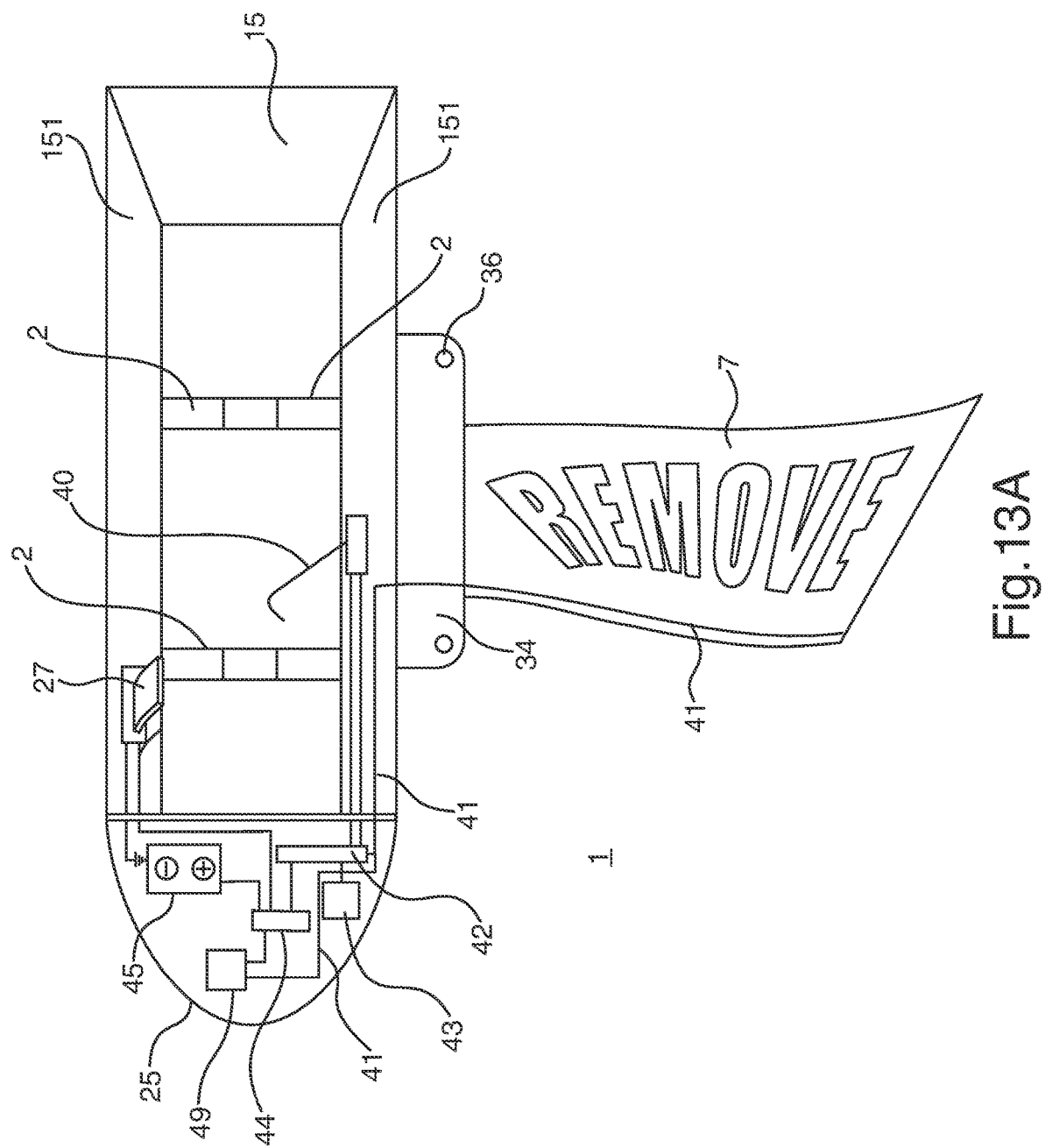

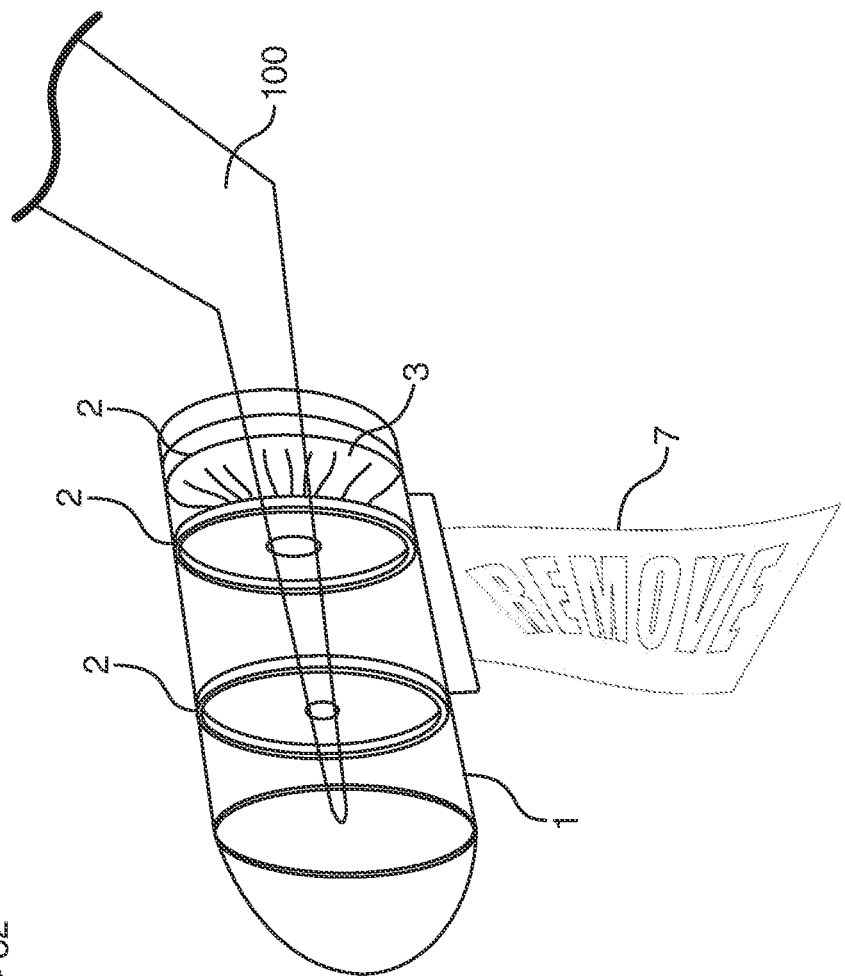
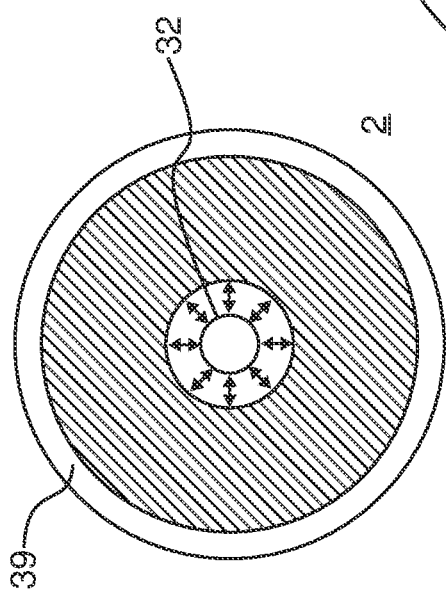
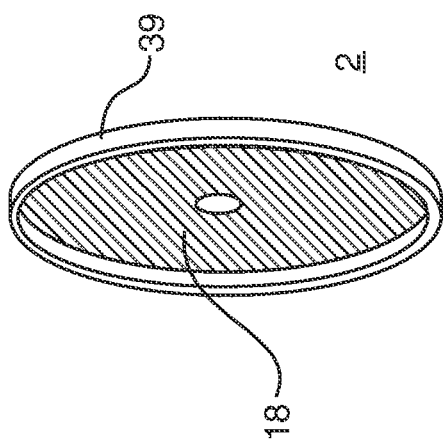
Fig. 14A
Fig. 14B
Fig. 14C

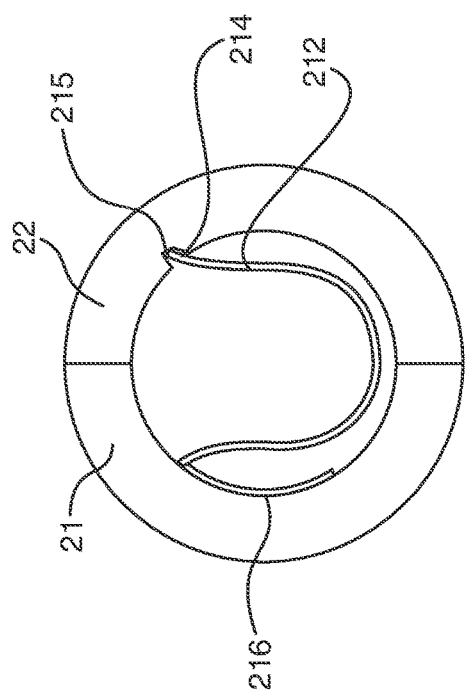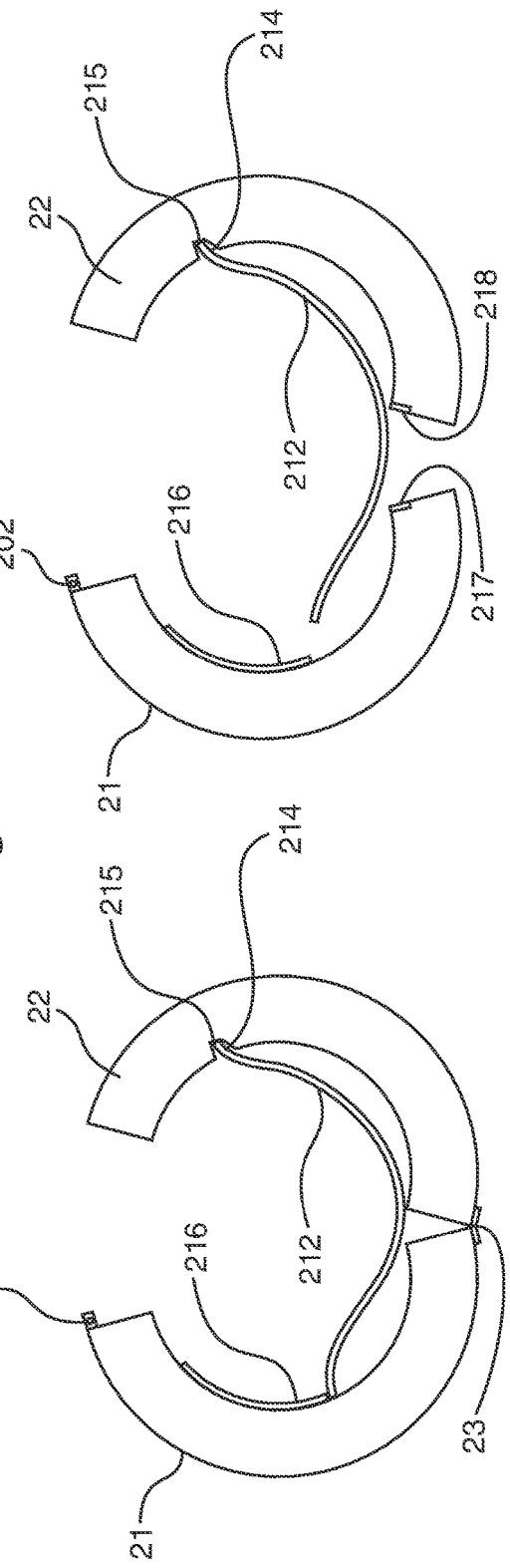

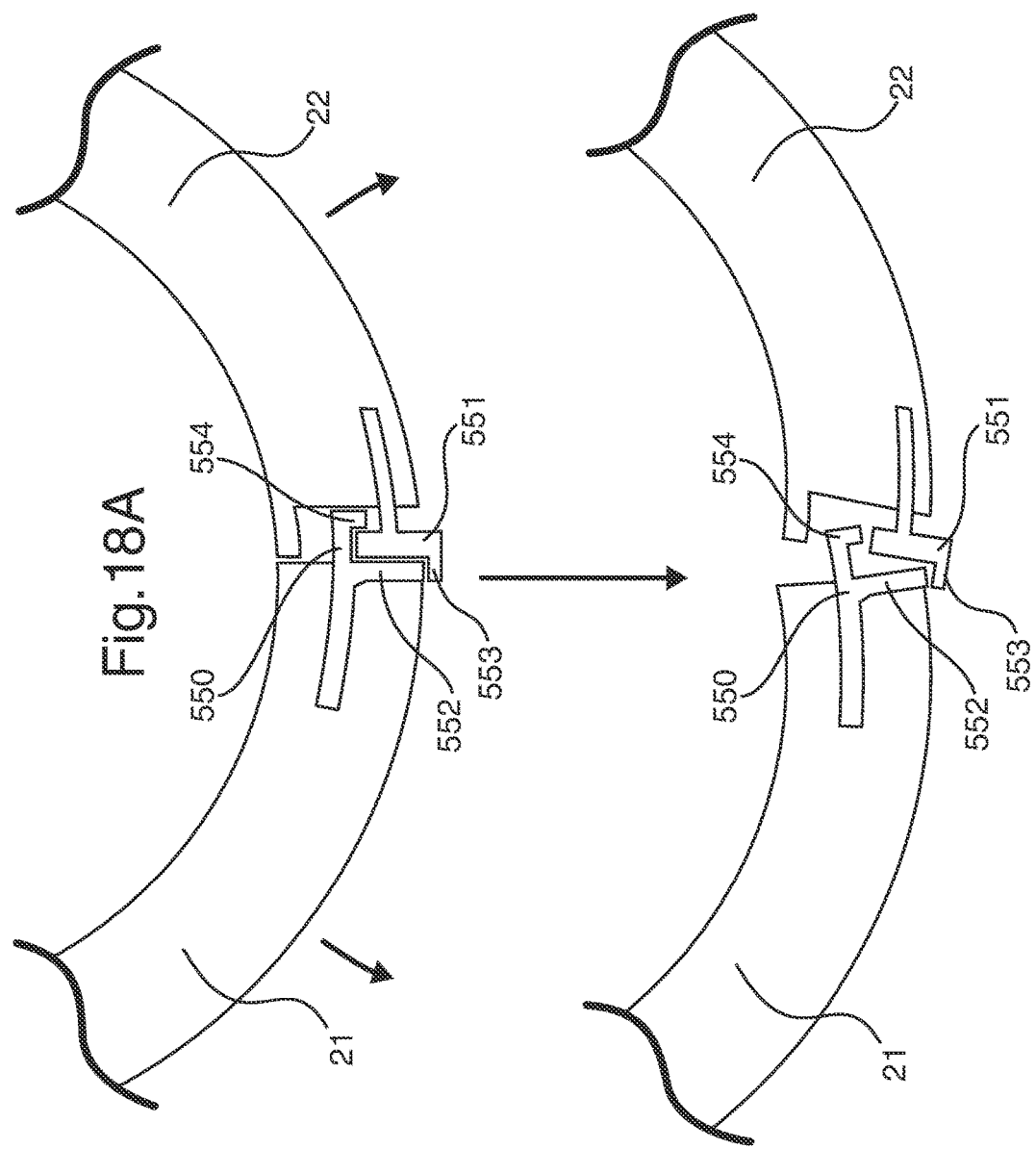

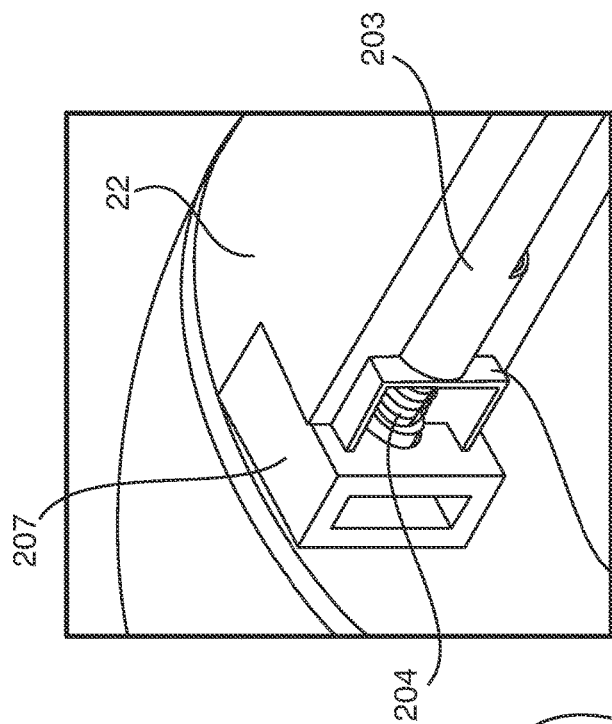
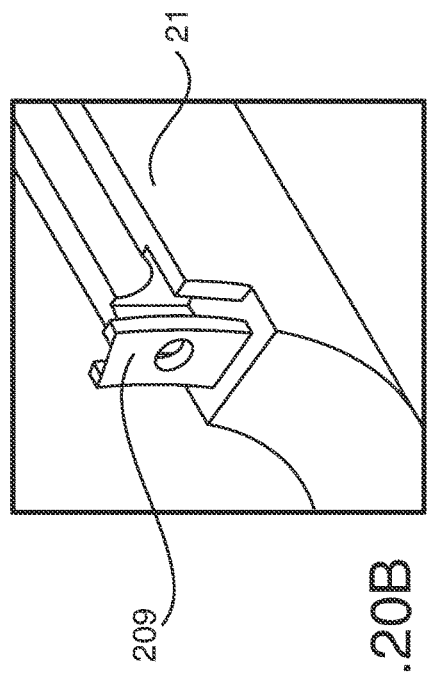
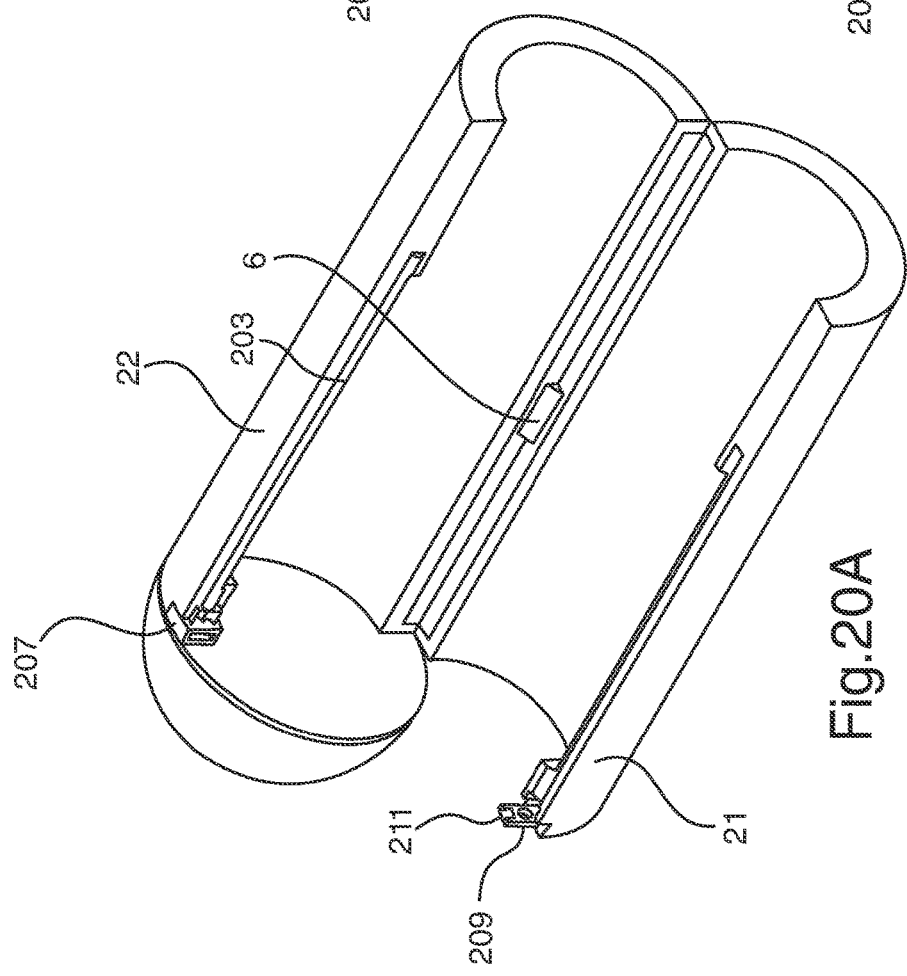
Fig.20C
Fig.20B
Fig.20A

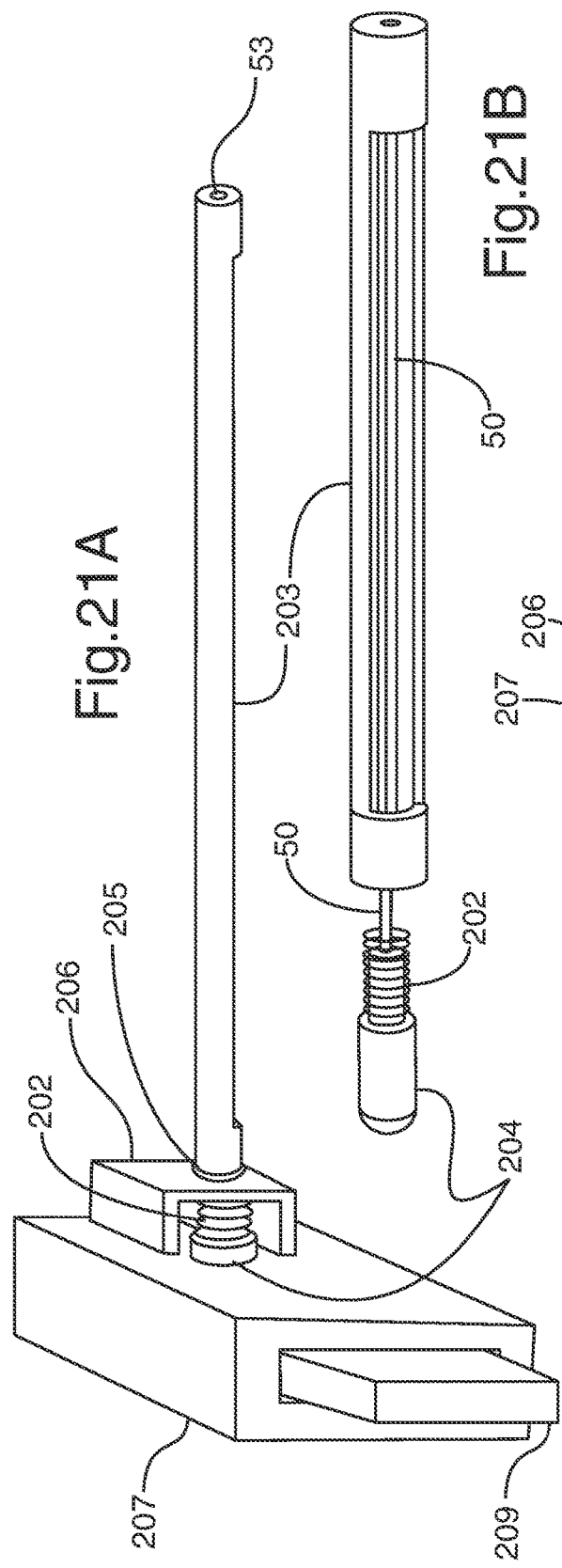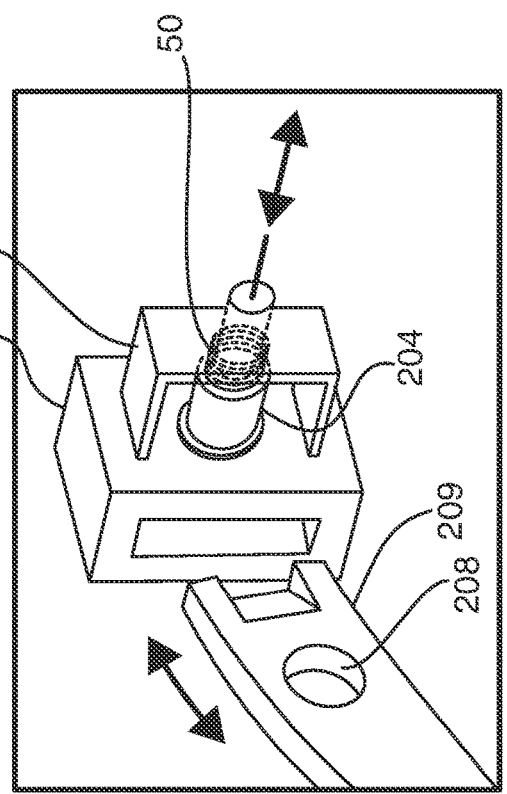

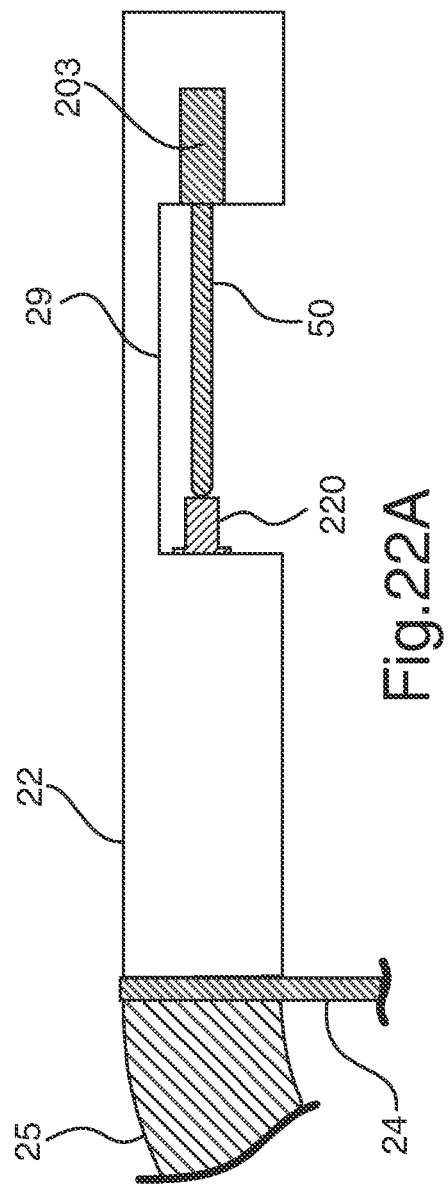
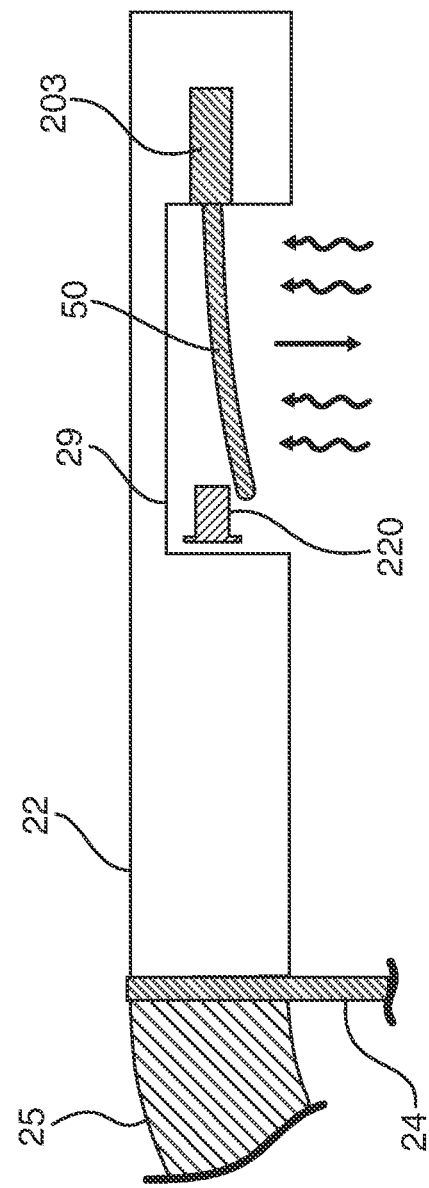

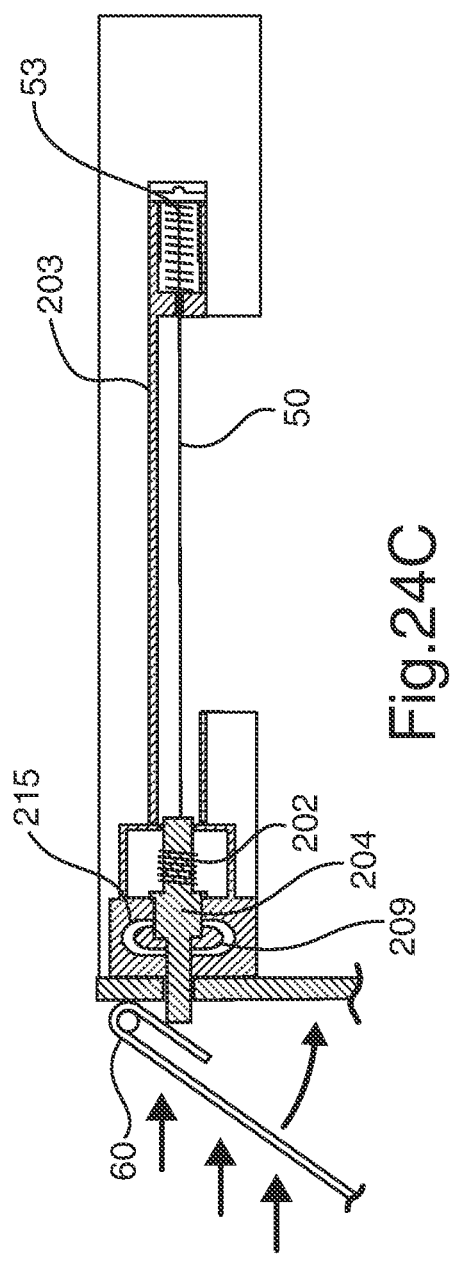
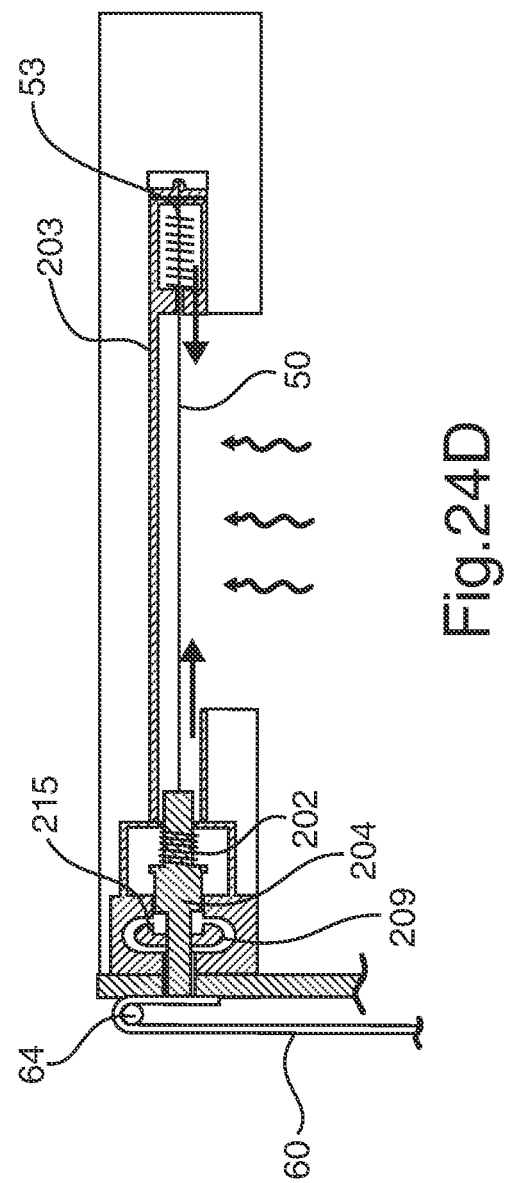
Fig.24C
Fig.24D

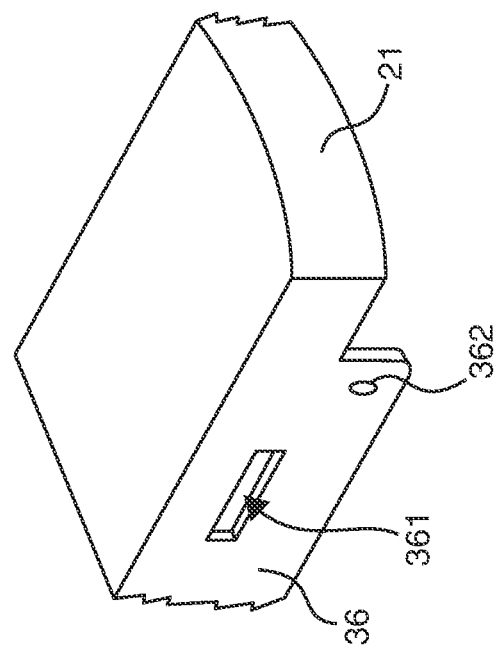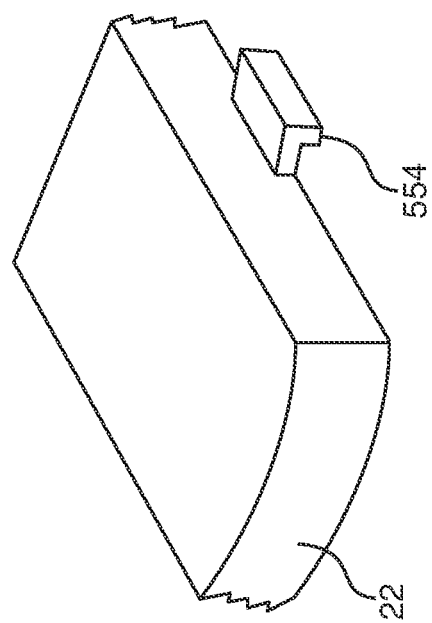
FIG. 33B

SYSTEM FOR ENSURING FAILSAFE OPERATION OF PITOT TUBE COVERS FOR MULTIPLE TYPES OF PITOT TUBES

PRIORITY INFORMATION

The present application claims priority as a CIP Application from U.S. patent application Ser. No. 17/179,774, filed on Feb. 19, 2021; which claims priority from US Published Patent App. No: 2020/0331631; Ser. No. 16/851,348, filed Apr. 17, 2020, which claims priority from Provisional Patent App. No. 62/836,331, filed on Apr. 19, 2019; Provisional Patent App. No. 62/862,873, filed on Jun. 18, 2019; and, Provisional Patent App. No. 62/884,799, filed on Aug. 9, 2019.

FIELD OF THE INVENTION

The present invention is generally related to pitot tube covers for vehicles such as aircraft, and in particular the present invention is directed to a range of pitot tube covers, some of which are automatically removed by vehicle environmental conditions, and which accommodate automatic removal for a wide variety of different pitot tube conditions.

BACKGROUND ART

All aircraft (and occasionally other high speed vehicles), whether small general aviation aircraft or large airliners, have at least one pitot tube, or similar instrument input. Specifically, pitot tubes are the most common input arrangement, and can feed a variety of instruments.

Normally, a pitot tube extends from the airframe in various locations depending upon the particular aircraft configuration and range of speed. The pitot tube has an opening, generally circular, facing forward. The opening is exposed to ram air pressure while the aircraft is moving through the air. This ram air pressure is transmitted to an airspeed indicator in the aircraft or other vehicle instrument panel via air rams. The aircraft's speed through the air can then be displayed for the pilot.

Knowledge of airspeed is very important to the pilot or operator of any high speed vehicle in order to ensure safe travel. when visibility is limited (as when flying in clouds where reference to instruments is necessary to conduct normal flight attitudes and navigation), if accurate airspeed is not available to the pilot, safe operation of the aircraft is highly unlikely. Accordingly, a clean pitot tube is essential.

Contamination of pitot tubes can occur from a number of sources such as:
1. Moisture that does not drain from the tube after flying in rain or after the aircraft has been washed or has been exposed to blowing rain while on the ramp.
2. Cleaning and/or polishing agents.
3. Paint during a re-painting process on the aircraft.
4. Insects or spiders that build nests within pitot tubes.

Moisture is generally not a problem because most pitot tubes have a drain hole that allows the automatic removal of moisture. Cleaning agents and paint generally are not a problem because the pitot tube is generally masked off during waxing and/or removed during painting, then returned to normal before flight.

Unfortunately, insects, spiders or other vermin enter and/or build nests within the pitot tubes thereby interfering with an accurate reading of the ram air pressure and, thus, the air speed. To prevent this, pitot tube covers are normally used for covering the pitot tube when the airplane is grounded or otherwise has no need for airspeed indication. Conventional types of pitot tube covers are often costly and complicated. They remain in place as long as possible to avoid dust contamination of the pitot tube. Further, on occasion, they are forgotten and not removed prior to flight. When this happens, the pilot is without knowledge of the airspeed and is in a potentially dangerous situation. Such contamination can occur while the aircraft is parked on a ramp or even in a hanger, causing obstruction and inaccurate airspeed indications.

Consequently, it is necessary that virtually all aircraft have a pitot tube cover in place to cover the inlet hole while the aircraft is not being flown. Pitot tube covers are available that can be slid over or strapped onto the pitot tube. There is a problem with conventional pitot tube covers, however. Despite having large visible RBF (Remove Before Flight) Flags attached, numerous cases have been documented where pilots, or ground crew, fail to remove the pitot tube cover prior to taking off, thereby contributing to a potential catastrophe. The conventional technology has addressed this problem in a number of ways.

Prior art self-disengaging pitot tube covers are vulnerable to forces that cause them to rotate about the longitudinal axis of a round pitot tube. Such forces are caused by crosswinds, prop wash, or jet wash. Further, with various other types of vehicles conditions can arise that will cause rotation. This rotation could result in the pitot tube cover not automatically disengaging, and staying in place. This is especially egregious in the case of aircraft at takeoff.

In many circumstances, pitot tubes are heated. In some circumstances, this is not a problem. However, in popular self-disengaging pitot tube covers, the construction material is of foam, or other light-weight plastic materials, that can melt and fuse to the pitot tube. This can keep the cover from automatically self-disengaging, and can even make manual removal problematic. Fouling of the pitot tube opening also can become an issue.

There are a wide variety of sizes and shapes for pitot tubes used on a wide variety of different vehicles. Exact fitting of a pitot tube cover for each type and size of pitot tube leads to substantial logistical challenges, and unnecessary expense. A small number of each of the different pitot tube sizes and shapes requires only low volume production, resulting in relatively high production costs per piece.

When the material constituting the pitot tube cover is soft and fits closely around the pitot tube, there's a chance that the open end of the pitot tube will stick or bind due to the deformation of the softer surrounding material. This could stop automatic disengagement from occurring, and could compromise the entire purpose of the pitot tube.

Because of the wide variety of vehicle types, sizes, and uses on which pitot tubes are mounted, installation of pitot tube covers is often problematic. Very often, a maintenance crew cannot reach the pitot tube easily in order to install and/or remove the necessary pitot tube covers. While a wide variety of different extension devices exist, none of them appear to be configured to easily interface with existing pitot tube covers. This can render basic maintenance and protection of the pitot tube extremely difficult, and expensive.

Because some pitot tube cover materials are fragile, or do not admit to easy modification, additional structure to enhance pitot tube operation can be problematical. There are conventional techniques and additional hardware that can facilitate the function of automatically removable pitot tube covers. Unfortunately, most of these are so invasive as to substantially degrade such materials as light weight cross-link polyethylene foam, which constitutes many conventional pitot tube covers. Accordingly, minimally invasive designs are needed for the additional hardware to facilitate automatic pitot tube cover removal.

There are cases in which pitot tube covers can be separated into multiple pieces upon being exposed to the force of air pressure caused by vehicle movement. Unfortunately, there is a tendency for some of the pieces to "hang up" on the pitot tube, especially when incomplete separation of the pitot tube cover pieces occurs. Pieces of a pitot tube cover that continue to be "hung up" on the pitot tube can block the pitot tube, or create other hazards for aircraft in motion.

As designs for pitot tube covers become more elaborate (to address the many variations in operating conditions), the expense of the pitot tube covers also increases. Accordingly, potential reuse of pitot tube covers after they had been automatically self-disengaged from the pitot tube due to aircraft motion, is rapidly becoming a major consideration in this technology.

reusable pitot tube covers require a robust design, especially at the intersection of separable parts that have to be fitted back together again for reuse. This can be anathema to earlier designs, which use flimsy materials, or entirely frangible materials. Further, failsafe methods of reconnecting pitot tube cover parts into a whole cover so that safe, reliable self-disengagement will occur in the future add greater complexity and potential problems. This in itself would increase the cost of the pitot tube cover structure. However, low cost must also be maintained due to the difficulty of retrieving pitot tube covers after being released from moving aircraft.

Consequently, the conventional art does not meet the need for a safety pitot tube cover which will be automatically separated from the pitot tube once an aircraft, or other high speed vehicle reaches a predetermined speed. Such a cover must be light, simple and inexpensive so that it's loss in the air does not constitute an unreasonable expense. And must be of a material that upon ejection from the pitot tube during ground run, will not cause airframe damage.

SUMMARY OF THE INVENTION

Consequently, it is object of the present invention to provide a pitot tube cover that automatically exposes the opening of the pitot tube when the vehicle upon which the pitot tube is mounted reaches a predetermined speed.

It is another object of the present invention to provide an automatically removed pitot tube cover that is simple in design and inexpensive.

It is a further object of the present invention to provide an automatically removable pitot tube cover that is easily operable when mounting on a pitot tube.

It is still another object of the present invention to provide a pitot tube cover that prohibits moisture and other contaminants from entering the opening of the pitot tube.

It is yet an additional object of the present invention to provide a pitot tube cover that is easily cleaned so as to avoid contamination of the pitot tube opening.

It is yet a further object of the present invention to provide an automatically removable pitot tube cover that is extremely light in weight and poses no hazard when released from an airplane at relatively high speeds.

It is still another object of the present invention to provide a self-disengaging pitot tube cover that resists rotation about the longitudinal axis of the pitot tube under external forces.

It is yet an additional object of the present invention to provide a self-disengaging pitot tube cover that resists any ill effects from hitting the pitot tube over which the cover is placed.

It is yet a further object of the present invention to provide a self-disengaging pitot tube cover that can accommodate a wide variety of pitot tube sizes and shapes, using the same pitot tube cover.

It is still another object of the present invention to provide a self-disengaging pitot tube cover that is easily placed upon the pitot tube under a wide variety of different environmental circumstances and vehicle types.

It is again an additional object of the present invention to provide a self-disengaging pitot tube cover on which the connection between the pitot tube cover and the required warning label is configured to resist disruption of the pitot tube cover under a wide variety of circumstances.

It is still a further object of the present invention to provide a self-disengaging pitot tube cover that is configured for quick and efficient automatic removal of the cover when the vehicle mounting the pitot tube moves forward under predetermined conditions.

It is yet another object of the present invention to provide a self-disengaging pitot tube cover that is resistant to mechanical deformation caused by the end of the pitot tube into the pitot tube cover.

It is again another object of the present invention to provide a self-disengaging pitot tube cover which provides only a limited amount of mechanical contact between the pitot tube cover and the pitot tube in order to avoid binding between the tube and the cover.

It is still a further object of the present invention to provide a self-disengaging pitot tube cover that contains integral structures configured to interface with installation tools.

It is yet an additional object of the present invention to provide a self-disengaging pitot tube cover that operates without leaving debris on an airport ramp or runway.

Is again a further object of the present invention to provide a self-disengaging pitot tube cover that does not leave residual material on a pitot tube due to thermal degradation.

It is again an additional object of the present invention to provide a self-disengaging pitot tube cover that can be attached using auxiliary means to other external airframe components.

It is yet a further object of the present invention to provide a self-disengaging pitot tube cover that resists thermal degradation under a wide range of circumstances.

It is again a further object of the present invention to provide a self-disengaging pitot tube cover that is configured to optimize air pressure forces for the automatic removal the pitot tube cover when the aircraft is moving forward.

It is still another object of the present invention to provide a self-disengaging pitot tube cover that can be remotely controlled using a variety of different methods.

It is yet another object of the present invention to provide a self-disengaging pitot tube cover that can be provided with a wide variety of alternative mechanisms for releasing the pitot tube cover from a pitot tube.

It is again another object of the present invention to provide a self-disengaging pitot tube cover that is provided with enhanced warning mechanisms to facilitate operator removal of the pitot tube cover.

It is again another object of the present invention to provide a self-disengaging pitot tube cover that is maintained as a single piece upon release from the pitot tube.

It is still a further object of the present invention to provide a self-disengaging pitot tube cover that generates its own disengagement force.

It is yet a further object of the present invention to provide a self-disengaging pitot tube cover having the capability to apply positive pressure to hold the pitot tube cover to the pitot tube until a specific release sequence is achieved.

It is still another object of the present invention to provide a self-disengaging pitot tube cover that can be remotely released from the pitot tube.

It is again further object of the present invention to provide a self-disengaging pitot tube cover having positive latching and unlatching of cover parts.

It is again an additional object of the present invention to provide a self-disengaging pitot tube cover with a latching mechanism that can be pre-stressed for spring-biased operation in both connection and disconnection from the pitot tube.

It is still a further object of the present invention to provide a self-disengaging pitot tube cover having cover material that is largely undegraded by the addition of latching mechanisms.

It is still a further object of the present invention to provide a self-disengaging pitot tube cover, which requires a minimum material deformation to achieve positive latching.

It is yet another object of the present invention to provide a self-disengaging pitot tube cover capable of secure latching by means of hard material integrated as part of said pitot tube cover.

It is still a further object of the present invention to provide a self-disengaging pitot tube cover capable of easy retrieval and reliable reuse.

It is again an additional object of the present invention to provide a self-disengaging pitot tube cover capable of total separation from the pitot tube under predetermined circumstances, wherein none of the parts of the pitot tube cover remain on or near the pitot tube.

It is yet another object of the present invention to provide a self-disengaging pitot tube cover capable of rapid disengagement from the pitot tube under all conditions upon predetermined conditions.

It is still a further object of the present invention to provide a self-disengaging pitot tube cover, which does not depend upon the force of air pressure to effect rapid disengagement from the pitot tube.

It is again an additional object of the present invention to provide a self-disengaging pitot tube cover capable of separation into integral parts were said parts are easily reconnected for reuse of the total pitot tube cover.

It is still another object of the present invention to provide a self-disengaging pitot tube cover capable of precise temperature control to trigger disengagement using a fully self-contained mechanism.

It is an additional object of the present invention to provide a sealed, manually operated pitot tube cover that is capable of preventing any contamination of the pitot tube.

It is yet another object of the present invention to provide a pitot tube cover that has a cleaning action upon placement over a pitot tube.

It is still an additional object of the present invention to provide a pitot tube cover that can be made automatically removable based upon multiple types of triggering agents.

It is yet another object of the present invention to provide a self-disengaging pitot tube cover that separates from the pitot tube more reliably than conventional pitot tube covers by removing any chance of maintaining contact with the pitot tube.

It is yet an additional object of the present invention to provide a self-disengaging pitot tube cover that is operable without mechanical latches.

It is still another object of the present invention to provide a quick-locking pitot tube cover, wherein the locking mechanism is easily inserted and removed.

It is again an additional object of the present invention to provide a self-disengaging pitot tube cover using two entirely separate halves that can be firmly latch together.

It is yet a further object of the present invention to provide a self-disengaging pitot tube cover in which separation of two cover halves is effected by the spring-like action to separate the two cover halves is provided entirely by four resilient split discs.

These and other goals and objects of the present invention are achieved by a pitot tube cover having a hardened exterior support structure and a hollow inner bore with a rear aperture for receiving a pitot tube, where the hollow inner bore defines an interior wall. The pitot tube cover includes a plurality of heat-resistant, flexible suspension structures supported by the interior wall and extending inwards towards a center line of the interior bore. The suspension structures are configured to receive and hold a pitot tube away from the interior wall. Also included is a release mechanism formed as part of the exterior structure and configured to facilitate automatic separation of the pitot tube cover from the pitot tube under predetermined conditions.

Another embodiment includes a pitot tube cover having a hardened shell surrounding the hollow inner bore defined by an interior wall, and a rear aperture configured to receive a pitot tube. The pitot tube cover includes a split cylinder configuration of the shell where the split cylinders configured in two halves. Each half is joined along two outer edges to constitute the inner hollow bore. Also included is a plurality of heat-resistant suspension structures supported by the interior wall and extending inwards towards the centerline of the inner bore. The suspension structures are configured to receive and hold a pitot tube away from the interior wall. Also included is a release mechanism formed as part of the shell and configured to facilitate automatic separation of the split cylinder halves from each other, thereby separating the pitot tube cover from the pitot tube.

A further embodiment includes a pitot tube cover having hardened exterior structure and a hollow inner bore defining an interior wall. The pitot tube cover includes a structure configured from the inner bore to hold an exterior pitot tube. Also included is a release mechanism formed as part of the exterior structure and configured to facilitate automatic separation of the pitot tube cover from the pitot tube under predetermined conditions. The exterior structure includes two strakes extending beyond the pitot tube receiving an aperture and being formed on opposite lateral sides of exterior structure. The strakes are configured to extend on either side of an exterior structure supporting the pitot tube.

In an additional embodiment of the present invention, a pitot tube cover having a hardened exterior structure and a hollow inner bore defining an interior wall with a pitot tube receiving aperture includes a plurality of heat-resistant, flexible suspension structures supported from the interior wall. Also included is a sealing mechanism formed as part of at least one flexible suspension structure. The sealing mechanism is configured to be deformed by the presence of a pitot tube within the cover, and to seal around the entirety of the pitot tube to stop passage of any materials into the pitot tube cover.

In yet another embodiment of the present invention, a pitot tube cover having a hardened exterior structure and a hollow inner bore defined by an arrangement of interior bulkheads includes four heat-resistant flexible split discs supported from interior disc holders. The pitot tube cover is constituted by two entirely separate halves which are connected together using a series of latches on one side and a single temperature-sensitive fuse held in clips on an opposite side to the latches.

BRIEF DESCRIPTION OF THE DRAWINGS

FIG. 1 is a side view of the pitot tube cover mounted on a pitot tube.

FIG. 2 is a side view of the pitot tube cover of FIG. 1 in a partly disengaged position.

FIG. 3 is a side view of the pitot tube cover of FIG. 2 in a fully disengaged position.

FIG. 7A is a side perspective view of another embodiment of the present invention.

FIG. 7B is a front perspective view of a detail of the embodiment depicted in FIG. 7A.

FIG. 10A is a side perspective view of a split cylinder arrangement having split discs or hemi rings.

FIG. 10B is a front view of a hemi ring including all of the relevant structural details.

FIG. 10C is a front view of the hemi ring when the two cylinder halves are separated.

FIG. 13A is a side interior view of an embodiment of the present invention which uses a remotely controlled triggering system located in the nose of the split cylinder pitot tube cover arrangement.

FIG. 14A is a front view of a modified membrane to be used in place of the aforementioned split discs or hemi rings.

FIG. 14B is a side perspective view of the modified membrane of FIG. 14A.

FIG. 14C is a front perspective view of a pitot tube cover depicting the interior having two membrane rings of FIG. 14A and a split disc of the FIG. 10B.

FIG. 15A is a cross-sectional view of a closed split cylinder pitot tube arrangement with an interior leaf spring.

FIG. 15B is the same cross-sectional view of the pitot tube cover, but in the open position.

FIG. 15C is a variation of the arrangement of FIG. 15B in which the hinge between the two cylinder halves is eliminated and a set of magnets used in its place.

FIG. 18A is a partial cross-sectional view of a hinged portion of two cylinder halves of a pitot tube cover, depicting an alternative hinge arrangement when the cylinder halves are closed.

FIG. 18B depicts the arrangement of FIG. 18A when these two cylinder halves separate, and the hinge arrangement disengages for complete separation of the two cylinder halves.

FIG. 20A is a top perspective view of a modification of the FIG. 19A embodiment, including an alternative receiver arrangement for the linear latching system.

FIG. 20B is a front perspective view showing the details of the latch receiver.

FIG. 20C is a top perspective view of the details of a spring loading mechanism for releasing the linear latch from its receiver.

FIG. 21A is a side detailed view of only the linear latching system.

FIG. 21B is a side view of the housing for the linear latch and a spring-loaded interface for the latch receiver.

FIG. 21C is a detailed view of the latch receiver interfacing with a housing for the end of the spring-loaded end piece or interface for the linear latch.

FIG. 22A is a side detailed view of the embodiment of the temperature release mechanism in the locked position.

FIG. 22B is a side detailed view of the mechanism of FIG. 22A in the released position.

FIG. 24C is a side detailed view of the multi-trigger release mechanism of FIG. 24A, in the locked position.

FIG. 24D is a side a detailed view of the multi-trigger release system of FIG. 24A, in the released or triggered position created by both air pressure and temperature.

FIGS. 33A-33C are end detailed views of the bottom latching mechanism used in the FIG. 32 embodiment.

DETAILED DESCRIPTION OF THE PREFERRED EMBODIMENTS

Figure 5:
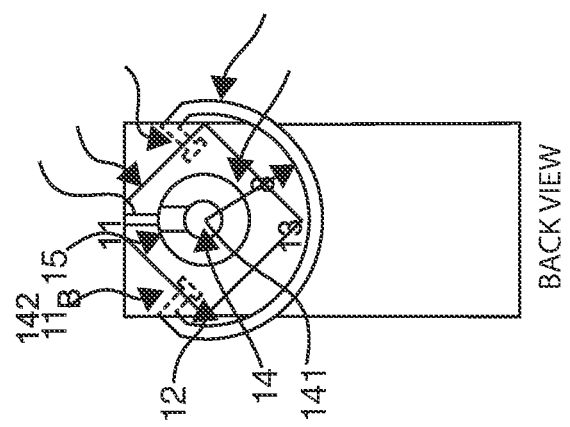
FIG. 5 is a rear view of the pitot tube cover and the connection between the pitot tube cover and a warning label.

The first embodiment of the present invention operates in much the same manner as U.S. Pat. No. 5,938,147, to the same inventor as the present application. However, the pitot tube cover 1 of present invention has an airfoil configuration and a "keyhole" interior that substantially improve upon the operation of the cited conventional art. Further, many possible drawbacks that could be found in that prior art are avoided by one or more of the various aspects of the present invention. These various features operate cooperatively as a system which provides substantial reliability over that of the cited prior art.

In order to guarantee a quick and trouble-free automatic disengagement of the pitot tube cover 1, a number of considerations are addressed by certain embodiments of the present invention. These include a more effective configuration to utilize air resistance as the motivating forces, AF1, AF2 and AF3 to remove the pitot tube cover 1, as depicted in FIGS. 1-3.

Movement of the aircraft containing the pitot tube cover 1 against air resistance generates motivating forces AF1 and AF2. Air resistance force AF3 is generated by diversion of air flow (AF2) along the inclined surface 20, as depicted in FIG. 1. The result of the subject air resistance forces is that pressure P1, P2 is exerted against surfaces 20 and 5, as depicted in FIGS. 1 and 2. Pressure is also developed on the lower inclined surface 19 due to the airflow force AF1 against sail surface 5.

All of these pressures P1, P2 combine together to quickly force pitot tube cover 1 downward, pivoting around pivot point 6 within the interior cavity 14 of the pitot tube cover, as depicted in FIG. 2. As pitot tube cover 1 pivots, additional forces are developed in the direction of AF1 and AF2 so that even greater pressure is placed upon the pitot tube cover due to additional surfaces now exposed in the direction of AF1 and AF2. This hastens the separation of the pitot tube cover 1 from the pitot tube 100 and its supporting structure 102.

Figure 6B:
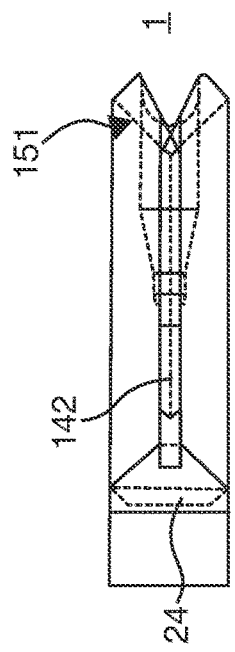
FIG. 6B is a top view of the pitot tube cover of the present invention.
Figure 6C:
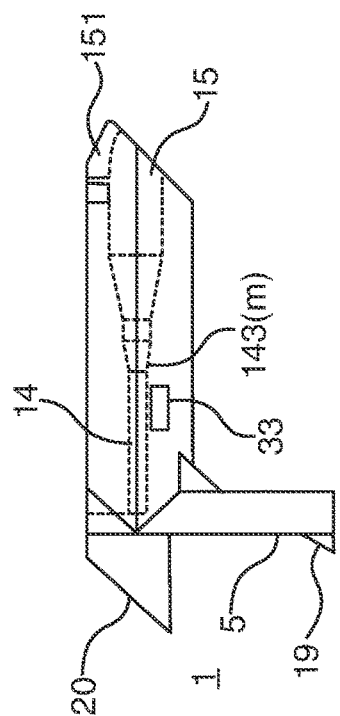
FIG. 6C is a side view of the pitot tube cover of the present invention.
Figure 6A:
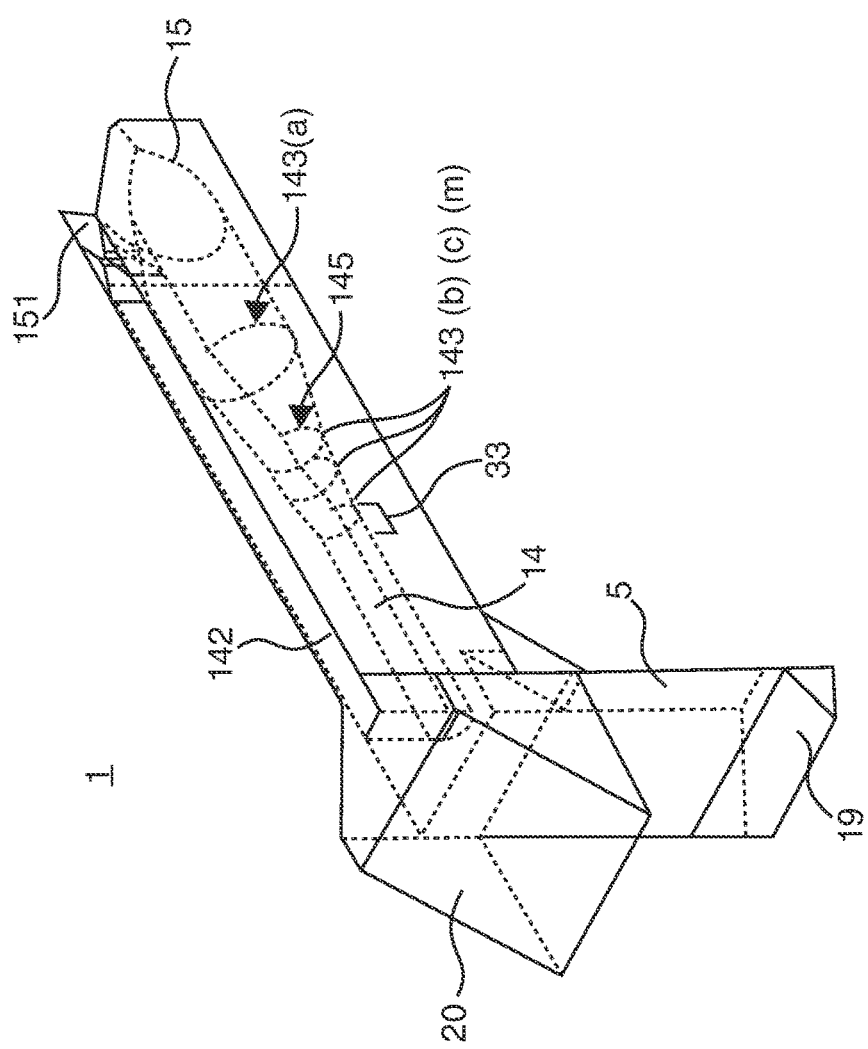
FIG. 6A is a front perspective view of the pitot tube cover of the present invention.

The present invention also uses special structures (strakes 151 extending from the rear of the pitot tube cover 1, as depicted in FIGS. 6A and 6C). These strakes 151 make certain that rotation about the major (longitudinal) axis of the pitot tube does not occur. By gripping pitot tube support 102 on either side, the pitot tube cover is configured for multiple sizes and shapes of pitot tubes, and has a special structure (butt plate 24 depicted in FIG. 8) to make certain that the opening 101 (in FIG. 20) of the pitot tube is securely covered, and quickly released once removal of the pitot tube cover 1 is appropriate.

Provisions are made against any kind of heat fusion or other kinds of sticking that might hinder the rapid disengagement of the pitot tube cover 1. Likewise, the connection with the mandatory safety tag 7 (FIGS. 4 and 5) is configured to prevent undesired movement of the pitot tube cover 1 due to wind-induced movement of the safety tag 7.

If the pitot tube cover 1 is in place on the pitot tube 100 (as depicted in FIG. 1) during an aircraft's takeoff roll, the angled front surface 20 of the top of the sail portion S (FIGS. 3 and 6A) of the pitot tube cover PC provides for deflection upward AF 3 of the oncoming ram-air AF 2. There is then a resultant rearward and downward net force creating pressure P1 upon the surface 20. This is combined with the moment of force AF1, which creates pressure P2 on sail surface S, initiates torque about a pivot axis 6 existing at the aft-most point of contact between the interior cavity 14 of the cover and tube 100. The pivot point 6 can be on one of the steps 143(a) . . . (m) of stepped inner bore 14 of the cover 1 (as depicted in FIG. 6A). The dynamics of this improved sail geometry operates to quickly and effectively release the pitot tube cover 1 from the pitot tube 100 via the top slot 142 of the keyhole opening of the cavity 14 in the pitot tube 1 body.

The pitot tube cavity 14 is characterized by a stepped taper (depicted as steps 143(a) . . . (m) in FIG. 6A) from back to front. A "keyhole-shaped" cross-section cavity 14, with slot opening 142 at the top extends longitudinally the entire length of the cover 1, rearward of butt plate 24 (FIG.

8). The keyhole cross-section (depicted in FIG. 6D) allows for the "fail-safe" release capability of the pitot cover 1 should it be in place (on tube 100) upon takeoff.

The pitot tube cover 1 can be made of low-density cross-linked polyethylene foam, which is flexible and compressible, and returns, at least partially, to its original shape after deformation. These properties allow for the pitot tube cover to engage and remain on the pitot tube 100 by friction until removed by an external force. Low density is preferred for removal when air pressure is relied upon, as in FIGS. 1-6.

This removal is preferably accomplished either by aircraft maintenance crew removing the pitot tube cover 1 by hand, or by using an install/remove tool designed specifically for the pitot tube cover. Preferably, the tool would interface with tool indentation 33 (depicted in the drawings), to facilitate easy handling of the pitot tube cover. However, ground crew sometimes fail to do this.

If inadvertently left on the pitot tube 100 during the preflight procedure prior to takeoff, the pitot tube cover 1 will automatically disengage during the initial takeoff taxi at approximately eighty knots, as determined by calibration of size and shape of the sail portion S, the side of the pitot tube, and the pitot tube cavity 14 in the engagement portion PC. At that speed, AF1, AF2, AF3 air pressure forces the sail portion S, by virtue of its unique shape, backward and downward on the pitot tube cover engagement portion PC. The front opening of the pitot tube butts 101 against a low-friction polymer plate 24 (depicted in FIGS. 6 and 16) to allow the front of the pitot tube cover 1 to deflect down, sliding off the pitot tube 100, and allowing the pitot tube cover to rotate (about 6) such that the cover 1 is released.

This is facilitated in the particular by the keyhole slot 142 expanding, thus allowing the tip 101 of the pitot tube 10 to exit the engagement cavity 14. This is followed by further rotation, further rearward displacement and total release of the cover 1 from the pitot tube 100.

There are a multitude of sizes and dimensions of pitot tube tubes. For logistical reasons it has been found that a "one-size-fits-all" pitot tube cover 1 is the safest, and most convenient, technology, achieved by avoiding the possibility of an incorrect size cover being used on a tube, particularly if a "fail-safe" technology is being relied upon. Unfortunately, the ideal of "one-size-fits-all" is virtually impossible to achieve in view of the wide range of pitot tubes sizes and arrangements. However, the system of the present invention includes a number of techniques for approaching this goal.

One embodiment of the present invention approaches this concept utilizing the flexibility, compressibility and elasticity of cross-linked polyethylene foam (XLPA), or ethylene vinyl acetate (EVA) surrounding a variably tapered or stepped cavity (depicted in FIGS. 6A-6C) that has a longitudinal slot 142 in the top of the pitot tube cover 1. That slot functions as the pitot tube 100 release pathway. The pitot tube cavity 14 surfaces have a stepped 143(a) . . . (m) tapered shape that augments the compressibility of the pitot cover material to accommodate the various shapes with a relatively equal engagement force and friction, and therefore uniform release velocity.

Some airliners and some other high-altitude turboprop, turbofan and turbojet aircraft have relatively long pitot tubes 100. In order to accommodate as many of these pitot tubes as possible, the engagement portion of the pitot tube cover 1 must also be made long. If left in place during takeoff, the pitot tube cover 1 could impinge upon the surface of the aircraft to which the pitot tube is attached (either the fuselage or the wing). Should the pitot tube cover 1 be rotated about the longitudinal axis of pitot tube 100, the sail portion would come into contact with the aircraft surface. This rotation could occur due to a strong surface wind or propwash or jet-wash from nearby aircraft while on the ramp. Any number of difficulties could result.

To ensure the pitot tube cover 1 does not rotate around the longitudinal axis of the pitot tube 100, the present invention incorporates strakes 151 extending from the aft portion of the tube cover. These extensions or strakes straddle the mast 102 of the long pitot tube 100 (as depicted in FIGS. 1-3), thus preventing rotation and alleviating the risk of the pitot tube cover auto-release feature not functioning.

All pitot tubes 100 on turboprop, turbofan and turbojet aircraft have heating elements (not shown). The heat serves to melt ice and snow and boils off moisture and prevents ice formation on and in the pitot tube while flying in atmospheric conditions conducive to airframe icing. Typical systems apply heat whenever the aircraft electrical systems are switched on. This includes time in a maintenance hangar or during ramp maintenance, when pitot covers may be in place.

Many systems use a low current and/or voltage while on the ground when there is little wind to dissipate heat from the tube. This low power can heat the tube to over 200 deg. F. Upon liftoff the pitot tubes receive much higher amperage in order to remain hot enough to prevent ice formation at altitudes where air temperature becomes very low and at high speeds that result in significant heat dissipation.

Pitot tube covers 1 are frequently accidentally left in place during maintenance, pre-flight checks, etc. when the aircraft electrical systems are energized. Pitot tube covers 1 that are made of some plastics melt under the aforementioned conditions and contaminate or even block the pitot tube 100, often rendering the aircraft grounded until repairs can be made. The cross-linked polyethylene material sometimes used in the present pitot tube cover softens at approximately 220 deg. F. Thus, it can be a source of pitot tube 100 contamination.

Figure 6E:
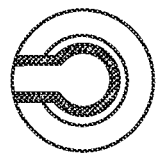
FIG. 6E is a cross sectional view of the inner bore and slot covered with a thermal lining.

In order to alleviate this possibility, the pitot tube cover cavity 14 can be lined with flexible high-temperature, abrasion-resistant para-aramid fabric or other heat-resistant layer 145 is applied to the cover material, such as foam (as depicted in FIG. 6E). This barrier reduces the temperature that the foam substrate attains, as well as shielding the pitot tube surface from the softened substrate should its temperature exceed approximately 220 deg F. Thus, the risk of contamination of the pitot tube 100 from melted pitot tube cover matrix is much reduced.

Also included is a butt plate 24 with which the pitot tube 100 tip engages to seal it from contamination. The material of the butt plate is very similar to a fluorocarbon polymer or other material with physical, thermal and chemical characteristics similar to PTFE. One example of such a material is Teflon®, which is a low-friction, high-temperature material that withstands temperatures over 500 deg. F.

Nearly all pitot tube covers in use have a Remove-Before-Flight Flag 7 (Commonly known as an "RBF") attached to aid in visibility (as depicted in FIG. 5), and thereby reduce the chance of the pitot tube cover 1 being left in place during preflight preparations. Additionally, the flag 7 is bright red colored with large "REMOVE BEFORE FLIGHT" printing visible from all directions.

Figure 4:
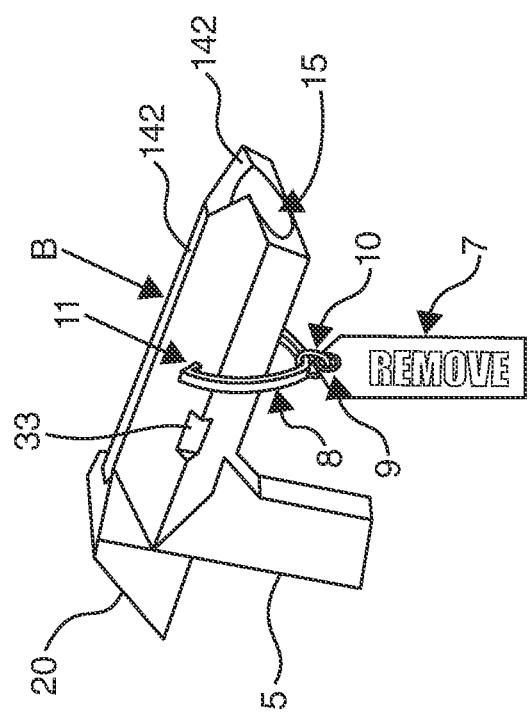
FIG. 4 is a side perspective view of the pitot tube cover and a connector between the cover and an external warning label.

The present inventive pitot tube cover 1 can be configured or colored to enhance its intrinsic visibility, and therefore does not necessarily require an RBF, but it is anticipated that some aircraft operators will request that an RBF 7 be attached. To satisfy this eventuality, this pitot tube cover has a unique attachment device—an RBF Ring 8 to which an RBF 7 can be attached via a gromet 9 and attachment ring 10 as depicted in FIGS. 4 and 5. The RBF Ring 8 has two attachment loci 11 and flanges 12 embedded in the pitot cover body B. The RBF Ring 8 is circular with the center of its radius of curvature 13 co-located with the center 14 of the pitot cover cavity 15. This geometry allows the RBF 7 to slide on the RBF Ring 8 when disturbed by wind or jet or propeller blast from nearby aircraft while on a ramp. The result is that any force from the movement of the RBF 7 will always be acting centripetally on the center 14 of the pitot tube cover PC to not impart torque on the pitot tube cover PC, which in extreme wind velocity conditions could disengage the pitot tube cover from the pitot tube.

Some aircraft have pitot tubes 100 are located high on the airframe and therefore out of reach. In these instances, if no ladder, air stair or lift is available, the pitot tube cover 1 must be place on the pitot tube using a long, often telescopic pole. Placing the pitot cover on a pitot tube on an airport ramp with a small cover on the end of a long pole can be quite challenging, particularly if there is a wind blowing such as is typical on an airport where there is wide open space.

A tool notch 33 is shown on the side of the cover body forward of the RBF Ring 8. Preferably, there is one notch on each side of the body, and they are used for engagement of the pitot tube cover with an installation/removal tool (not shown). A particular tool designed for handling pitot tube covers is configured so that it interfaces easily with the tool notches 33 referred to above. The handling tool can be placed on an articulating component and/or telescoping poles. This combination allows handling of pitot tube covers in a variety of awkward locations or positions.

An additional embodiment of the present invention is found in FIGS. 7A and 7B. The outward configuration of this embodiment is the same as that depicted in FIGS. 1-6. However, the internal structure is different. The internal passage or cavity 14 is much larger than that of the original embodiment so that the entirety of the pitot tube cover cavity 14 is no longer "squeezing" the pitot tube 100. Rather, the pitot tube 100 is not in contact with the pitot tube cover 1 except where the pitot tube interfaces the washer-shaped discs 2 (as depicted in FIGS. 7A and 7B). The washer-shaped disc 2 has a keyhole entry 4 slot to center hole 32, which align with the slot 142 along the top of the entire pitot tube cover. Flexibility of disc 2 is provided, in part, by radial slits 3 which allow flexing of disc 2 to allow a tight nit around the pitot tube 100. This structure allows easy exit of the pitot tube 100 from the pitot tube cover 1 under the same circumstances as described with regard to FIGS. 1-5.

The washer-shaped discs 2 can be made of a heat resistant material (such as PTFE) in order to avoid potential melting and bonding with the pitot tube 100. As a result, the para-amide fabric thermal barrier 145 (as depicted in FIG. 6E) can be eliminated. Further, a wide variety of discs 2 with different internal diameters can be provided so that a single size pitot tube cover 1 can accommodate a wide variety of different pitot tube 100 sizes. Different sized discs 2 can be made available for different size pitot tubes while being accommodated in the same overall shell. With this particular embodiment, virtually any pitot tube size (within reason) can be accommodated by a single pitot tube cover and a variety of different washer-shaped discs with appropriately sized slots entries 4 and apertures 32.

Figure 7C:
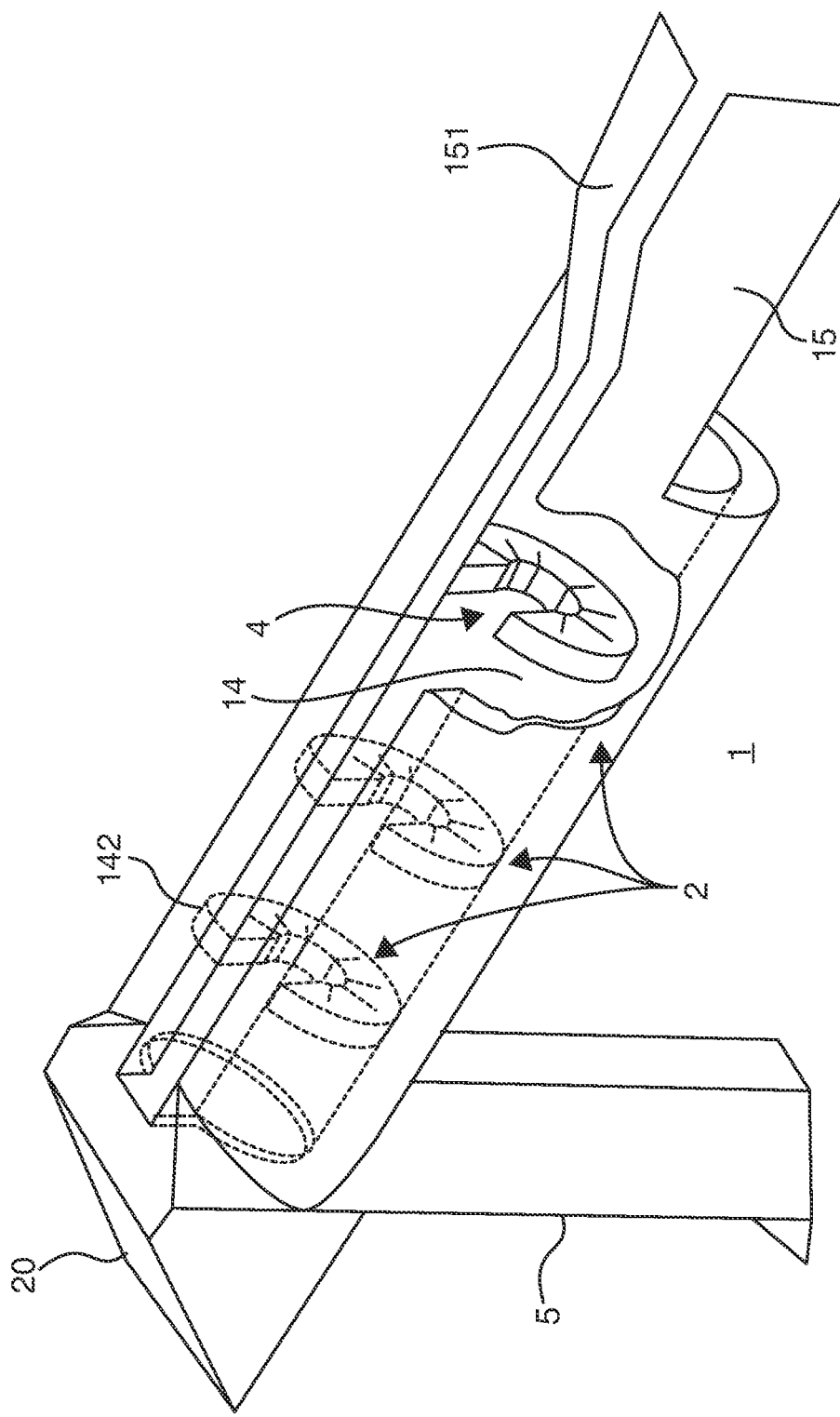
FIG. 7C is a side perspective view of another embodiment of the present invention in the open position.

The butt plate 24 depicted in FIG. 6B need not be permanently attached to the interior bore 14. Rather, this piece can be moved from place to place as considered appropriate by the installer, by adding a third washer-like disc 2 to the interior of the pitot tube cover (as depicted in FIG. 7C). This third disc 2 can have the butt plate mounted to it and to be positioned by the installer so that the butt plate interfaces with the end of the pitot tube 100. Likewise, the other washer-like discs 2 can be positioned so as to hold the pitot tube in a manner that permits the strakes 151 to extend over the base 102 of the pitot tube 100. In this manner, a maximum of pitot tube 100 size ranges can be accommodated with a single type of pitot tube cover 1.

Figure 6D:
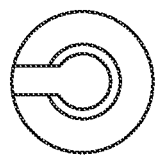
FIG. 6D is a cross sectional view of the inner bore and slot.

Combinations and variations of the aforementioned embodiments are also within the scope of the present invention. For example, the washer-like discs 2 of one embodiment need not be of para-amide fiber. Rather, they can simply be lined with an appropriate heat resistant material 145 (FIG. 6E) so that binding between the interior of the disc 2 and the pitot tube 100 is avoided. Likewise, a heat resistant layer can be arranged around the interior 14 of the pitot tube cover 1, even though the interior of the pitot tube cover is separated by the washer-like discs 2 from the pitot tube. This would ensure that low-density polyethylene foam constituting the pitot tube cover is not compromised by any amount of heat that is built up in the pitot tube 100. Further, the stepped configuration of the pitot tube cover interior, as depicted in FIGS. 6B-6D, can be included in combination with the washer-like disc 2 depicted in FIGS. 7A and 7D, although the discs 2 obviate the need for the stopped configuration.

Further, while the FIG. 7A embodiment does not appear to include the strakes 151 depicted in the other figures, the FIG. 7A embodiment can be provided with such strakes 151 (as depicted in FIG. 7C). Also, while the outer shape of the FIG. 7A embodiment appears to be somewhat different than the structure of the other embodiments, the strakes 151 operate as with the previous embodiments. While the strakes 151 of the FIG. 7C embodiment appear to be elongated extensions of a relatively cylindrical structure, the structure of the strakes is not limited thereto. For example, the strakes of the FIG. 7C embodiment can resemble the structures identified as 151 and depicted in FIGS. 1-3. All that matters is that the extended strake structure 151 interface on either side of the pitot tube support structure or mast 102, to prevent rotation.

Ease of installation may be facilitated by the manner in which the pitot tube cover 1 is configured. For example, in one embodiment at least one or two of the washer-like discs 2 are fixed at a particular point at the interior of the pitot tube cover. However, a third washer-like disc 2 holding the butt plate 24, is movable within the interior cavity 14 pitot tube cover so that the pitot tube 100 moves this washer-like disc and the butt plate as the pitot tube cover 1 is installed over the pitot tube end 101. The third or movable washer-like disc 2 can be placed in any pitot tube covers 1 so that insertion of the pitot tube 100 will move that third disc 2 to the appropriate position within the cover interior 14 to remain against the end 101 of the pitot tube 100. Once positioned this movable washer-like disc 2 should stay in position against the open end of the pitot tube 100 by virtue of the elastic characteristics of the low-density polyethylene foam constituting the pitot tube cover 1.

Another embodiment of the present invention, and certain variations thereof, are depicted in FIGS. 8, 9, 10A, 10B and 10C. The body of the pitot tube cover 1 is cylindrical in shape, and constituted by a left half cylinder 21 and a right half cylinder 22. Both of these complement each other, and are also identified as body halves 21, 22. The two body halves 21, 22 are attached to each other on one set of adjacent edges by a longitudinally oriented living hinge 23. This hinge, along with preloading tension spring 26, is depicted in greater detail in FIG. 9. The living hinge 23 serves as the permanent connection between the two cylinder body halves 21, 22. The opposite set of adjacent edges is joined by latch structures 27, 28, or some equivalent.

In one variation, the front of the right half cylinder 22 has a butt plate 24 made of a fluorocarbon polymer (or other material with physical, thermal and chemical characteristics similar to PTFE). Extending forward from the butt plate 24 is a nosecone 25 that is integral with the right half cylinder 22. This nosecone 25 provides mechanical support for the butt plate and provides a space within the pitot tube cover 1 for devices that that can be used in further embodiments of the present invention. In the current embodiment this space is left empty, or formed of a solid plastic or foam material.

Figure 8:
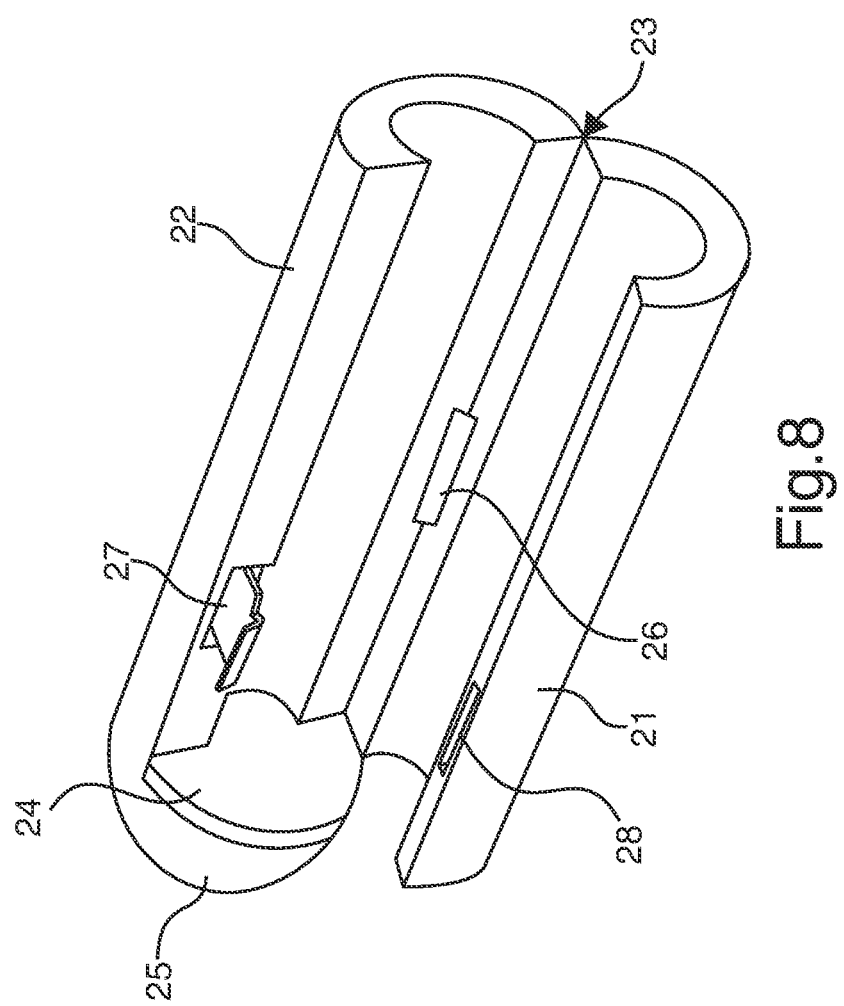
FIG. 8 is a side perspective view of a split cylinder cover arrangement.
Figure 9:
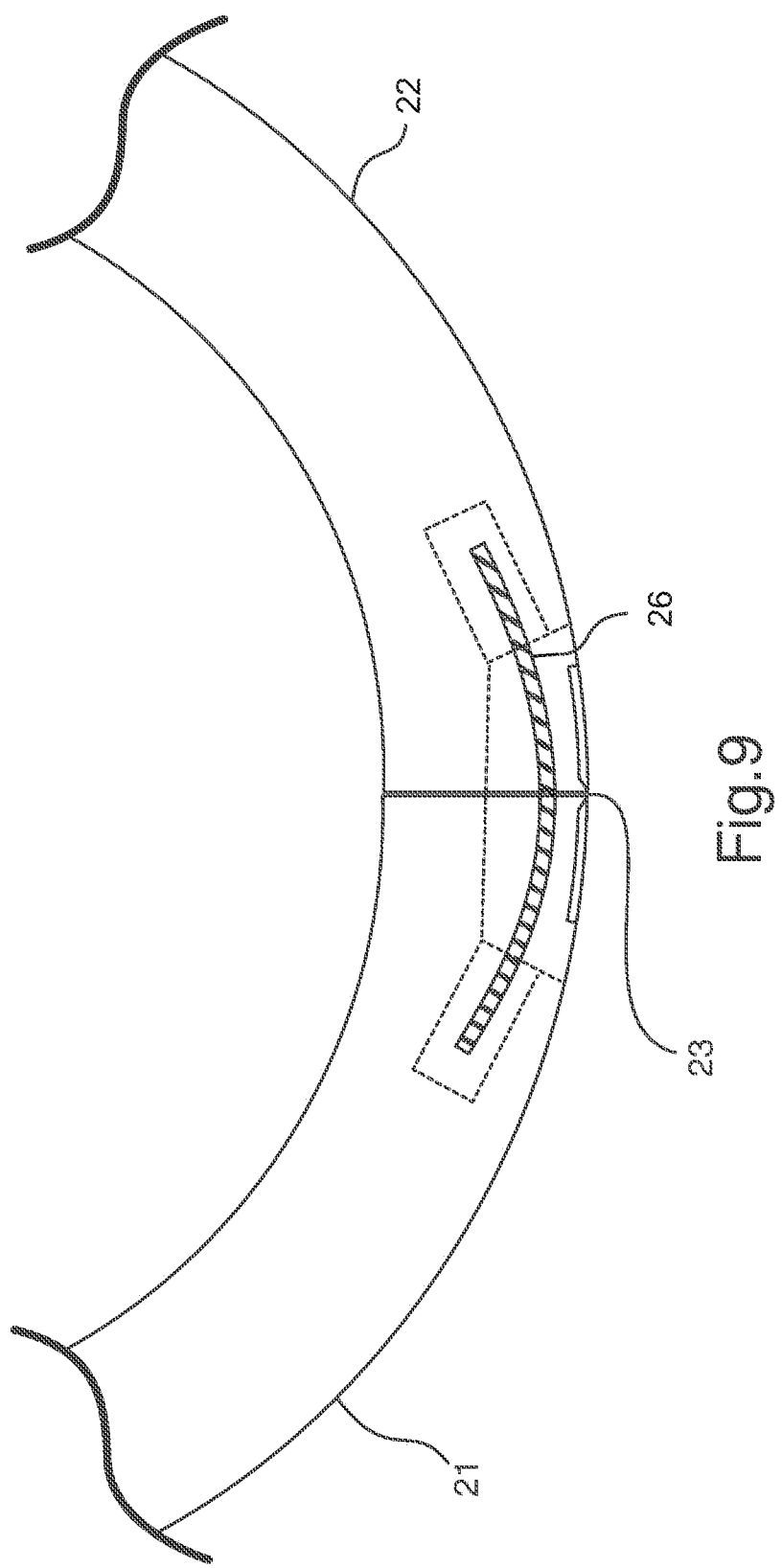
FIG. 9 is a sectional detail view of a hinge included in the embodiment of FIG. 8.

Inserted into each cylinder body half 21, 22, and crossing over the living hinge 23 is a preloading tension spring 26, best depicted in FIG. 9. While extending between the two half cylinders 21, 22, the preloading tension spring 26 also extends longitudinally along the major axis of the pitot tube cover 1, as depicted in FIG. 8. The placement and characteristics of preloading tension spring 26 are such that it forces the two half cylinders 21, 22 apart, as depicted in FIG. 10A. Unless another agency (such as a latch described infra) is holding the two half cylinders 21, 22 together, they will spring apart due to the operation of preloading tension spring 26. This action will quickly release the pitot 100 from pitot tube cover 1.

The slotted disc 2 of the FIGS. 7A and 7C embodiments can be of a wide variety of thicknesses, depending upon the size of the pitot tube being held. The split discs of FIGS. 10A-10C preferably decrease in thickness from the outer circumference to the inner aperture 32. The difference is, for example, 3/32 of an inch decreasing to 3/64 of an inch. This results in a very flexible disc structure 2 when the cylinder halves 21, 22 are closed and the disc halves brought together. Despite the apparent flimsiness at the center of the split disc 2, a wide variety of pitot tubes 100 can be held firmly. This is because when the pitot tube is inserted the split discs prolapse towards the front of the pitot tube cover 1, as shown in FIGS. 11A-11D. This arrangement serves as a guide, and helps to hold the pitot tube 100 firmly within pitot tube cover 1. The use of two or more split discs 2 ensures a firm hold for a wide variety of pitot tubes sizes.

Figure 11A:
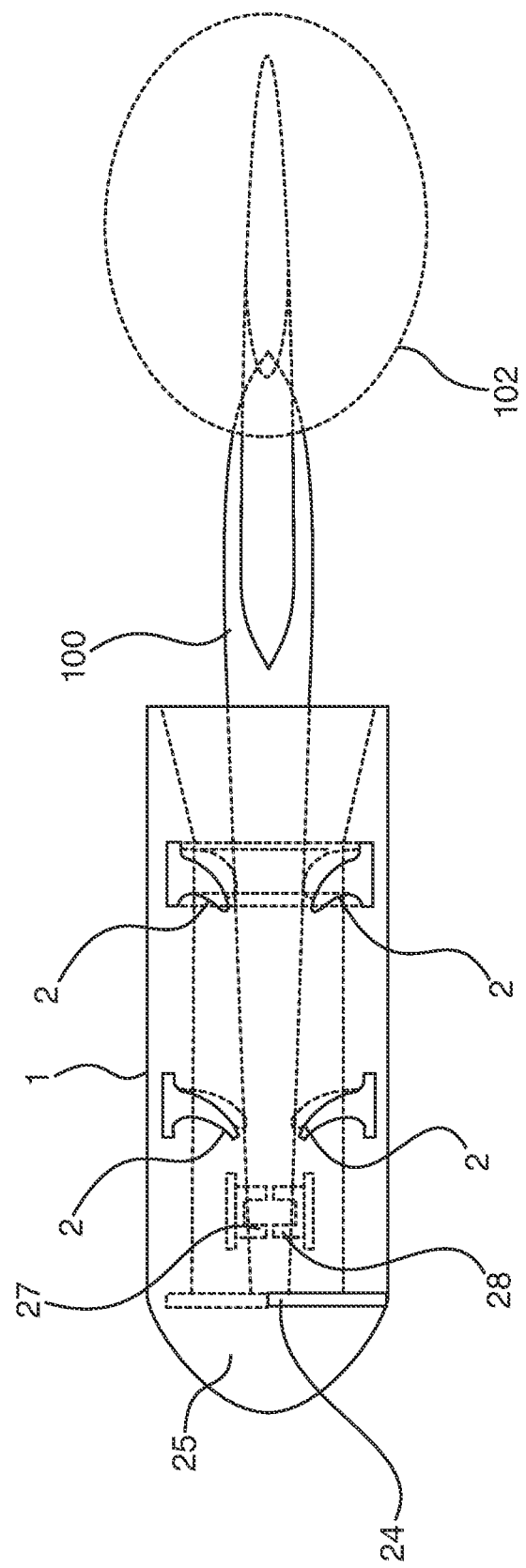
FIG. 11A is a top view of the FIG. 10 embodiments mounted on a pitot tube, and depicting the deformation of the split discs or hemi rings.
Figures 11B, 11C, 11D:
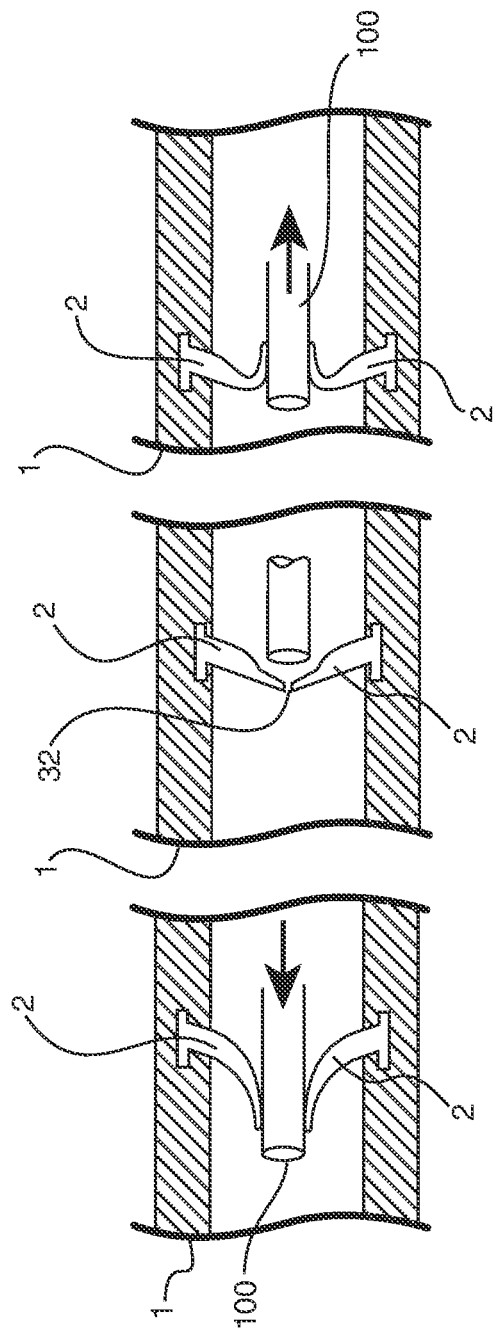
FIG. 11B is a side detailed interior view of the deformation of the split discs around an inserted pitot tube.
FIG. 11C is a side interior view of modified, biased membrane with a narrow aperture, which is deformed by the entry of a pitot tube.
FIG. 11D is a side interior view depicting the deformation of the split discs when a pitot tube cover is removed from the pitot tube.

A major problem with pitot tube covers is that they often are forced to slide off the pitot tube under conditions of high wind or vibration. This is addressed by the present design since the split discs are prolapsed in a forward direction due to the insertion of the pitot tube. When there is movement of the cover in the opposite direction (sliding it off the pitot tube) the thinned center of the split disc will resist this movement by prolapsing in the opposite direction, as depicted in FIG. 11D. These characteristics enhance the stability of the pitot tube cover 1 on a pitot tube 100. Consequently, problems with strong wind gusts, especially when tugging on the RFP flag 7, will be avoided.

Preferably, the split discs 2 are made of silicon, which is especially prone to adhering to the pitot tube 100 for both the forward and rearward prolapses of the split discs. Because of the slits 3 in the split discs 2 a wide range of different pitot tubes sizes can be accommodated with the same set of discs 2. This characteristic reduces the number of split disc changes that have to be made to a particular pitot tube cover 1.

Silicon is the preferred material for the split disc or hemi rings 2 due to the "stickiness" and flexibility of silicon structures. Further, the compression of the silicon structures, as they prolapse around and inserted pitot tube 100, creates a spring-like stored energy. The result is that when the latching structure (discussed in detail infra) is released, the two cylinder halves 21, 22 will spring apart due to the stored energy of the split discs. This action of the silicon split discs 2 is usually sufficient to obviate the need for the internal spring 26 in FIG. 9.

If, for some reason, the energy stored by the prolapsed silicon split discs 2 is insufficient to quickly open the two cylinder halves 21, 22, additional spring action will be required. One example is the internal spring 26 (FIG. 9). However, this arrangement is often complex to effect, and thus can be undesirably expensive.

Another simpler alternative is provided by the placement of a leaf spring 212 within the cylinder halves 21, 22 as they are closed, as depicted in FIGS. 15A-15C. While this approach is structurally simpler than the internal spring 26, the use of the leaf spring 212 makes application of the pitot tube cover 1 to a pitot tube 100 more complex.

It should be noted that there are certain complications in using the arrangement depicted in FIGS. 15A-15C. In particular, the interior of the pitot tube cover 1 will have to be modified with a notch 215 to hold the end of spring 212, which has a hole 213 and a pin 214 to hold spring 212 to cylinder half 22. Also, a hardened surface 216 would be added to permit the same purpose. The hardened surface 216 would also permit the end of the spring 212 to slide easily over the interior 14 to push the cylinder halved 21, 22 apart, quickly. Otherwise, the ends of the leaf spring might very well be forced into the material constituting the pitot tube cover, and not separate therefrom when the two halves 21, 22 of the pitot tube cover open and spring away from each other.

Another variation, as depicted in FIG. 15C, can be used to better ensure proper separation of the pitot tube cover 1 and the pitot tube 100. In this variation, instead of a living hinge 23, two magnets, 217, 218 are used to hold the two halves 21, 22 of the pitot tube together, opposite latch receptacle 209. When the latch 209 is released, the action of leaf spring 212 forces the two magnets 217, 218 apart to make certain there is tendencies for the pitot tube cover 1 to hold onto any part of the pitot tube 100. The only difficulty with this arrangement is that there is a potential for multiple parts to be scattered about the tarmac, or to possibly interact with other parts of the aircraft. Since loose debris can create problems for the aircraft, it is to be avoided unless there is a compelling reason for additional pieces to be justified.

Any number of split discs 2, or disc arrangements can be used within the split cylinder 21, 22 arrangement. For example, the FIG. 7C embodiment uses two split discs 2 and an end piece (24 or 25) to butt against the tip of the pitot tube 100. While silicon discs 2 are generally preferred, other support arrangements can also be useful.

Figure 16:
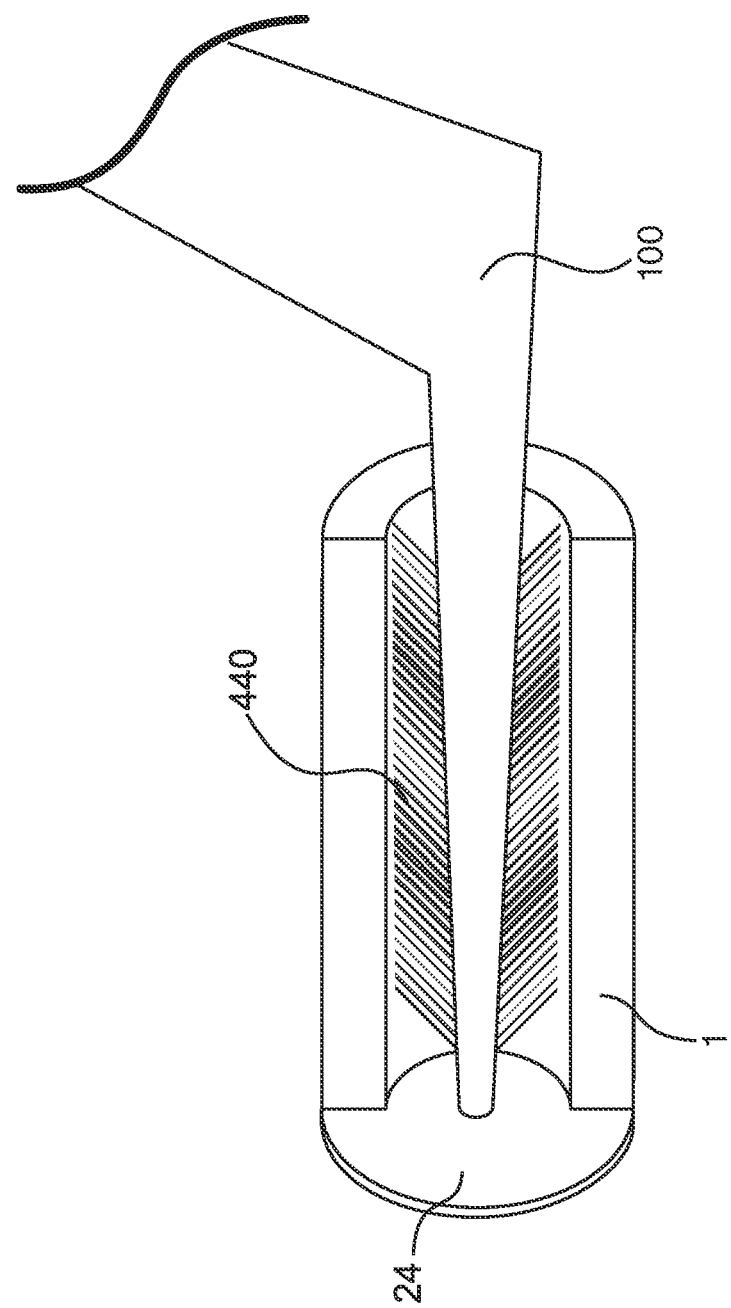
FIG. 16 is a pitot tube cover in which the split discs and membrane rings are eliminated and a series of silicon fibers are substituted therefore to hold the pitot tube within the pitot tube cover.

As one alternative, groups of silicon fibers 440 (as depicted in FIG. 16) can be suspended from the interior wall of the bore, extending towards a centerline of the bore 14. Groups of silicon fibers 440, generally spaced in groups to form two or three rings, one-half inch to 3/4-inch-wide, can be configured along the length of the bore 14. These will serve to support the pitot tube cover 1 around the pitot tube 100. Because the fibers 440 are silicon, the natural stickiness of the material will conform to and hold the pitot tube cover 1 to the pitot tube 100. The advantage of using areas with silicon fibers 440 is that a larger area of the pitot tube 100 can be held. The disadvantage is that the fibers 440 are permanent, and cannot be easily adjusted, as would be the case with a silicon disc 2.

While the spring action of the two cylinder halves 21, 22 of the pitot tube cover 1 is crucial to the automatic separation of the pitot tube cover 1 from the pitot tube 100, it is the latch mechanism which controls the timing of the separation operation. With the inventive split cylinder arrangement 21, 22, temperature activation is the triggering factor for automatic removal of the pitot tube cover from the pitot tube. This is an appropriate approach since pitot tubes are typically heated when an aircraft is powered up and begins to move. Accordingly, the pitot tube cover 1 should be removed prior to achieving complete tube heating, and must be removed before it begins to degrade due to the heating of the pitot tube 100.

There are situations when maintaining the cleanliness and integrity of the pitot tube 100 is more important than automatic self-removal of a pitot tube cover. In such a situation, the seals (from hemi discs 2) around the pitot tube would have to be extremely tight so as to minimize any migration of foreign particles to the open end of the pitot tube. In this type of arrangement, as depicted in FIGS. 14A and 14B, the apertures 32 in the silicon discs 2 would be sized to closely fit around the pitot tube 100. There would be no slits in the discs. The fit around the pitot tube would be so tight that only manual operation could be used to remove the pitot tube cover 1 from the tube 100.

While a split cylinder could be used for the non-self releasable arrangement, this is not an optimum configuration. Further, the latching mechanism would not be configured for automatic removal. Rather, the latching mechanism would merely be expedient to installing the discs 2 with membranes 18 in the body of the pitot tube cover. The silicon membrane has a stretchable hole 32 and a relatively rigid outer circumference structure or ring 39, and can firmly hold the pitot tube 100. The membranes 18 around the stretchable holes 32 can be used in conjunction with a flexible split ring guide, as depicted in FIG. 14C, that can be used to help work the pitot tube 100 into the pitot tube cover 1. The advantage of this approach is that a wide range of pitot tube sizes can be accommodated with the same cover 1.

In this variation, the disc 2 that is constituted by a thin, silicon sealing membrane, is entirely contiguous except for a small hole 32 in the center to receive the pitot tube 100. Preferably, the membrane disc 2 thickens from the center towards the outer circumference to better maintain a good mechanical grip on the pitot tube when inserted. The membrane 18 is supported by a rigid ring 39, that mounts to the inner wall of bore 14. Using a membrane that is entirely closed (except for a small hole 32 in the center) facilitates the maintenance of a clean pitot tube cover since foreign material generally cannot get past the sealing membrane disc 2.

It should be understood that a wide variety of different support and sealing discs 2 can be used within the concept of the inventive pitot tube cover 1. This is true for the embodiment of FIGS. 1-7, as well as the split cylinder arrangement of FIG. 8, or even the non-self removing embodiment of FIG. 14C. Further, the grip on the pitot tube 100 provided by the silicon membranes, or discs 2, seal the pitot tube cover 1 upon insertion of the pitot tube, thereby ensuring that debris cannot contaminate the pitot tube. Preferably, the pitot tube cover 1 will have at least one relatively thick slotted split disc 2 that is capable of guiding the pitot tube cover 1 around the pitot tube 100, while also having at least one thin sealing disc.

When the mounted on a pitot tube 100, as depicted in FIG. 8, the two half cylinders 21, 22 are normally positioned away from each other, and connected at a common edge only by living hinge 23 (and possibly spring 26). In use, the two half cylinders 21, 22 are closed around the pitot tube 100 and connected together with a latching mechanism constituted by hook 27 and keeper 28, as depicted in FIGS. 12A-12D. The latching mechanism is located proximate to the pitot tube tip 101, in housings 271 and 281, mounted in cylinder halves 21, 22, which is the hottest area of the pitot tube 100. Because the butt plate 24 is generally very close to pitot tube opening 101, heat is not transferred away from this area. Consequently, the hook and keeper arrangement, 27, 28 will quickly respond to the temperature rise caused by the heat at the pitot tube opening 101.

Figure 12A:
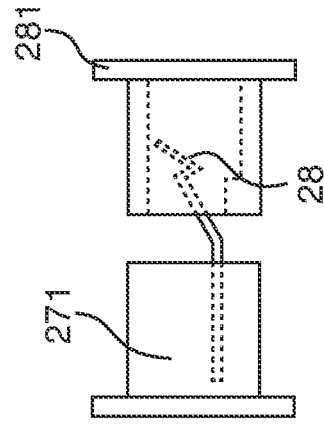
FIG. 12A depicts the housing for one perpendicular-oriented latch mechanism.
Figure 12B:
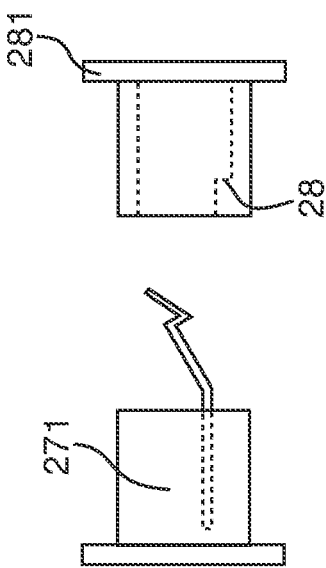
FIG. 12B depicts the latching mechanism configured for closure of the two cylinder halves.
Figure 12C:
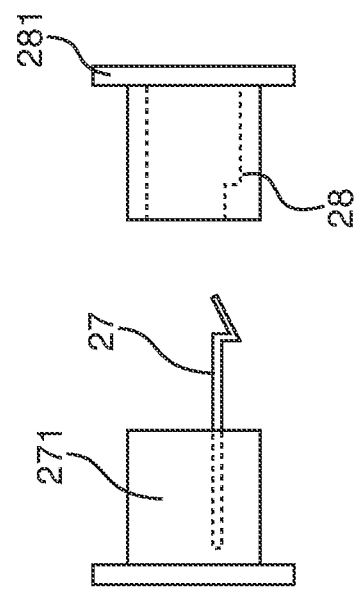
FIG. 12C depicts the operation of the latching tongue when deformed by the presence of high temperature.
Figure 12D:
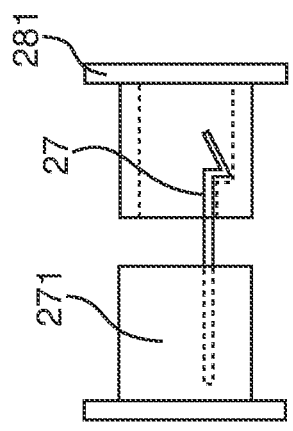
FIG. 12D depicts the separation of the two latching housings once the latching tongue is deformed.

Details of the hook and keeper arrangement 27, 28 are depicted in FIGS. 12A-12D. Upon powering up the aircraft, and thereby energizing the pitot tube 100 heating element (not shown), the temperature in the interior space behind butt plate 24, and near hook 27 will reach 130° F. within a few minutes. The hook 27 then changes its shape, as depicted in FIG. 12C. The change in the shape of hook 27 releases it from keeper 28, thereby allowing the pitot cover body halves 21, 22 to open to the angle preset by the tension spring 26. The pitot tube cover 1 will then be free of the pitot tube 100.

Figure 17A:
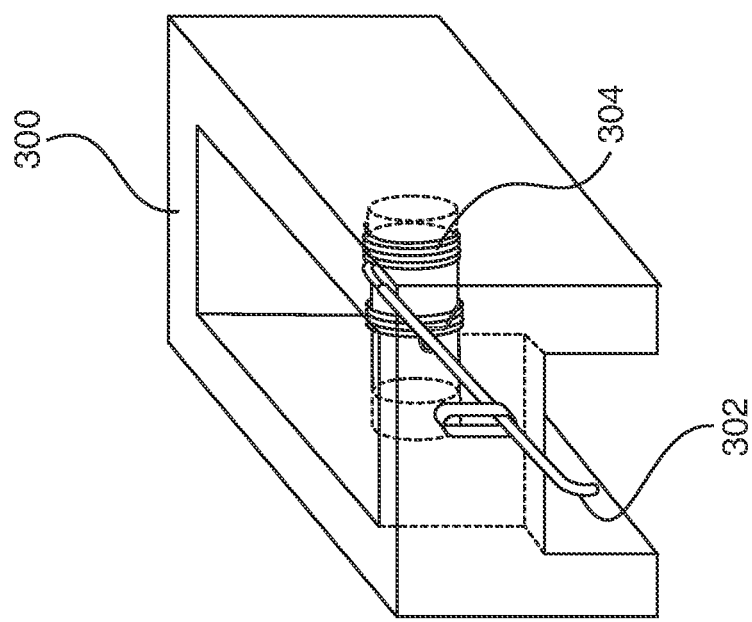
FIG. 17A is a side perspective view of a housing containing an alternative perpendicularly-aligned latching tongue.
Figure 17B:
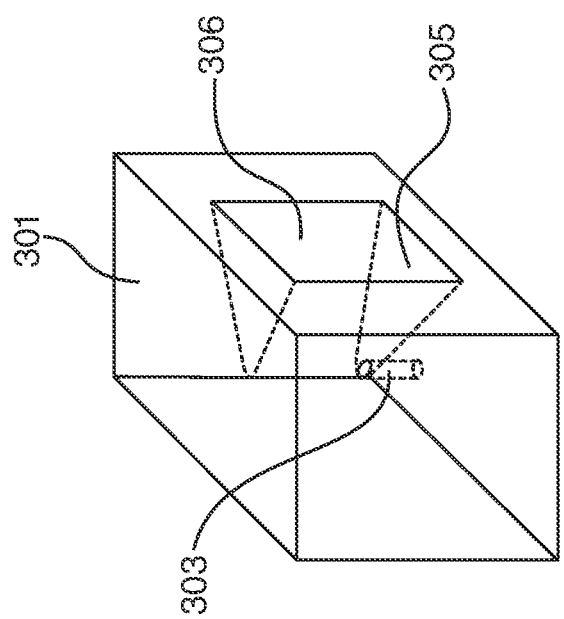
FIG. 17B is a side perspective view of a specifically configured receptacle for the latching tongue of the FIG. 17A.

A perpendicular latching arrangement, similar to that in FIGS. 12A-12D, is depicted in FIGS. 17A and 17B. This is arranged perpendicular (to the split line between the adjacent edges of the two cylinder halves 21, 22). The latching mechanism is contained in two housings, the receptacle housing 301 and the tongue housing 300. The tongue is a bent wire 302, which moves up and down under torsion created by a wound Nitinol® wire 304. The torsion on the tongue 302 forces it downwards so that it will be forced into receptacle 303 of the receptacle housing 301. When the two cylinder halves 21, 22 (not shown in FIGS. 17A and 17 B) are brought together, the two housings 301 and 300 butt against each other directly. This action forces tongue 302 against horizontal incline 305 in housing 301. The inclined 305 pushes the tongue 302 towards receptacle 303. Vertical guiding walls 306 provide similar guidance so that tongue 302 cannot miss receptacle 303 by deviating laterally.

The embodiment of FIGS. 17A and 17B is a simple, reusable latching system for a self-disengaging pitot tube cover 1. The Nitinol® wire winding 304 reacts to the increased temperature in the same manner that the hook or tongue 27 does, as described supra. The only drawback of the subject embodiment is the vulnerability of tongue hook 302 to impact damage when the pitot tube cover is disengaged from the pitot tube. Another potential drawback of the subject embodiment is the expense of the Nitinol® winding 304, and it's vulnerability to potential damage when the disengaged pitot tube cover 1 comes into forcible contact with the tarmac.

On the opposite side of the latching mechanism depicted in FIGS. 17A, 17B is a hinge arrangement. In some embodiments, this would be constituted by a living hinge of the same material as the rest of the pitot tube cover shell. The embodiment of FIGS. 18A and 18B disclose a hinge arrangement that is detachable. The first cylinder half 21 includes a hook complement 50 with a holding flange 54 and a lifting surface 52, as depicted in FIG. 18B. This structure interacts with the holding component 51 and its lifting flange 53, as depicted in FIG. 18A when the two cylinder halves 21, 22 are together, and in FIG. 18B when the latching mechanism separates and the two cylinder halves are pushed apart. In this particular embodiment, the two cylinder halves 21, 22 are entirely separated by the action depicted in FIG. 18B.

The advantage of the FIGS. 18A and 18B embodiment is that complete separation of the two cylinder halves 21, 22 takes place easily and efficiently, completely clearing pitot tube 1 upon the triggering of disengagement.

The pitot tube cover body halves 21, 22 exterior surface can be coated with a silver Mylar film, or some other highly reflective material. This acts to mitigate the heating of the pitot tube cover interior while in direct sunlight or on a hot ramp. This measure is necessarily because direct sunlight on a hot ramp could result in undesired activation of the latch hook 27, and release of the pitot tube 100 by pitot tube cover 1 even when the aircraft has not been started, or the pitot tube heated.

As is well-known, a major problem with pitot tube covers in general is the heating of the pitot tube 100, especially at the tube tip opening 101. Because of the temperatures generated, special materials and arrangements have to be made, as described with previous embodiments of the present invention supra. Another inventive approach is the use of split discs or hemi rings 2, as depicted in FIG. 10A-C. The hemi rings 2 are radially-segmented with centered holes 32, and slots 3 radiating from the center holes 32. The hemi-rings 2 are positioned within the interior of the pitot tube cover 1 so that when the half cylinders 21, 22 of the pitot tube cover are brought together, the hemi rings form a single segmented channel to guide, stabilize and isolate the pitot tube cover 1 from the pitot tube body 100. The hemi-rings 2 are made of a high-temperature silicon such as RTV, or a material having similar properties, so as to withstand temperatures in excess of 500° F. As a result, possible melting or burning that could contaminate the pitot tube 100 is avoided.

Because the hemi-rings 2 are made of a flexible silicone or similar material, they can provide the flexibility necessary to accommodate various sizes and shapes of pitot tubes 100. Further, with the pitot tube body cylinder halves 21, 22 closed the forward most hemi-rings 2 provided an air chamber between the butt plate 24 and the hemi-ring 2 for rapid conductive heating of the latch structure, such as hook 27 so as to promote rapid operation thereof.

In certain low temperature applications, or where air pressure alone removes the pitot tube cover 1, the pitot tube cover 1 body halves 21, 22 can consist of low-to-medium density polymer, such as cross-linked polyethylene foam or polypropylene. These materials are lightweight and resistant to aviation fuels, solvents and most chemicals. Further, these materials withstand temperatures of up to 250° F. As a result, these relatively soft materials mitigate the problem of foreign object debris on runways, taxiways, or ramps.

In order to facilitate easy mounting of the pitot tube cover 1, the two half cylinders 21, 22 are latched together at one pair of adjacent edges using the connecting structure such as that depicted in FIG. 12A-D. The closed pitot tube cover 1 is then fit over the pitot tube 100, rear end first. Because of slots 3 and center hole 32, the hemi rings 2 are able to flex to accommodate the entry of pitot tube 100 into the pitot tube cover. This flexing is depicted in FIGS. 11A-11D. This arrangement serves to tightly hold the pitot tube 100 within the pitot tube cover 1. It also accommodates a wide range of different pitot tubes sizes and configurations. Further, the hemi rings 2 can be moved, removed, or increased in number, and different sizes of center hole 32 provided to accommodate different sizes of pitot tubes.

A major issue in the operation of aircraft is the level of assurance that ground and maintenance personnel will remove pitot tube covers before aircraft are sent into the air. Warning flags, such as 7 in FIGS. 1-5, have to be attached to the pitot tube covers 1. However, this brings an additional set of problems. Some of these have been discussed supra with regard to previous embodiments, and an additional solution is provided by the embodiment of FIG. 10A-C. For example, the embodiment of FIGS. 4 and 5, while solving many problems, introduces additional complications. Some of these are addressed by a slotted flange 34 which is formed as part of the pitot cover body at hinge 23. The flange 34 can be used to hold warning flags 7. The flange 34 can also include eyelets 36 for optional attachments such as lanyards and the like. The purpose of those structures is to stabilize movement of the flag 7 caused by air flow.

Very often it has been found expedient to attach pitot tube covers to other exterior airframe probes in proximity to the pitot tubes. These structures can include static ports, AO (angle of attack) vanes, AOA ports, and the like. Very often there are separate covers for each of these compounds to mitigate contamination or damage. Some operators keep these covers linked together with lanyards to ensure that they are all installed and removed together. This is one of the purposes of islet 36.

There are additional embodiments of the present invention to achieve effective and timely self-removal of pitot tube covers 1 before the aircraft takes off, in those cases where the pitot tube covers 1 have not been removed. One such embodiment is depicted in FIG. 13A, and utilizes a hollow nosecone 25 to contain additional components necessary for the additional functionalities.

Included in the space provided in nosecone 25 is a GPS receiver module 42, GPS microcontroller battery 43, microcontroller 44, latch battery 45, and a portion of the GPS receiver antenna wire 41. The latch battery 45 operates to deform the latch hook 27 (mounted in housing 271) in the same manner as would occur at a heightened temperature (as depicted in the FIG. 10 embodiment). Because of the microprocessor 44 control, a precise time for releasing hook 27, and thus opening the two halves 21, 22 of pitot tube cover 1 can be effected.

An additional component is required within the pitot tube cover body, microswitch 40. When the pitot tube 100 is inserted into the pitot tube cover 1 through opening 15, microswitch 40 is pushed forward to allow power up the GPS receiver module 42. The information provided by the GPS receiver (and its antenna 41, which can extend into flag 7) provide information to microcontroller 44 which determines when a precise speed (or location) has been reached by the aircraft. Once a predetermined speed has been reached, the microcontroller initiates power from latch battery 45 to deform latch 27, which then releases to allow the pitot tube cover to open. Using this embodiment, precise instructions can be provided for the opening of the pitot tube cover 1. Further, external signals can be sent to operate the microcontroller 44 to release the latching mechanism 27, 28, upon the initiative of an operator.

It should be understood that when power from latch battery 45 deforms latch 27 (preferably a shaped-memory alloy (SMA) such as Nitinol®) the latch 27 is heated due to the resistance of the SMA to the applied current. This causes the shaped-memory alloy to heat much more quickly than would be permitted by convection heating from the pitot tube within the cover. Thus, the activation of the latch 27 can be more accurately determined in order to better time the release of the cover 1 from the pitot tube 100.

A wide variety of different latching mechanisms are described throughout the present application, and many of them can be used or adapted to the FIG. 13 embodiments. Further, while most of the latching mechanisms described in the present application rely upon SMA's, other metals can be used. For example, any metal can be used as the latch, which is controlled by an electromechanical mechanism that is activated by the microprocessor 44 controlled latch battery 45. However, in one preferred embodiment of the present invention, an SMA is always used since it provides a backup system. If, for some reason, the current from latch flattery 45 fails, the latch will still be operated by the ambient heat within the pitot tube cover 1. As such, the use of an SMA, such as Nitinol®, provides an excellent failsafe, which is critical to pitot tube cover removal.

Figure 13B:
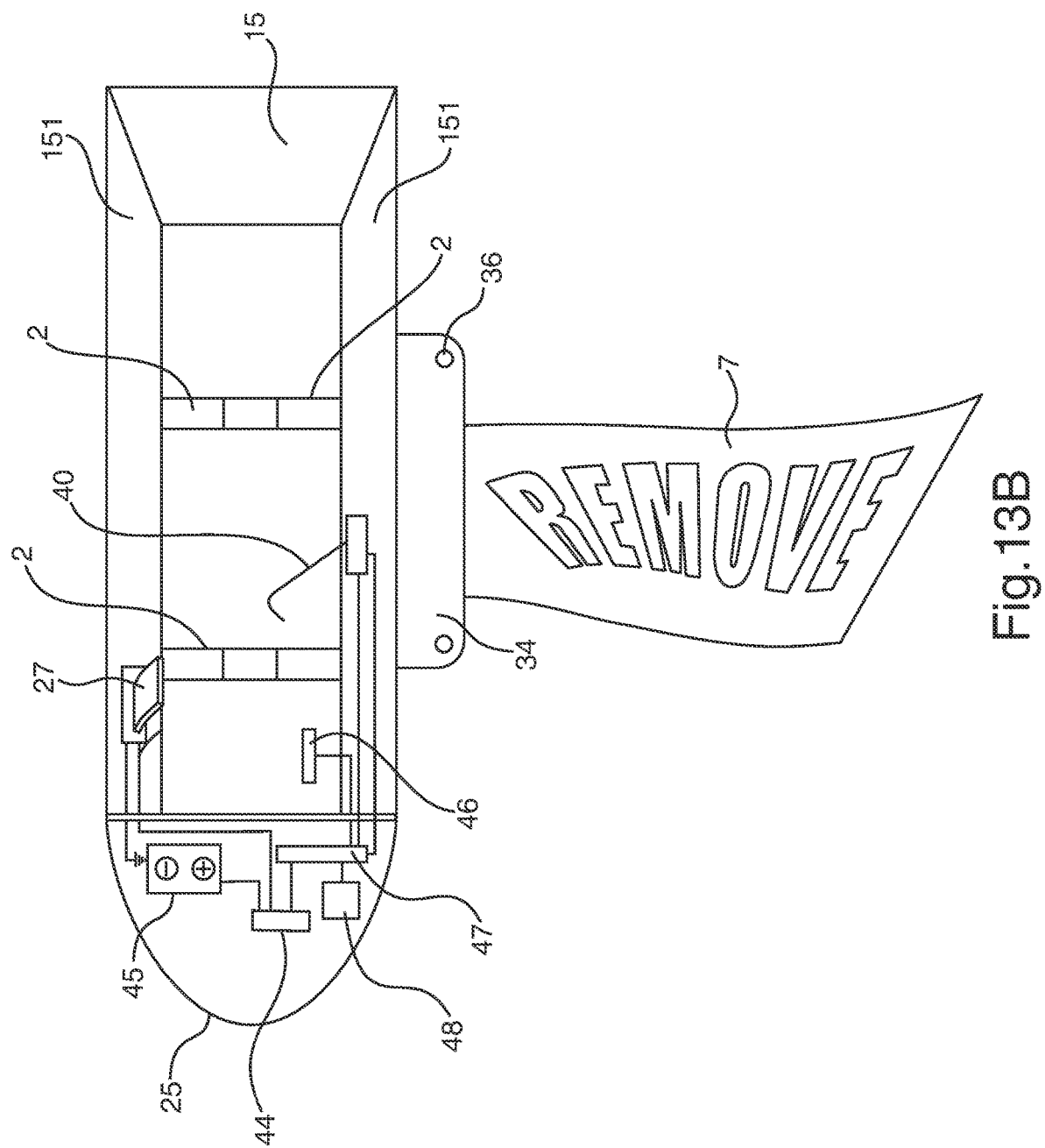
FIG. 13B is a side interior view of another embodiment of the present invention that utilizes an internal temperature sensor to trigger release of the latch holding the two cylinder halves together.

In another variation of the FIG. 13A, 13B embodiments, the GPS receiver module 42 and antenna 41 are replaced by a small turbine wheel (much like the toy siren whistle sold by Amazon.com). The nose portion 25 is modified to have air input apertures and air escape openings after the turbine wheel. Ram air enters the nosecone 25 through the air apertures, passes through and causes the turbine to spin. There is an optical or magnetic RPMs sensor that feeds data to the microcontroller 44. This data is used in the correlation of the RPM to a specified airspeed. Upon reaching a specified airspeed, the microcontroller 43 energizes latch 27 to release it from keeper 28 attached the opposing body half 22 of the pitot tube cover 1. This action allows the two body halves 21, 22 to open to the extent allowed by the preset tension spring 26. As a result, the pitot tube cover 1 can fall harmlessly off of the pitot tube 100 precisely at predetermined conditions.

It should be understood that any number of different types of sensors 46 in FIG. 13B can be used along with microcontroller 44 in order to control latch 27. These can include, but not be limited to, vibration sensors, temperature sensors, pressure sensors or sound sensors (received by transceiver 49 in FIG. 13A). Further, a remote radio signal can also be used to trigger release of hook structure 27, and the separation of the pitot tube cover 1 from pitot tube 100.

A single temperature sensor 42 is depicted in the FIG. 13A, 13B embodiments. The embodiment of FIG. 13A depicts a single temperature sensor 42. While this is a preferred embodiment, multiple sensors can be used if appropriate. A single temperature sensor 42 could be used with a properly programmed microcontroller 44 to detect changes in temperature. This would allow a determination of the proper separation temperature so as to provide an immediate indication of pitot tube surface heating. By relying upon a way to read the change in temperature, the absolute temperature ceases to be a determining factor. This means that environmental conditions, such as −5° F. or 50° F. the microcontroller 44 is sensing a relatively stable temperature with the pitot tube cover 1 in place with no heat being applied. Upon application of the pitot heater (by the cockpit crew, or in some instances by attaching ground power to the aircraft), the pitot tube begins to increase temperature very rapidly. A sensor arrangement which detects the rapid change in temperature would be able to provide a quick response in activating the battery-powered latch 27 to release the pitot tube cover 1 at an appropriate time.

It should be understood that the sensors 46 (FIG. 13B) can be placed almost anywhere within the pitot tube cover 1, as long as they do not interfere with the placement of the cover onto the pitot tube 100. Such specific placement can compensate for ambient conditions that might otherwise alter the operation of any of the release activation components of the pitot tube cover 1, such as Nitinol® wire, thermal fuses, expandable wax cylinders, or specific types of sensors 46.

Besides the placement of sensors 46 in specific locations within the pitot tube cover 1, the microprocessor 44 can be adjusted so that once a temperature of 135° F. (or its operational equivalent) should be detected, the latching mechanisms will operate, opening the pitot tube cover, despite ambient conditions that might otherwise delay the opening of the pitot tube cover. This can be done by either a single sensor, or multiple sensors, which allow the microcontroller 44 to monitor the rate of changes in the temperature so as to apply current to the shape memory alloy (preferably Nitinol®) at the most appropriate time.

The embodiments of both FIGS. 13A and 13B can be included within a single physical package. Such an arrangement, with transceiver 49, would permit a flight deck alert arrangement in which the crew would be appraised of the temperature and condition of the pitot tube cover 1. When combined with detection of temperature change, an early warning could be provided to the flight crew so they could manually send an eject signal through the transceiver 49 to immediately release latch 27, thereby allowing the separation of the halves of the pitot tube cover 1. The alert mechanism in the cockpit could be constituted by any convenient package for providing input at the cockpit and a control signal to transceiver 49. With the appropriate switching gear in the cockpit and dedicated transceiver, the cockpit crew can control the pitot tube cover 1 when informed of its status.

With the embodiment of FIG. 13A, the flight crew can control detection of pitot tube position, as well as energizing pitot tube removal. However, there is a time delay between the signal sent to heat the SMA constituting the latches of the pitot tube covers and the transition point at which the latch is released due to contraction of the SMA material constituting the latches. Further, this places an additional burden on the flight crew to monitor the pitot tube covers, and the state of the pitot tube covers once the ejection signals have been sent. Depending upon the configuration of the latch, and the strength of the latch battery, a few minutes may be required before the transition point is reached. This substantial time delay can create an additional burden for the flight crew. Consequently, other variations in latch design and release control may constitute more effective arrangements. Even with the additional burden on the flight crew, the direct flight crew control of the pitot tube covers can constitute a very effective fail-safe mechanism.

It should be noted that the latch mechanism 27 depicted in FIGS. 13A and 13B (and as further described with respect to FIGS. 8, 10A, and 12A-D) is not the only latch mechanism that can be used with the particular embodiments of FIGS. 13A and 13B. Rather, the same cylinder configuration can employ the latching mechanisms depicted in FIGS. 19A, 19B, 20A-C, 21A-C, 22A-C, 23, and 24A-D. The mechanical arrangements depicted are described infra. This can be done without changing the configuration of the two cylinder halves.

The SMA latch is constituted by wire 50 in FIGS. 19A, 19B, 20A-C, 21A-C, 22A-C, 23, and 24A-D. Preferably this is SMA wire 50 is Nitinol®. This material is well known as contracting in length (while maintaining the same volume) when heated. The use of the wire configuration makes control of the Nitinol® easier to affect, and more sensitive to mere temperature gradients than absolute temperatures. This latter characteristic is particularly applicable for the conditions during which pitot tube covers must be removed. The control mechanism used in the FIGS. 13A, 13B embodiments can be somewhat simplified if only temperature gradient is considered rather than absolute temperature. This is the approach taken in the preferred body embodiment of FIG. 13B.

Figure 22C:
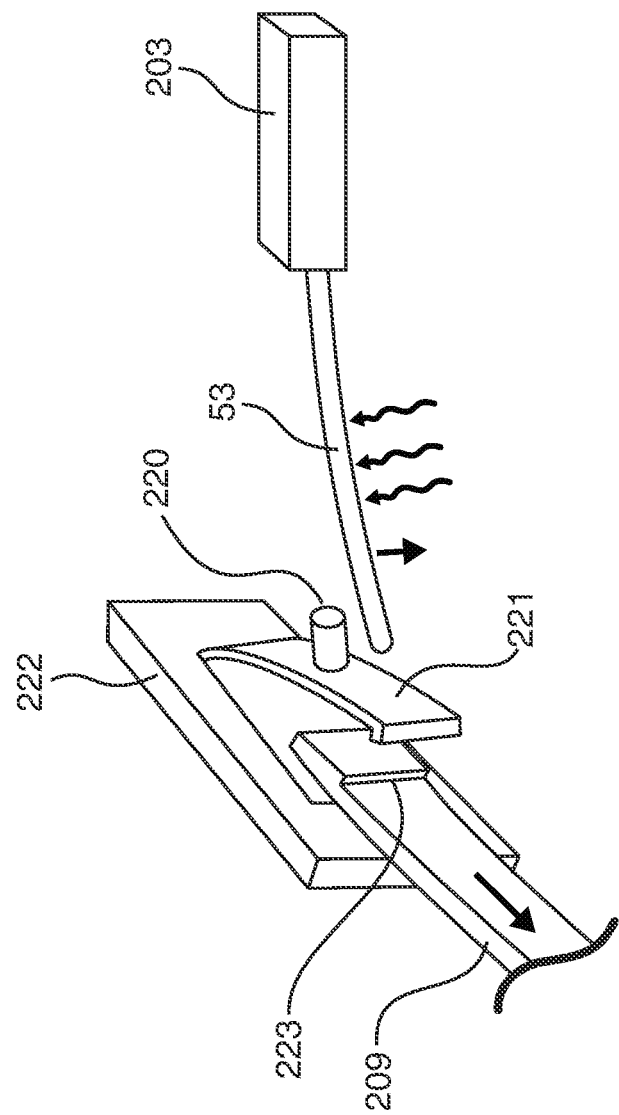
FIG. 22C is a side perspective detailed view of a latching mechanism used with the temperature release system of FIGS. 22A and 22B.

One preferred embodiment of the FIG. 13B system would use the latch configuration of FIGS. 22A-C. The initial conditions would be a starting temperature of 30° F. with a phase change temperature of wire 50 to be between 135-140° F. Under these circumstances, the transition point of the Nitinol® wire 50 should be under 60 seconds. In this example, the diameter of the wire would be 0.093 inches and the maximum current required for a 60-second transition would be 2 amps. Further, the wire length would be approximately 1.75 inches. The batteries needed to operate the system would be approximately the size of standard AA batteries. However, a single high-capacity lithium AA battery would be most appropriate. It should be understood that differences in wire diameter, battery sizes and transition times can be accommodated within the concept of the present invention, and wire size, the actuation or transition time for latch operation can be closely controlled.

The aforementioned latching mechanism, as depicted in FIGS. 10, 12A-12D, 17A and 17B, require a substantial intrusion into the plastic bodies of the two cylinder halves 21, 22. Which the pitot tube cover 1 is constituted essentially by polypropylene foam (for special applications), such intrusions can result in substantial degradation to the overall structure of the pitot tube cover 1. This might result in undesired or premature release of the pitot tube cover from the pitot tube 100. Consequently, a smaller, less intrusive latching mechanism may be preferred.

This variant latching mechanism is found in FIGS. 19A, 19B and 20A-20D. In all of these figures, latching is effected by means of a Nitinol® wire 50. This wire is laid along a groove 211 in one of the cylinder halves 21. The entire latching mechanism is contained within the groove 211 in one of the cylinders halves 21, and a locking aperture 51, to receive a protruding end 52 of the Nitinol® wire 50 is on plate 24. The protruding wire end 52 is guided to locking aperture 51 by ramp 241. This ramp can also have a groove (not shown) in it to help direct the protruding end 52 of the Nitinol® wire 50 into locking aperture 51. Virtually any kind of the structure can serve the function of ramp 241, but should be of a hard heat-resistant material, such as Teflon®.

One end of Nitinol® wire 50 is held at an anchor point 53, while the other end can protrude into locking aperture 51. The locking aperture 51 is formed in the hardened plate 24 (preferably a material such as Teflon® as described supra). Because locking aperture 51 is in a hard material, no damage is done to it by the protruding end 51. Likewise, ramp 241 is of a hard material, such as Teflon®, and does not suffer any degradation when guiding the protruding end 52 into locking aperture 51.

Since wire 50 is made of Nitinol®, the wire structure 50 can be relied upon to contract within a certain temperature range. The length of the wire, especially protruding end 52 is calculated so that once the correct temperature range is achieved, the contraction of the Nitinol® wire 50 removes protruding end 52 from aperture 51, thereby releasing the two cylinder halves 21, 22 from each other. Of course, it is necessary that the length, exact constituency of the wire, and the desired temperature range of be coordinated with the length of protruding end 52. This is easily achieved by selecting the appropriate temperature range and length of the Nitinol® wire 50 to be used as a latching mechanism.

It has been discovered that the Nitinol® wire performs more precisely if it is kept under tension. To this end, a keeper spring 202 (on FIGS. 21A-C) is attached to the Nitinol® wire 50 near the protruding end 52 in such a manner as to maintain spring pressure to force protruding end 52 through locking aperture 51.

It should be noted that hemi rings 2 can be sized so that they fit into slots 39 (not shown) formed in the interior surfaces of both cylinder halves 21, 22. The use of such slots secures the hemi rings 31 so that they in turn can properly secure the pitot tube 100 when it is placed in the center aperture 32 of the hemi rings 2, as pitot tube cover 1 is installed on the pitot tube 100.

For purposes of the present invention, the Nitinol® wire's length (as well as the specific constituency of the wire) should be selected so that the protruding end 52 is removed from the aperture at approximately 130° F. Of course, the length of the protruding end 52 is entirely removed from aperture 51 at 130° or above.

In some embodiments, it may be desirable to thicken the protruding end 52 of the Nitinol® wire 50 in order to prevent bending or other deformation of the relatively thin wire. In such a case, the locking aperture 51 would also be expanded to receive the thickened portion of the protruding end 52. Further, the thickened portion of the protruding end 52 can have a rounded or beveled tip to achieve greater ease of movement when the protruding end slides along ramp 241.

Preferably, the Nitinol® wire 50 in this embodiment is selected so that it contracts 4.5% when heated to above 130° F. The location of the Nitinol® wire in slot 211 exposes the Nitinol® wire 50 in relatively close proximity to the pitot tube 100. This means that as soon as the pitot tube heats to a particular temperature, the Nitinol® wire 50 will react as described supra.

Because hemi rings 2 are in the slots on the interior of both cylinder halves 21, 22, guide holes 201 must be formed in the hemi rings 2 in order to allow the Nitinol® wire to move freely within channel 29. These guide holes 201 are not necessary if no slots 39 are cut into the interior of the cylinder halves 21, 22. Multiple guide holes 201 can be cut in the hemi rings 2 in order to facilitate ease of installation of the hemi rings 2 when the slots 39 are cut in the interiors of cylinder halves 21, 22.

It should be understood that the tension provided by keeper spring 202 must be carefully balanced with the length and tension on Nitinol® wire 50 in order to make certain that the wire 50 performs as expected at the desired temperatures. This operation requires free movement of the wire within channel 211 and, if applicable, guide holes 201 in hemi rings 2. The desired results also require an appropriate wire anchor point 53 that does not cause deformation and thus movement of the material constituting cylinder half 21. The anchor point 53 can be made of harder material than the rest of the cylinder half 21. For example, the anchor point 53 could be made of the same material constituting butt plate 24.

Figure 19A:
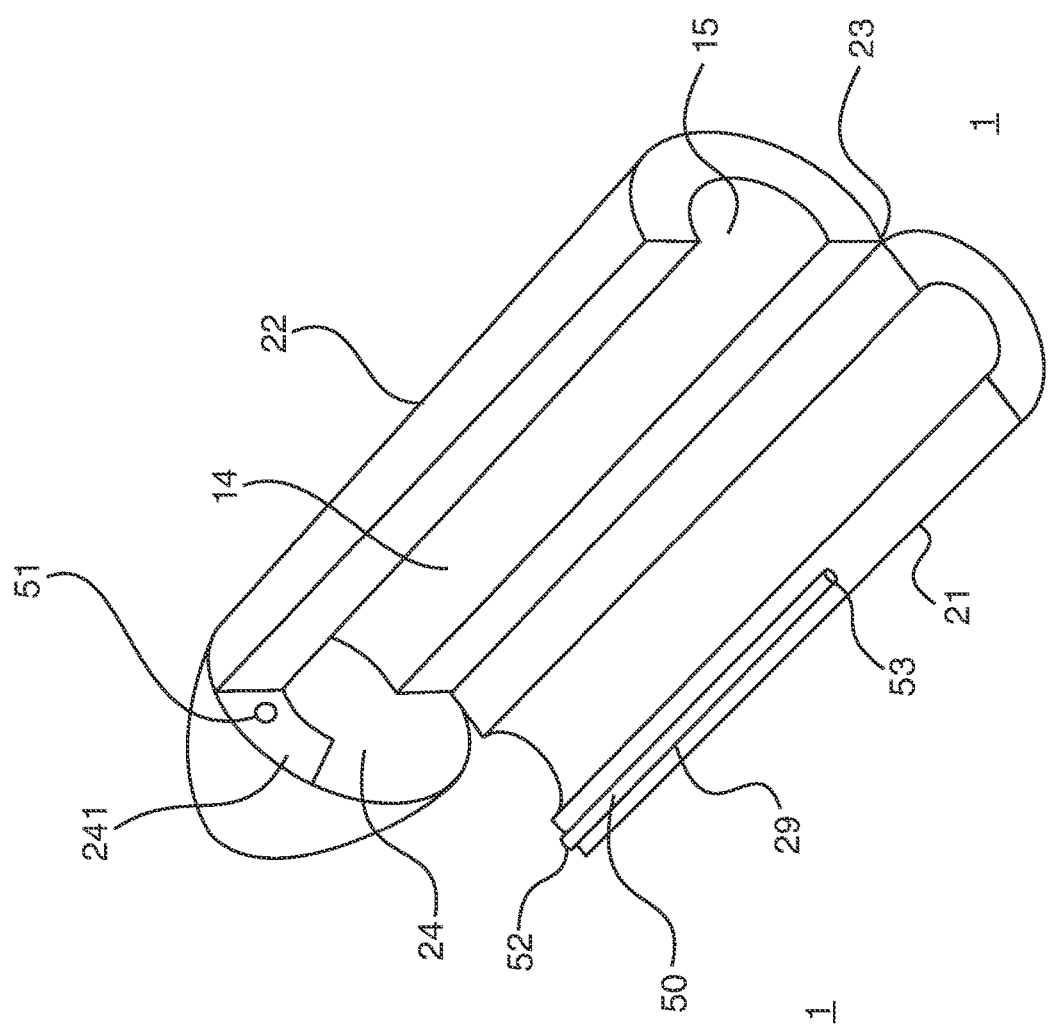
FIG. 19A is a top perspective view of a pitot tube cover depicting the placement of a linear latching mechanism.
Figure 19B:
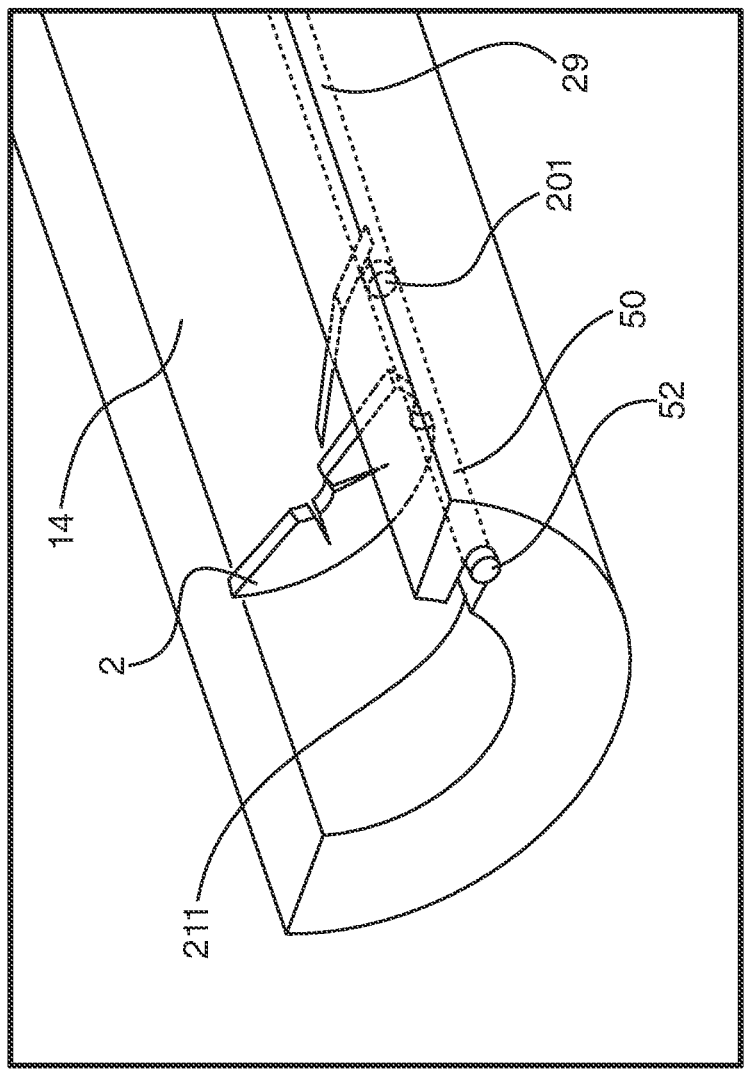
FIG. 19B is a sectional perspective front view of the arrangement of FIG. 19A, depicting the location of the linear latch, and the relationship between the linear latching mechanism and an interfacing split disc.

The foregoing arrangement depicted in FIGS. 19A and 19B requires a hinged permanent connection 23 between adjacent edges of the two halves of the pitot tube cover 1 (as depicted in FIGS. 8 and 9), preferably, the connector, which serves as a hinge 23 (in FIG. 19). The hinge 23 is generally part of the material constituting the two cover halves 21, 22, and is often characterized as a living hinge, depending upon the exact material constituting the two cover halves 21, 22. However, the hinge 23 can be made of other materials, including metallic materials, and even materials having spring-like characteristics.

One advantage of a pitot tube cover 1 in which the two halves 21, 22 spring of part, is that the pitot tube cover may be reusable. Very often, when pitot tube covers 1 are not removed prior to flight by maintenance personnel, self-disengaging pitot tube covers (such as those discussed supra) will be released or disengaged from the pitot tube on the taxi area, or even the runway. In both instances, the pitot tube covers 1 can be recovered and possibly reused, an economic benefit.

In order for this to be accomplished with the aforementioned hinged arrangement, it is necessary that the hinge 23, and the driving spring (such as 26 in FIG. 9), be sufficiently robust so that the pitot tube cover halves 21, 22 can be closed together and reinstalled on the pitot tube 100. Another advantage of the present design is that it is unlikely that any part of the pitot tube cover 1 might remain attached to the pitot tube 100 after the self-disengagement process.

One key element in the operability of the multiple latch designs in various embodiments of the present invention, is a shape-memory alloy known as Nitinol® wire 50. Nitinol® is a nickel-titanium alloy that when heated past a specific temperature undergoes a phase shift, thereby shortening the wire. This process is also reversible under the correct circumstances. Normally a cooling of 3-5° C. below the temperature and temperature at which the shortening phase-change normally occurs will allow the wire 50 to stretch, if the wire is under appropriate stress. It should be noted that a wide variety of different combinations of nickel and titanium can be used depending upon the amount of wire movement and temperature range that are deemed appropriate for a particular pitot tube cover 1.

In one preferred embodiment, Nitinol® wire 50 is approximately 200 µm in diameter and 60 mm long. Most of the length of the wire 50 will be within housing 203, which is integrated longitudinally within the cover half 22. The wire will be open to the interior of the pitot tube cover body, thus exposing wire 50 to the ambient temperature within the closed pitot tube cover. Preferably, wire housing 203 will be of a composite material such as carbon fiber.

Another embodiment is depicted in FIGS. 20A-C and 21A-C. In this arrangement, protruding end 52 is covered by locking pin 204. The other end of the Nitinol® wire 50, is attached to an anchor point 210 at the end of the wire housing 203. In this particular embodiment, the Nitinol® wire 50 phase change occurs when the temperature reaches between 55° and 60° C. This is achieved by convective and infrared heating of the environment within the closed pitot cover body. This occurs upon power up of the aircraft in which the pitot tube is mounted. The temperature of the pitot tube surface will reach approximately 150° C.

In this embodiment, the Nitinol® wire 50 must be under some stress in order to constantly and completely return to its original length upon cooling down approximately 3-5° C. below the heating phase-change temperature of 150° C. This is necessary to allow the pitot cover cylinder halves 21, 22 to be re-opposed so as to re-close for reuse.

In order for the two halves 21, 22 to come together and form a complete and closed pitot tube cover 1, engagement component 209 from one half 21 must interface with receiver component 207. Engagement component 209 is curved in shape along the same radius as the half 21 that contains the engagement component 209 as an integral part. As the two halves 21, 22 are brought together, engagement ramp 211 moves the locking pin 204 backwards against the tension created by biasing spring 202. This will allow the locking pin 204 to be manipulated into receiving engagement component 208 as the two halves 21, 22 are pressed together. Biasing spring 202 functions to maintain tension on the Nitinol® wire 50, and maintains engagement of the locking pin 204 through a hole 205 in locking pin housing 206. Preferably, the locking pin housing 206 is integral with receiver component 207, which is formed as part of cover half 22.

Various modifications to latching system, such as the engagement component 209 fall within the concept of the present invention. For example, the height of engagement component 209 can be increased from the open edge with ramp 211 towards cylinder half 21 so that engagement component 209 fits more tightly within housing 207 as cylinder halves 21, 22 are brought together. This creates an additional lateral force between the two cylinder halves 21, 22 so that when engagement component 209 is released (with the withdrawal locking pin 204) additional forces are generated against living hinge 23. If, instead of the hinge 23, the hinging arrangement of FIG. 15C, or FIGS. 18A, 18B is used, complete separation of the two cylinder halves 21, 22 is more swiftly accomplished because of the lateral force generated by the thickened portion of engagement complement 209.

FIGS. 22A-C depict another variation of the arrangement depicted in FIGS. 19A-B and 20A-C. One difference is that the variation depicted in FIGS. 22A and 22B is that the latching mechanism is further away from the front of the cylinder half 22 than that found in the FIGS. 19A-C and 28A-C variation. In the variation of FIGS. 22A-C, the Nitinol® wire 50 is not under tension, as is the case in the variations of FIGS. 19-21. Rather, the Nitinol® wire is deployed at its full length, with a thickness of approximately 1 mm in diameter. The only thing holding the Nitinol® wire is its length and its straight configuration. Any changes to the Nitinol® wire render it useless for the same purpose. Consequently, the embodiment of FIGS. 22A-C are generally "one-use" arrangements, in which the Nitinol® wire must be replaced after each temperature activation.

FIG. 22A depicts the latching mechanism in the locked position, with Nitinol® wire 50 fully extended. The end of the Nitinol® wire 50 rests against a holding pin 220 on the spring-driven latch mechanism. The spring can be a pre-loaded polymer or carbon fiber, as well as a standard metal spring configuration. Once the temperature in the pitot tube cover 1 reaches a predetermined level (based upon the temperature of the pitot tube and the predesigned characteristics of the Nitinol® wire) the wire will warp or bend to a sufficient extent that it will move from the latch (in virtually any direction), as depicted in FIG. 22B.

Once the Nitinol® wire 50 deforms, for example, as depicted in FIG. 22B, the spring-loaded latch operates as depicted in FIG. 22C. Upon release of the spring 221 from the keeper 223 (which is attached to the other cylinder half) engagement component 209 is free to move. Motivation for this movement (separation of halves 21, 22) can be provided by any number of the spring structures described supra, preferably compressed silicon split rings 2. It is noted that while one type of spring-loaded mechanism for releasing the latch and freeing the cylinder halves 21, 22 from each other, can be used, any number of different spring mechanism are acceptable within the concept of the present invention. As long as the latch engagement mechanism 209 is released quickly, the concept of the present invention has been followed. Once Nitinol® wire 50 is bent, it can be removed from wire holder 203, and a new straight Nitinol® wire inserted to replace it. Then, the pitot tube cover 1 can be reused.

It is noted that a number of different temperature ranges have been provided with regard to the conditions necessary to create the necessary triggering movement in the Nitinol® wire. The different temperature ranges depend upon the different materials used for the pitot tube cover 1, the size and heating parameters of the pitot tube 100, and the size and configuration of the particular Nitinol® wire used for triggering purposes. The form of the Nitinol® trigger will vary based upon the size of the pitot tube cover 1, as well as the environment in which the cover is used. However, whatever the configuration, Nitinol® wire is not the only triggering mechanism that can be used within the concept of the present invention.

Figure 23:
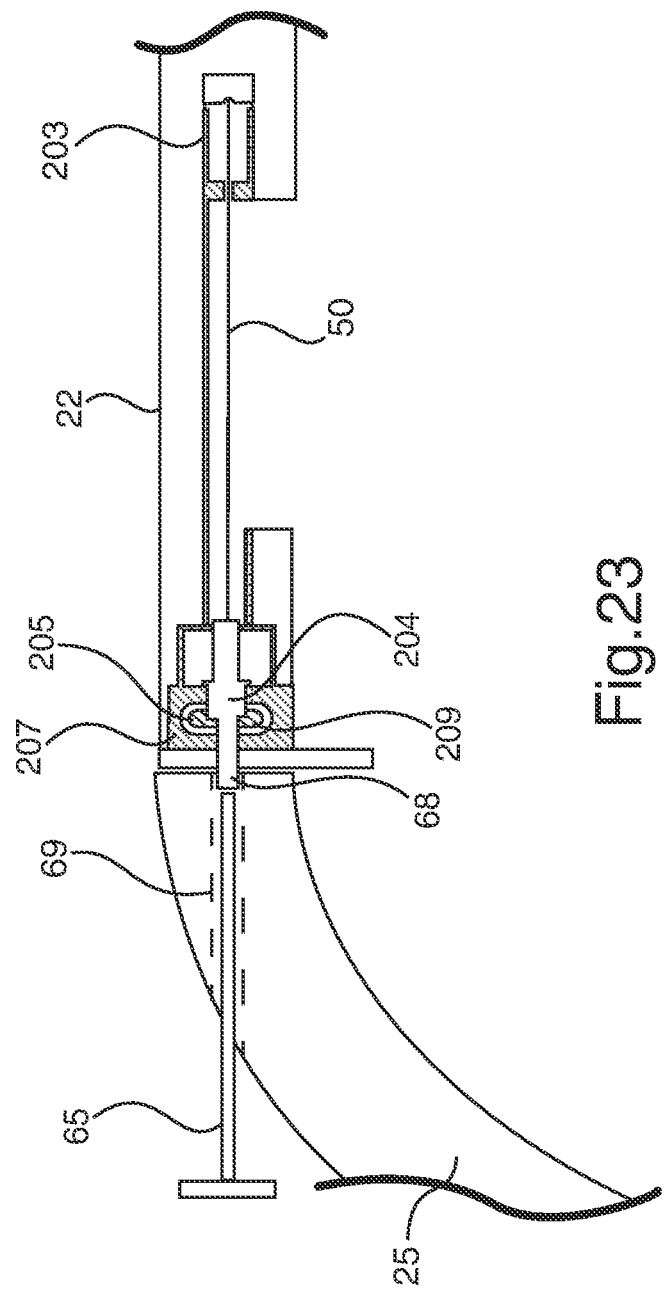
FIG. 23 is a side detailed view of a multi-trigger release system, including a physical plunger, and a temperature triggering mechanism.
Figure 24A:
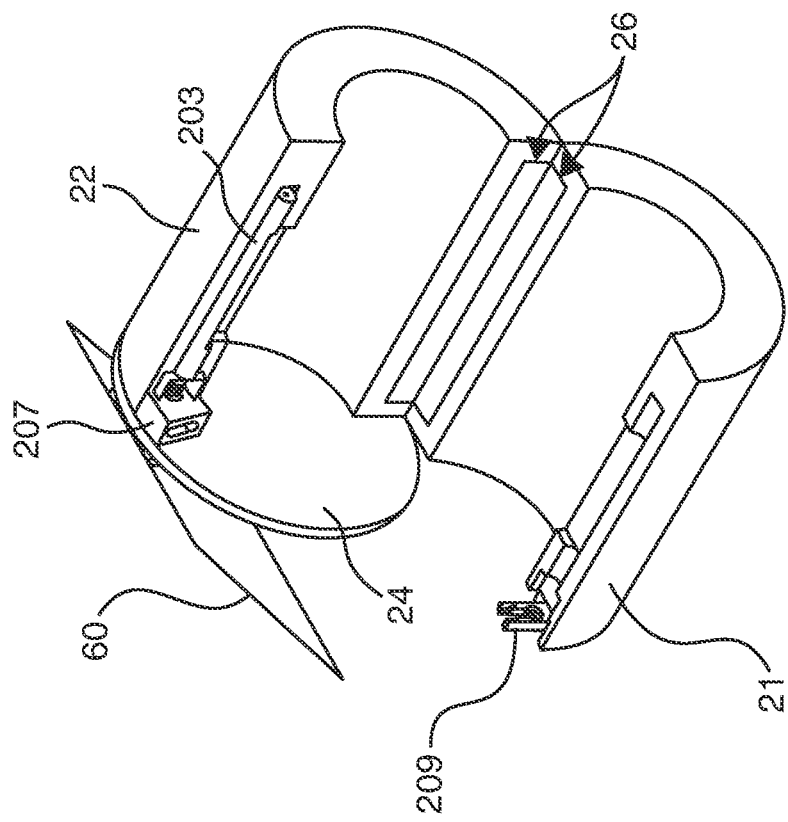
FIG. 24A is a side perspective view of an embodiment including multiple triggering mechanisms.
Figure 24B:
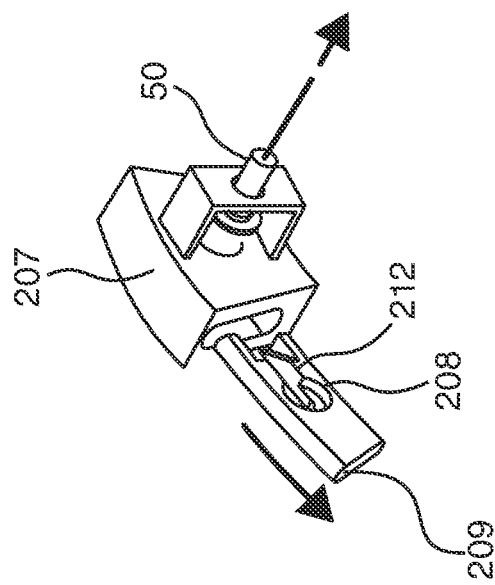
FIG. 24B is a perspective detailed view of a latch and release mechanism used with FIG. 24A.

An alternative triggering mechanism is depicted in FIG. 23. In this variation, a plunger 65 extending from the cone 25 of the pitot tube cover 1 can be pushed in order to dislocate a holding pin 68 and release the latch mechanism 209. While this particular variation can be operated by ground maintenance personnel for an easy manual release of the pitot tube cover 1, this variation also admits to automatic operation due to air pressure. An example of a sail 60, and its placement on the pitot tube cover 1, is depicted in FIG. 24A. The sail 60 is pivoted on the front of the pitot tube cover so that air pressure will cause it to rotate and push against plunger 65, dislodging holding piece 66 from latch receptacle 209.

Accordingly, the FIG. 23 embodiment uses both a manual plunger 65 (operated by maintenance personnel) and a temperature trigger, using Nitinol® wire 50 contained in removable capsule 203. The holding piece 66 is used with a locking pin 68. When the holding piece 204 is moved backwards by either a temperature increase (which shortens the stressed Nitinol® wire 50), or action of the plunger 65, the locking pin 68 is permitted to slide through a slot (such as 212 in FIG. 24B) as a latch receiver 209 is released and the two cylinder halves 21, 22 spring away from each other.

In FIGS. 24C and 24D, plunger 65 has been shortened to constitute little more than a locking pin. Sail 60 is installed instead of nosecone 25 on a hinge connector 64. Air pressure against sail 60 will force plunger 65 against holding piece 204, moving it backwards from holding channel 215, thereby allowing latch receiver 209 to slide freely away from retaining housing 207, releasing the two cylinder halves 21, 22 from each other. This release can be accomplished either through temperature conditions that shorten Nitinol® wire 50, or air pressure on sail 60.

It should be noted that any number of features of the multiple triggering arrangements described, and depicted, supra can be combined with each other as to be considered appropriate. This will allow the combination of features that best addresses the specific pitot tubes, aircraft, and other prevailing conditions in which a pitot tube cover could be used. For example, a Nitinol® wire triggering system can be used with any number of different latching arrangements, including a Nitinol® latching tongue, as depicted in FIGS. 10 and 12. A radio or position controlled triggering system, as depicted in FIG. 13, could also be used with the Nitinol® wire included in multiple embodiments described supra.

Figure 26A:
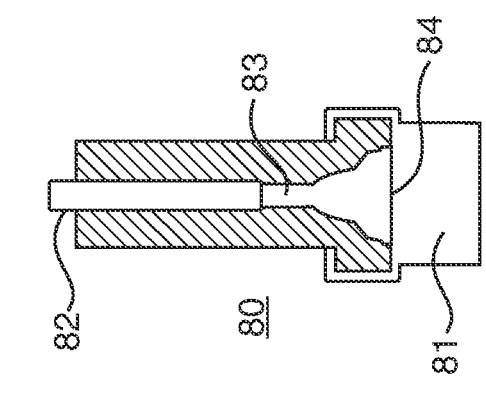
FIG. 26A is a side cross-sectional view of an expandable wax linear actuator in the triggered or extended position.
Figure 26B:
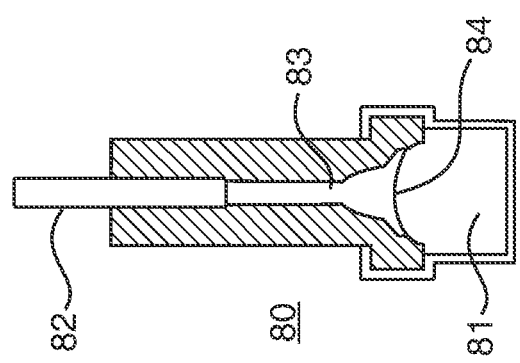
FIG. 26B is a side cross-sectional view of FIG. 26A in the normal or untriggered position.

The temperature triggering system is not limited to Nitinol® wire. Rather, a wide variety of temperature-triggered devices, mechanisms, and techniques can be used within the concept of the present invention. For example, rather than using Nitinol® wire, an expandable wax linear actuator 80, as depicted in FIGS. 26A and 26B, can be used. In the normal, low-temperature mode, as depicted in FIG. 26B, the piston is in the withdrawn position, and the wax in reservoir 81 compressed. As depicted in FIG. 26B, a piston 80 is supported by an anti-chafe disk, with a plug 83 underneath. The plug is separated from the expansion material by a diaphragm 84. When the actuator device is heated, the expansion material, preferably wax, forces the diaphragm 84 upwards, which forces the plug 83 to deform, as depicted in FIG. 26A, and pushed a piston 82 upwards.

Figure 27A:
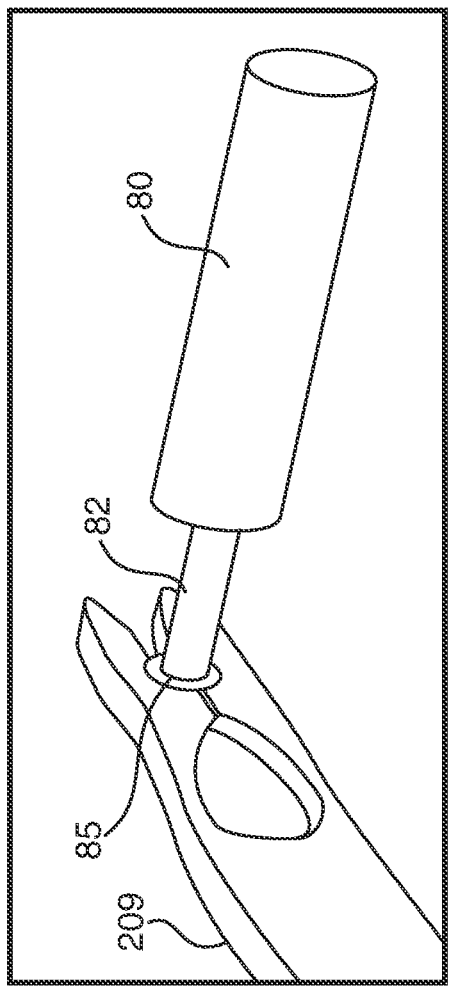
FIG. 27A is a side perspective view of the expandable wax piston of FIGS. 26A, 26B and in a position interfacing with a receptacle on a release mechanism.
Figure 27B:
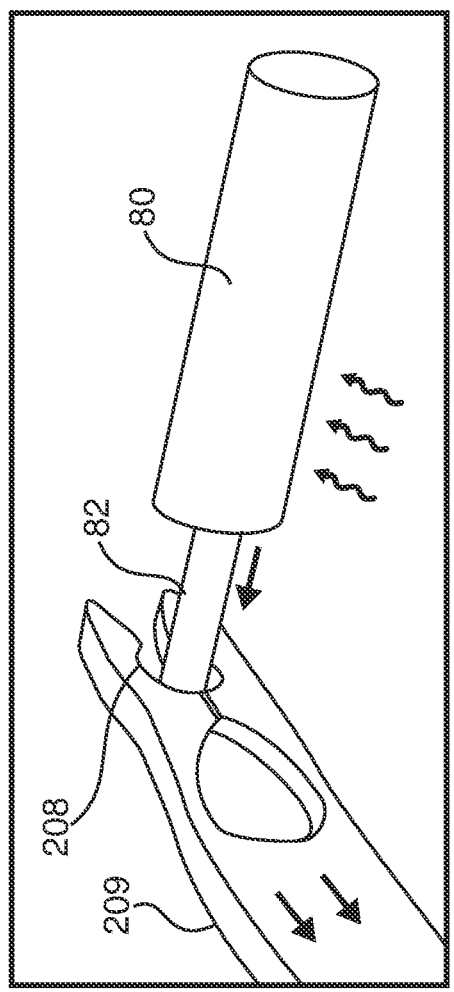
FIG. 27B is the arrangement of FIG. 27A in the extended or released position allowing the latch release mechanism to move.

FIGS. 27A and 27B depict the use of such an actuator with a holding device appropriate as a latch receiving structure 209. The head of the piston 80 is held in retaining aperture 208 during the normal, low-temperature mode, as depicted in FIG. 27A. Upon a temperature rise and the expansion of the wax, the piston is pushed forward and out of the retaining aperture 208, as depicted in FIG. 27B. Slot 218 provides a way by which the engagement component 209 can be released for from the piston, thereby allowing the two cylinder halves 21, 22 to separate.

Figure 25:
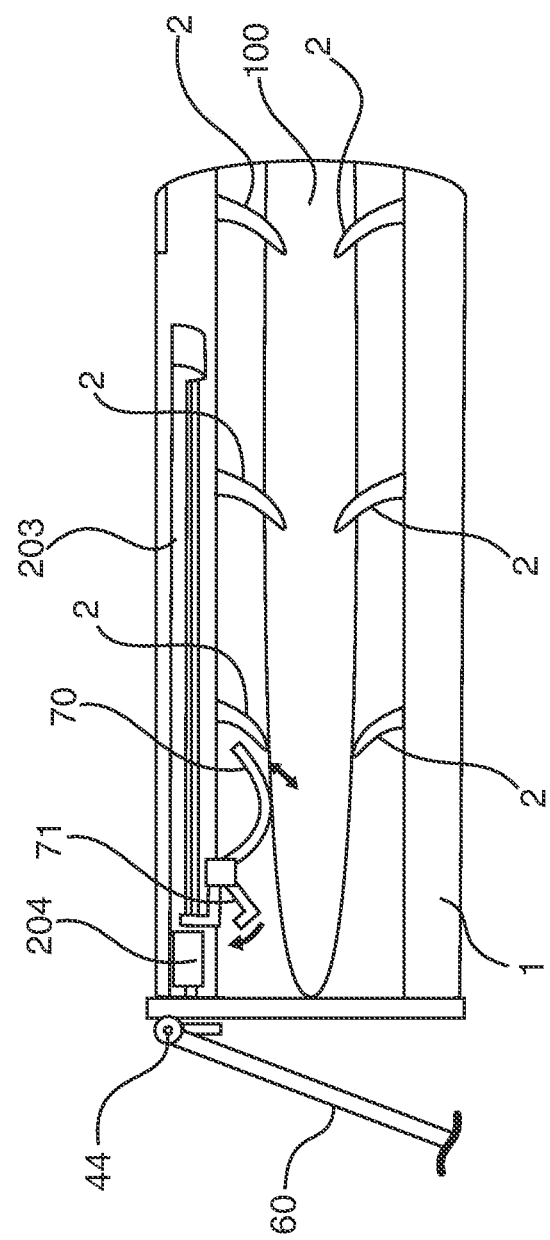
FIG. 25 is a side a detailed view of an interlock switch which can be used with the embodiments of FIGS. 13 and 24A-D.

Another attribute of the present invention is an interlock arrangement that does not permit activation of the unlatching function until a pitot tube 100 has been inserted into the pitot tube cover 1. This interlock switch 70 is depicted in FIG. 25, and includes a curved 70 blade configured to interact with an inserted pitot tube 100. The curved blade 70 is latched to a blocking structure 71 that does not permit backward movement of holding extension 204 from retaining channel 215. However, once pitot tube 100 is inserted, the curved blade is slid upwards releasing the latching mechanism, and allowing rearward movement of extension 204 upon shortening of the Nitinol® wire and/or air pressure on sail 60. The subject interlocking system can be used in any of the split cylinder arrangements described supra.

Figure 30:
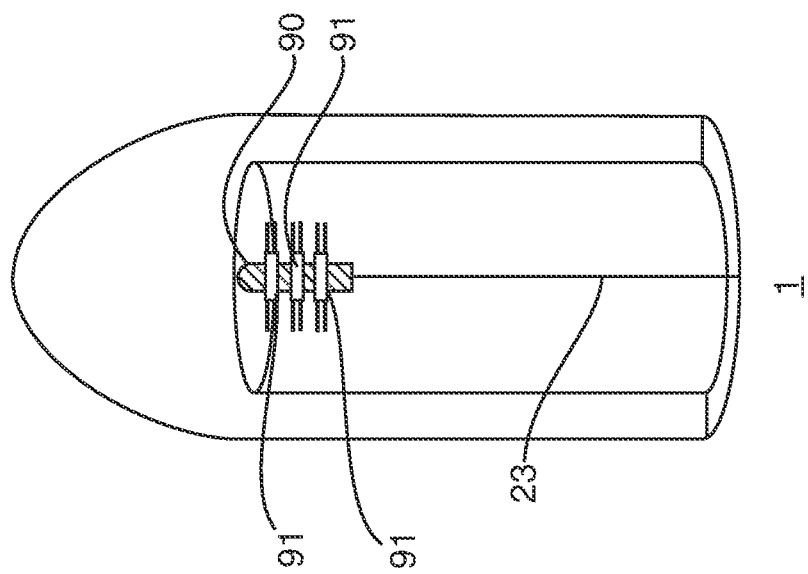
FIG. 30 is a top cutaway view of the interior of another embodiment of the present invention, using a thermal fuse held in clips on the opposing cylinder halves.
Figure 31:
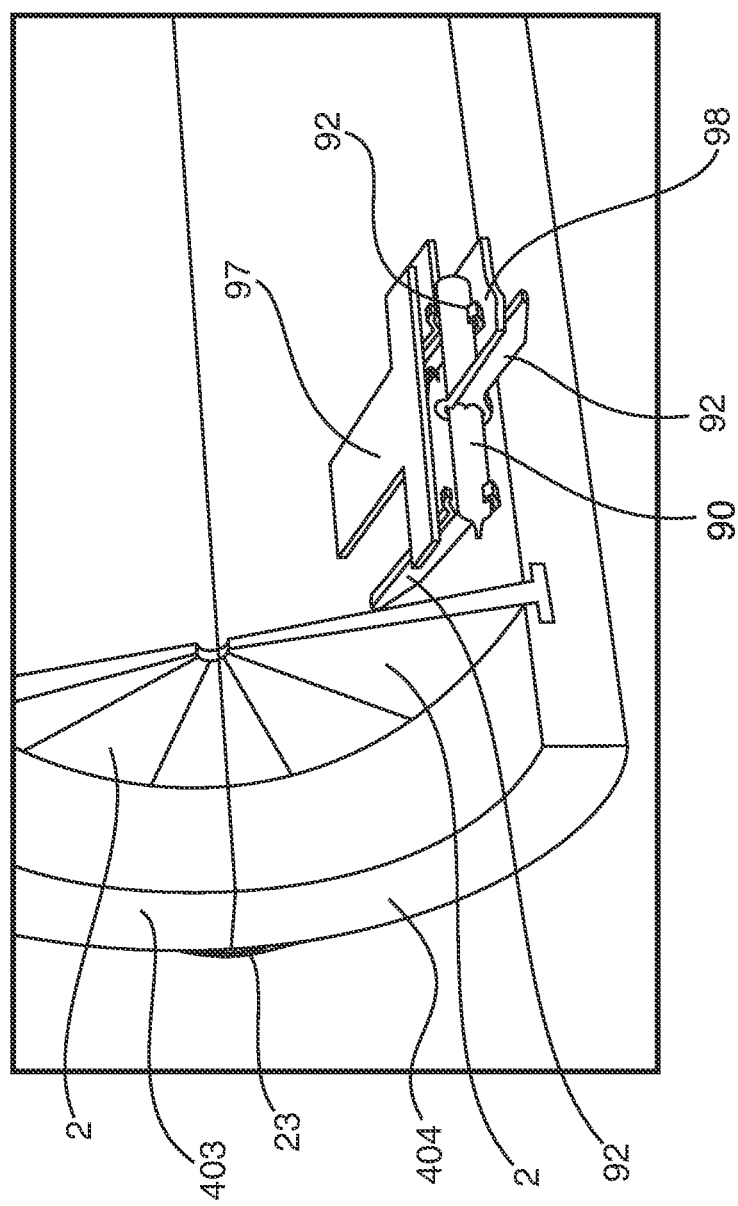
FIG. 31 is a detailed, cutaway perspective view of the interior of the arrangement of FIG. 30, focusing on the thermal fuse, its holders, and debris shields.

An alternative, and simplified, temperature detection and triggering system as depicted in FIG. 30. In this embodiment of the present invention, a temperature-sensitive fusible link, such as a thermal fuse 90 is held in clips 91 extending from each of split cylinders 21, 22. The thermal fuse 90 is designed to shatter at a predetermined temperature (caused by the heating of the pitot tube 100, not shown). Once thermal fuse 90 shatters, there is nothing holding clips 91 together, and the two cylinder halves 21, 22 will separate under the spring force attributed to various sources described supra.

The thermal fuse 90 can be provided by a JOB Thermo Bulb (Appendix A), a hermetically sealed liquid (G or F-type) in a glass bulb. The hermetically sealed liquid expands with rising temperature and breaks the bulb into small fragments at a predetermined release temperature, such as 135° F. The bone-shaped design of the Thermo Bulb (U.S. Pat. No. 4,796,710) provides the appropriate characteristics for operation in the inventive pitot tube cover 1.

One example of a JOB Thermo Bulb that will be appropriate for a general range of pitot tube covers is a 20 mm long bulb with a 4.97 mm diameter shaft and 5.32 mm diameter end bulbs. A major advantage of bulbs this size is that they can fit virtually anywhere in the split cylinder configurations of cover 1, and can be located so as to avoid interference with the arrangement of the split discs 2, or sections of silicon fibers 40.

The use of thermal fuses (such as the JOB Thermo Bulbs) provide a number of advantages not found with the other triggering and latching mechanisms discussed supra. For example, the thermal fuses are quite small, and can be placed in a wide variety of different locations and configurations (with regard to the split between adjacent edges of cylinder halves 21, 22). The thermal fuse can be placed along, or parallel to, the split between the cylinder halves 21, 22, as depicted in FIG. 30. In the alternative, they can be placed perpendicular to the splits as depicted in FIG. 29B. The location of thermal fuse across, or perpendicular to, the split facilitates a quick separation at the split while requiring only a very small footprint for the latching and release mechanism, both of which are constituted by the thermal fuse 90.

The small footprint of the latching and triggering mechanism constituted by the Thermo Bulb permits placement in a wide variety of locations, only a few examples of which are depicted in FIG. 29B.

The use of the thermal fuse 90 also facilitates an additional embodiment of the present invention, the bifurcation of one or both of the cylinder halves 21, 22. By bifurcating each of the cylinder halves 21, 22, and then allowing the bifurcated quarters to spread apart due to the operation of the thermal fuse holding the two quarters together, the pitot tube cover can be made to spread upon detection of a predetermined temperature so as to facilitate a clear separation between the pitot tube cover 1 and the pitot tube 100.

The cylinder quarters are connected to each other by way of living hinges 23. Spring action to drive the quarters (as well as the cylinder halves) apart can be provided using any of the techniques described supra. Simple clips 91 can be installed in a number of different locations so that maintenance personnel deploying the pitot tube covers 1 can select the trigger and latching points that are most appropriate for a particular pitot tube 100 and the cover to be used thereon. Thus, the configuration of the pitot tube cover, as it is released from the pitot tube, can be specifically designated by the user. It should be understood that the bifurcation of the cylinder halves 21, 22 into quarters also requires an additional split in each of the split discs 2. As a result, each of the split discs 2 receives an additional split in order to accommodate the bifurcation of each of the cylinder halves 21, 22.

Figure 28:
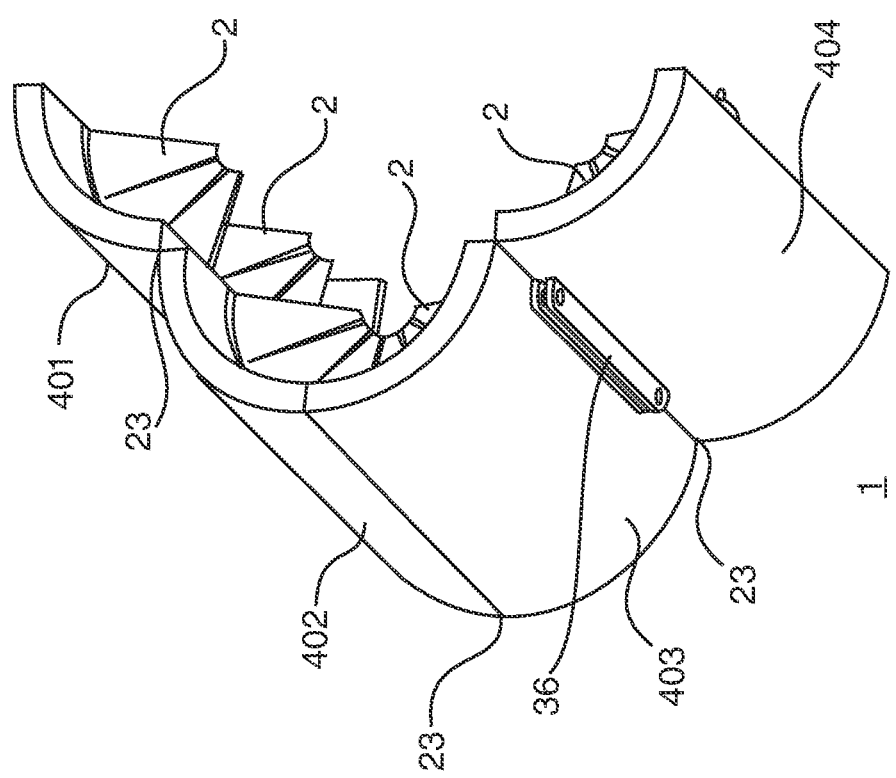
FIG. 28 is a side perspective view of an additional embodiment of the present invention in the open position where the cylinder halves are bifurcated with living hinges.

As depicted in FIG. 28, the bifurcation of the cylinder halves 21, 22 into quarters is preferably done in a configuration without a nosecone 25. As with the other embodiments described supra, any number of configurations of split discs 2 or silicon fibers 40 can be used with the bifurcated design of FIGS. 28 and 29. Preferably, all split discs 2, whether membrane or not, decrease in thickness from the edge to the center. Also, they are biased to the rearward to better direct the entry of the pitot tube 100.

Figure 29:
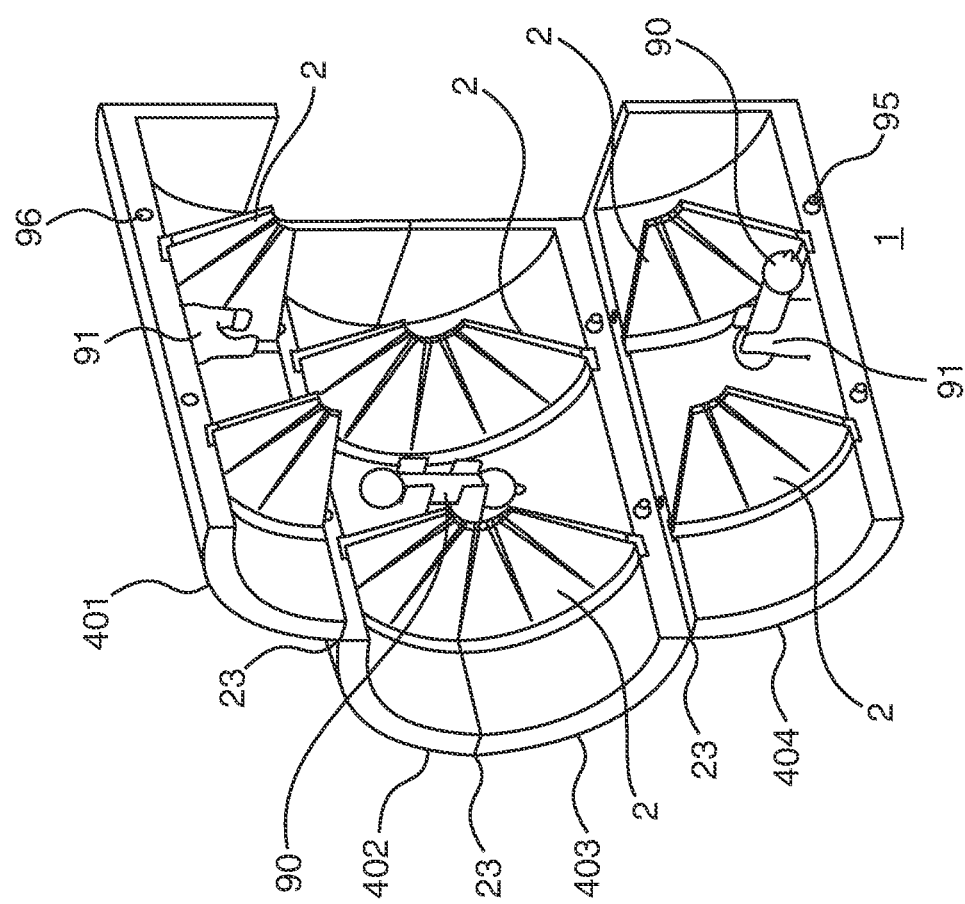
FIG. 29 is an opposite side perspective view of FIG. 28, depicting the interior of the open bifurcated cylinder halves.

FIG. 29 depicts only one potential arrangement for the present embodiment of the present invention. In this arrangement, there is only one split between quarters 401 and 404. Quarter 404 is attached to quarter 403 by means of living hinge 23, and quarter 401 is attached to quarter 402 by means of a living hinge 23. This arrangement will also permit a further unfolding of the entire cover 1 when the last fuse 90 between quarters 402, 403 separates. Then, quarters 402 and 403 will flex away from each other by means of living hinge 23 connecting them. Because the use of cylinder quarters, rather than cylinder halves, could lead to some instability, connecting studs 95 are use on each of the quarters. The connecting studs 95 mate with connecting apertures 96 to more stably hold the quarters (401, 402, 403, 404) together when the pitot tube cover 1 is placed on a pitot tube 100.

It should be noted that thermal fuses 90 of different temperature characteristics can be used at different places in the quartered pitot tube cover 1. In this way, the opening between two designated quarters (401, 402, 403, 404) along a particular set of adjacent edges can be effected while opening along another pair of adjacent edges is delayed or stopped altogether. In this manner, the sequence and configuration of the open pitot tube cover 1 can be determined beforehand based upon the pitot tube characteristics, as well as other environmental characteristics.

A major advantage of using a thermal fuse 90 with cylinder quarters (401, 402, 403, 404) is that upon activation of the thermal fuse, there is instantaneous, vigorous and complete opening of the pitot tube cover 1, and a rapid departure of the pitot tube cover 1 from the pitot tube 100. Because of this vigorous operation, such expedients as leaf springs (FIGS. 15A-C), and pre-loaded living hinges (FIG. 9) are not necessary. Further, usually, when the first bulb breaks, there is immediate, asymmetric weight distribution, of the open pitot tube cover 1 so that it rolls immediately away from the pitot tube 100. Only one of the plurality of thermal fuses 90 will ignite, causing the asymmetrical weight distribution and immediate separation of the pitot tube cover 1 for the pitot tube 100. This is because the chances of simultaneous activation of multiple thermal fuses is extremely small. Further, once activation of one thermal fuse occurs, the opening or separation of a set of adjacent edges will cause immediate cooling of the other thermal fuses. The activation of a second bulb is unlikely. However, it is included in the overall design for purposes of redundancy.

Because there can be gas and other debris when the thermal bulbs shatter at the predetermined temperature, additional precautions to protect the integrity of the pitot tube 100 are expedient. The precautions are in the form of an upper debris shield 97 and a lower debris shield 98. These debris shields are used for thermal fuse 90 that is arranged parallel to the split between cylinder quarters (401, 402, 403, 404). There are three clips 91 holding thermal fuse 90 from either side. These clips 91 are preferably made of the same temperature-resistant material used in other parts of the pitot tube cover 1.

It should be noted that upon thermal fuse 90 breakage, there is no expansion of gases, and therefore no significant increase in the volume of the gaseous environment within the pitot tube cover. Consequently, there is no risk of a sudden pressure rise entering the pitot tube and effecting the aircraft instrumentation. Consequently, this approach to temperature triggering of pitot tube cover removal is not detrimental to the pitot tube 100, or any instrumentation associated therewith. Any debris from the breaking glass is shielded from the pitot tube tip 101 by debris shields 97, 98.

An additional embodiment of the present invention exhibits a number of characteristics facilitating greater usefulness to particular applications of this technology. This embodiment is depicted in FIGS. 32, 33A-33C and 34A-34B. This particular embodiment is also depicted in drawings and photographs contained in Appendix B. As is described below, this embodiment is a substantial refinement on previous designs presented in FIGS. 1-31.

Figure 32:
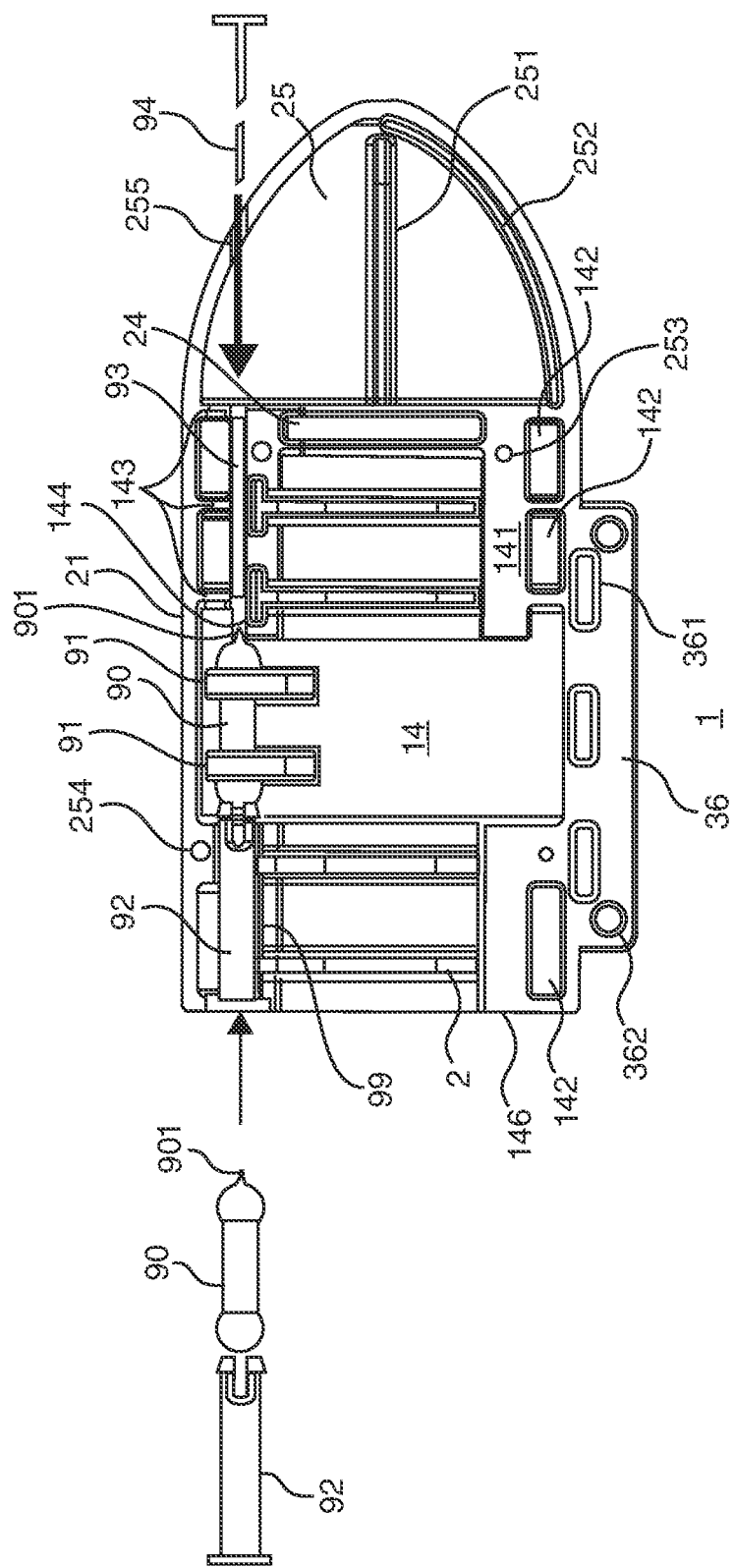
FIG. 32 is a side sectional view of an additional embodiment of the present invention.

FIG. 32 is a sectional side view that best depicts this particular embodiment. The pitot tube cover 1 is split into two virtually identical halves 21, 22. This includes a split in nosecone 25 so that butt plate 24 is also split. The two halves 21, 22, as described with respect to FIG. 34. Thermal bulb 90 and insertion/holding pin 92 in both the unlocked and the locked positions. Thermal bulb 90 has an extended nose 901 which fits into channel 144 inside pitot tube cover 1 when the thermal bulb 90 is in the locked position. In this position, the thermal bulb 90 is held by two holding fingers 91 from each side of halves 21, 22 of the pitot tube cover 1.

A key attribute of this embodiment is that only a single thermal bulb 90 is needed, both as a locking mechanism and a fusing mechanism to allow separation of the two pitot tube cover halves 21, 22. The insertion/holding pin 92 serves to place the thermal bulb 90 in the correct position within the pitot tube cover 1, with the extended nose 901 in channel 144. The insertion pin seals the overall structure when the pitot tube 100 is inserted in pitot tube cover 1.

The end of channel 93 opposite extended nose 901 is aperture 255 in the in nosecone 25. This aperture can be sealed by a push wire 94, which can also be used to extract both thermal bulb 90 and insertion/holding pen 92, if necessary. Thermal bulb 90 serves as both a fuse and a connector as depicted in FIGS. 32 and 34. This device is described in Appendix A, attached hereto, and describes a commercially available configuration that will serve the present embodiment of the pitot tube cover 1. Insertion/holding pin 92 can readily be adapted to any particular thermal bulb configuration, and can be sized to seal the aperture through which the thermal bulb 90 and insertion pin 92 are placed.

It should be noted that Woods Metal, also known as Lipowitz's alloy (having such commercial names as Cerrobend, and MCP 158), can be used instead of thermal bulb 90. A configuration to be used as a both a fuse and a locking pin, can be fashioned from such materials, sized and fitted to be placed in the pitot tube cover 1 instead of thermal bulb 90. Woods Metal or any other eutectic, fusible alloy with an appropriate melting point can be used as both the fuse and the locking piece, instead of thermal bulb 90.

While thermal bulb 90 and holding fingers 91 secure one (upper) end of the two halves 21, 22, another arrangement is used to secure the opposite (lower) end of the two halves 21, 22. This arrangement appears to be similar to that of FIGS. 18A, 18B. However, there is a substantial distinction between those figures and the arrangement found in FIGS. 32, 33A-33D and 34B. In particular, the present embodiment includes a flange 36, which is integral with half 21 of the pitot tube cover 1. This phalange contains apertures 361 to accommodate hook 554. When a hook is inserted into the aperture slot 361, it secures the two halves together at the side opposite that of the thermal fuse. It has been found that the best level of security is obtained by using three slots 361 and three complementary hooks 554.

The thermal bulb 90 (or other fusible alternative) is placed in thermal chamber 14 with nothing between the thermal bulb and the heat of the pitot tube 100 (not shown). This permits more precise reactions to the actual temperature of the pitot tube 100, in order to effect more timely separation of the pitot tube cover 1 from the pitot tube.

The splitting of the entire pitot tube cover 1 into two separate halves 21, 22 better ensures the absence of possible sticking points, such as the butt plate 24. The splitting of butt plate 24, as well as the entirety of nosecone 25, helps ensure the separation of the pitot tube cover 1 from all parts of the pitot tube 100. Because the nosecone 25 is split, additional structural elements are needed. This includes a nosecone stringer 251 to provide additional support for permitting the nosecone to be divided in half for easy separation. Also included is alignment flange 252, which allows the two halves of the nosecone 25 to easily be put together when locking the two halves 21, 22 of the pitot tube cover together. To further facilitate the connection of the two halves 21, 22, both structures include alignment nubs 253, and complementary alignment nub depressions 254.

To facilitate rugged construction, the interior of the two halves 21, 22 are provided with bulkheads 141 for holding the split silicon discs to the solid bulkheads 141 contain hollow spaces 142 to maintain the preferred balance of rigidity to the overall weight of the pitot tube cover 1. Outer bulkheads, surrounding hollow spaces 142, are also provided to provide the necessary rigidity on the two halves 21, 22 opposite flange 36.

Figure 33A:
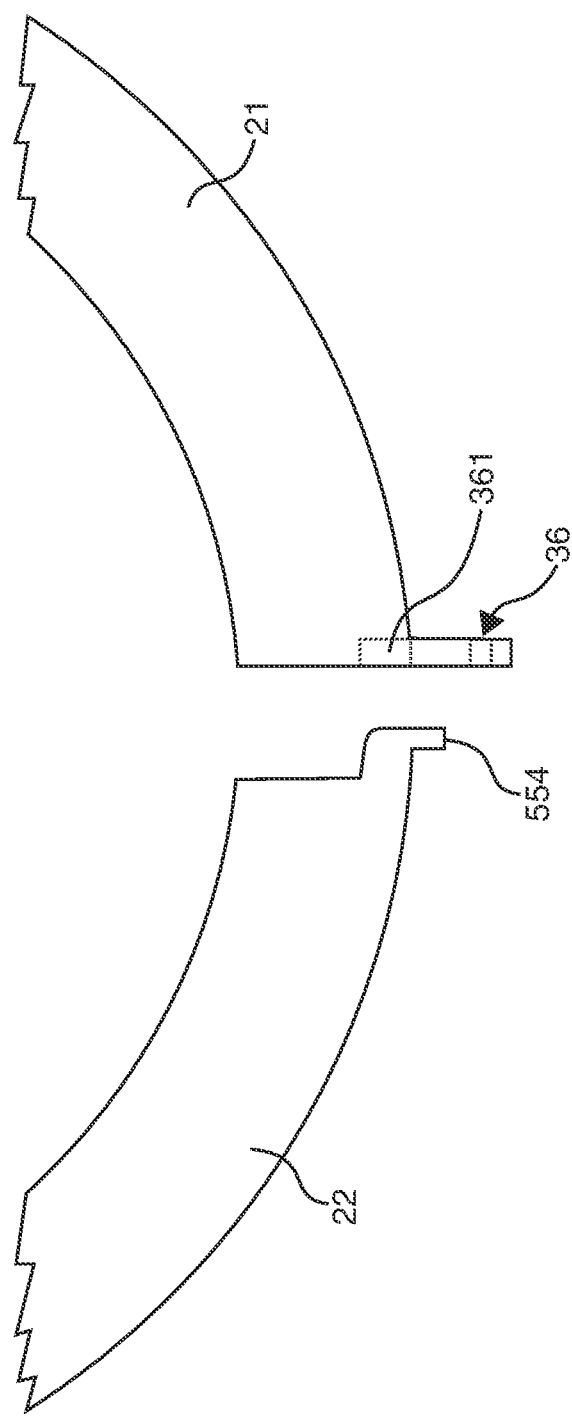
Figure 33C:
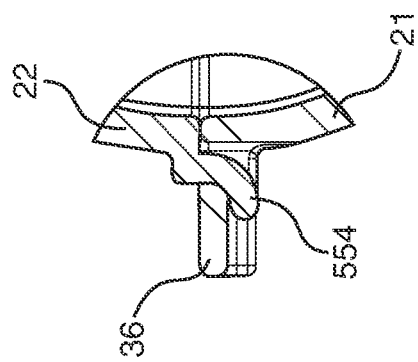
Figure 34A:
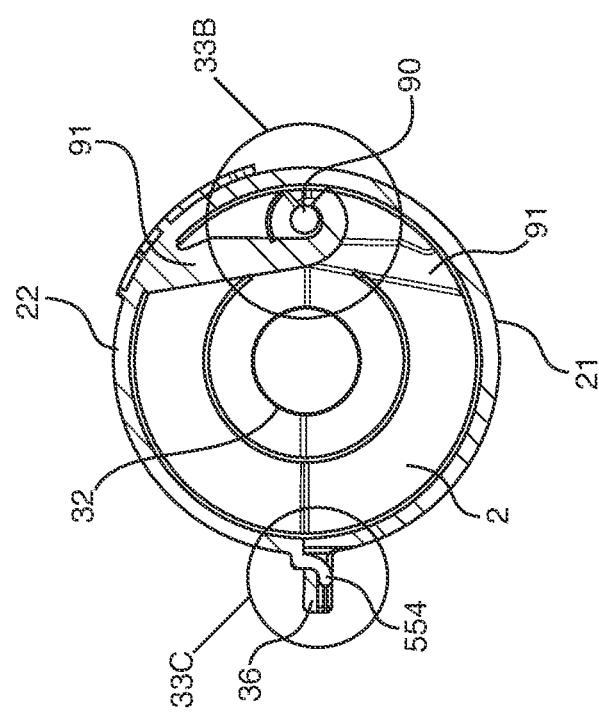
FIGS. 34A-34B are an end cross-sectional views of the Figure of 32 embodiment, depicting the upper and lower connection mechanisms.
Figure 34B:
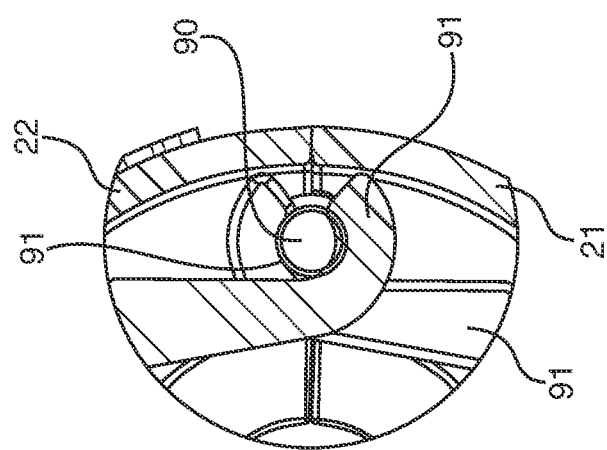

The overall stability of pitot tube cover 1, including the capability of properly holding to the pitot tube 100 in a stable manner is provided by the use of for split silicon discs. Each of these is sufficiently thick to provide a good grip on the pitot tube while still being prolapsed by the insertion of the tube into the aperture 32 of each of the disc when the two halves are placed together. Further, the four discs provide sufficient spring action so that when the thermal bulb 90 is shattered, the two halves 21, 22 of the pitot tube cover 1 spring apart. Upon loosening of the upper connection arrangement by bursting thermal bulb 90, the spring action of the four split silicon discs 2 force the two halves 21, 22 apart. Because of the rotational effect, driving the two halves 21, 22 apart at the top connection point (where the thermal bulb 90 previously held the two halves together), the lower connection, as depicted in FIGS. 33A-33C rotates away from each other facilitating the disconnection of hook 554 from slot 361 in flange 36. Once the hook 554 is rotated out of the slot 361, the two halves 22, 21 easily separate, even with the depicted three hooks 554 and flange slots 361.

It is noted that flange 36 extends along a substantial portion of half 21. Multiple apertures 362 in the flange permit a solid connection with the required safety streamers, which can be connected using split ring arrangements. Since flange 36 is part of the integral wall structure of half 21, the apertures or slots 361 can be formed at least partially in the wall of half 21. This provides substantial stability for the lower connection. As a result, flange 36 is not compromised, so that it is still capable of withstanding the stresses of the required RFB streamer or banner, even under the stresses induced by airspeed.

Push wire 94 can be configured so as to fit around extended nose 901 to better control it when pushing thermal bulb 90 from its position between the holding fingers 91. Further, the push wire 94 can be configured so as to entirely plug aperture 255 in nose cone 25. Again, in another variation based upon this particular embodiment, access hole 255 can be entirely sealed, and the push wire 94 can be eliminated.

It should be understood that the configuration of bulkheads 141, 146 can be arranged in a variety of different manners within the concept of invention. For example, modification is slot 144 to accommodate the rims 39 of split discs 2. This is one example of a modification that can be made in the bulkheads (141,146) and hollows (142) configuration within the concept of the present invention. Further examples are found in the photographs of Appendix B.

The subject embodiment also includes a process for preparing the pitot tube cover 1 for application to a pitot tube 100. Firstly, the two halves 21, 22 are connected together at the lower connection points between hooks 554 and slots 361 in flange 36. This is done easily by inserting the hooks and then rotating the two halves together. Connection between the two halves 21, 22 is facilitated by alignment nubs 253 and alignment nub depressions 254. Alignment is further facilitated using alignment flange 252. All of these structures allow the two halves 21, 22 to be precisely fitted to each other. With the two halves 21, 22 fitted closer together, it is possible to use insertion pin to guide thermal bulb 90 into channel 99 and into position between the holding clips or fingers 91, as depicted in FIG. 32. The extended nose 901 is pushed into channel 93, which stops further movement of thermal bulb 90 within thermal chamber 14. The interaction between thermal bulb 90 and the holding fingers 91 hold the two halves 21, 22 together at this point, sealing the pitot tube cover 1. Final sealing is accomplished by the insertion tool 92, which blocks the entry to channel 95.

Low-density polyethylene foam is only one material that can be used for the present invention. While low density foam is often preferred for applications where the pitot tube cover is removed by air pressure, high density foam is more appropriate when the triggering and release mechanism is heat-based. Accordingly, cross-linked polyethylene (XLPE) is highly appropriate for the present invention.

However, the best materials found for most temperature-triggered applications is ethylene vinyl acetate (EVA) foam. This is a hard, high-density product, which is particularly appropriate in high temperature conditions. Further, EVA has better elastic properties than XLPE foam. Like all higher density materials, the EVA foam retains heat longer than low-density foam, and so that low density foam may be preferred when there is a chance of a loose pitot cover 1, or parts thereof, being drawn into a turbo fan. 1.

Accordingly, the present invention can be made of any appropriate material (such as printed polymer plastic), or combinations of materials, that are considered best suited for a particular pitot tube, vehicle, cover configuration or environment.

The thickness of the shell of the pitot tube cover 1 is arranged so that the aforementioned mirror aperture to accommodate the fusible link can be accommodated. The thickness of the shell will accommodate additional apertures so that additional structures can be accommodated by the shell of the pitot tube cover.

Figure 35:
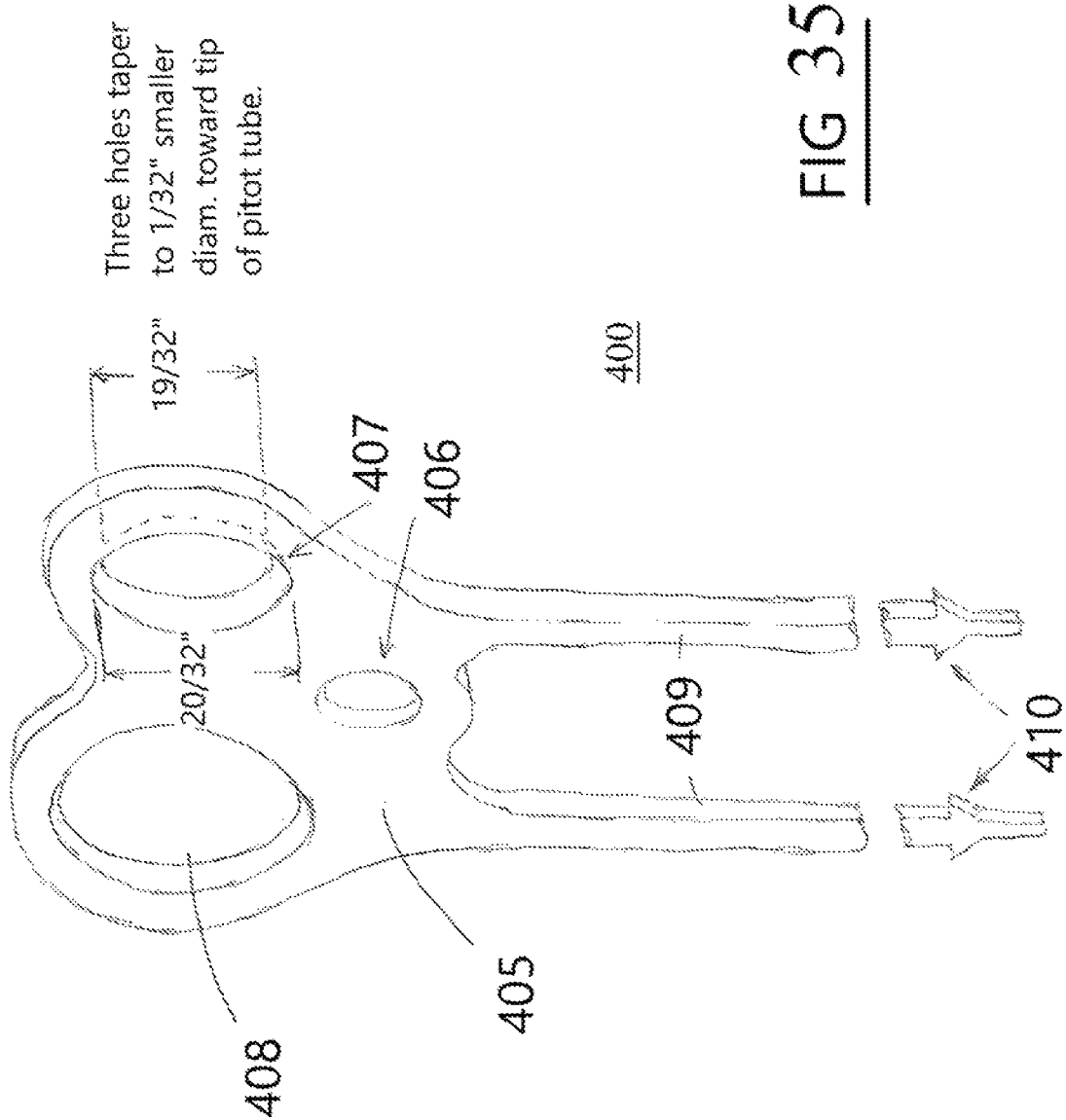
FIG. 35 is a perspective topographical view of the subject bridle.

FIG. 35 illustrates a retaining bridle 405. It is made from hi-temperature aircraft-spec silicone elastomer sheet, with three different size holes 406, 407, 408 allowing for a universal, one-size-fits-all part. Two arms 409 with securing barbs 410 are attached through holes 411 in the back of each pitot tube cover body half 1. It is noted that the holes 406, 407, 408 are tapered through the silicone sheet. This facilitates the "walking" back away from the tip of the pitot tube 1 if the ejected pitot cover halves 1 are disturbed while hanging from the pitot tube 100, thus preventing the separated assembly from falling off the end of the pitot tube 100.

Figure 36:
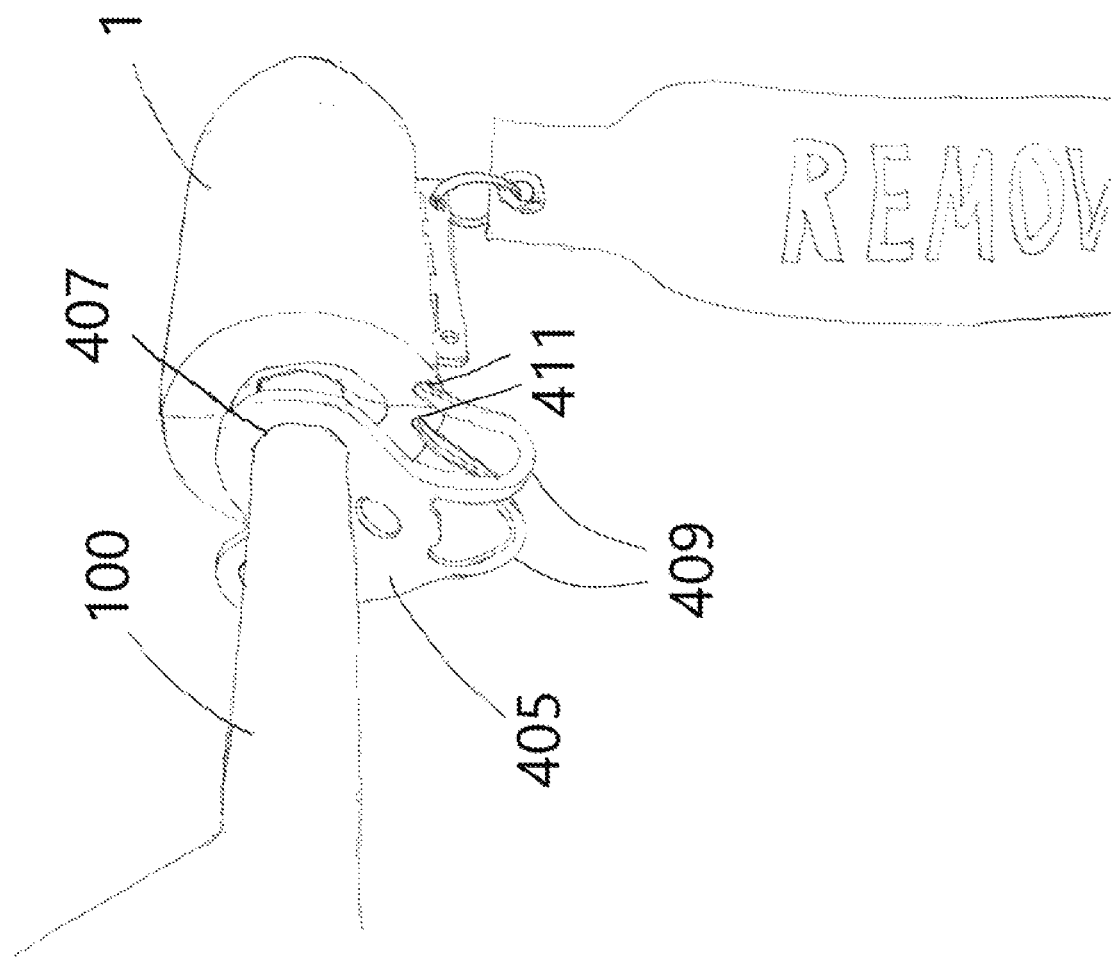
FIG. 36 is a perspective view of the subject bridle in the deployed configuration with the pitot tube cover on the pitot tube.

FIG. 36 illustrates how the retaining bridle 405 is placed with the pitot tube 1 through the appropriate-sized hole 407. By placing the retaining bridle 405 such that the arms 409 are not crossed, it is assured that the taper is positioned to keep the bridle 409 from "walking" off the pitot tube 100 tip.

Figure 37:
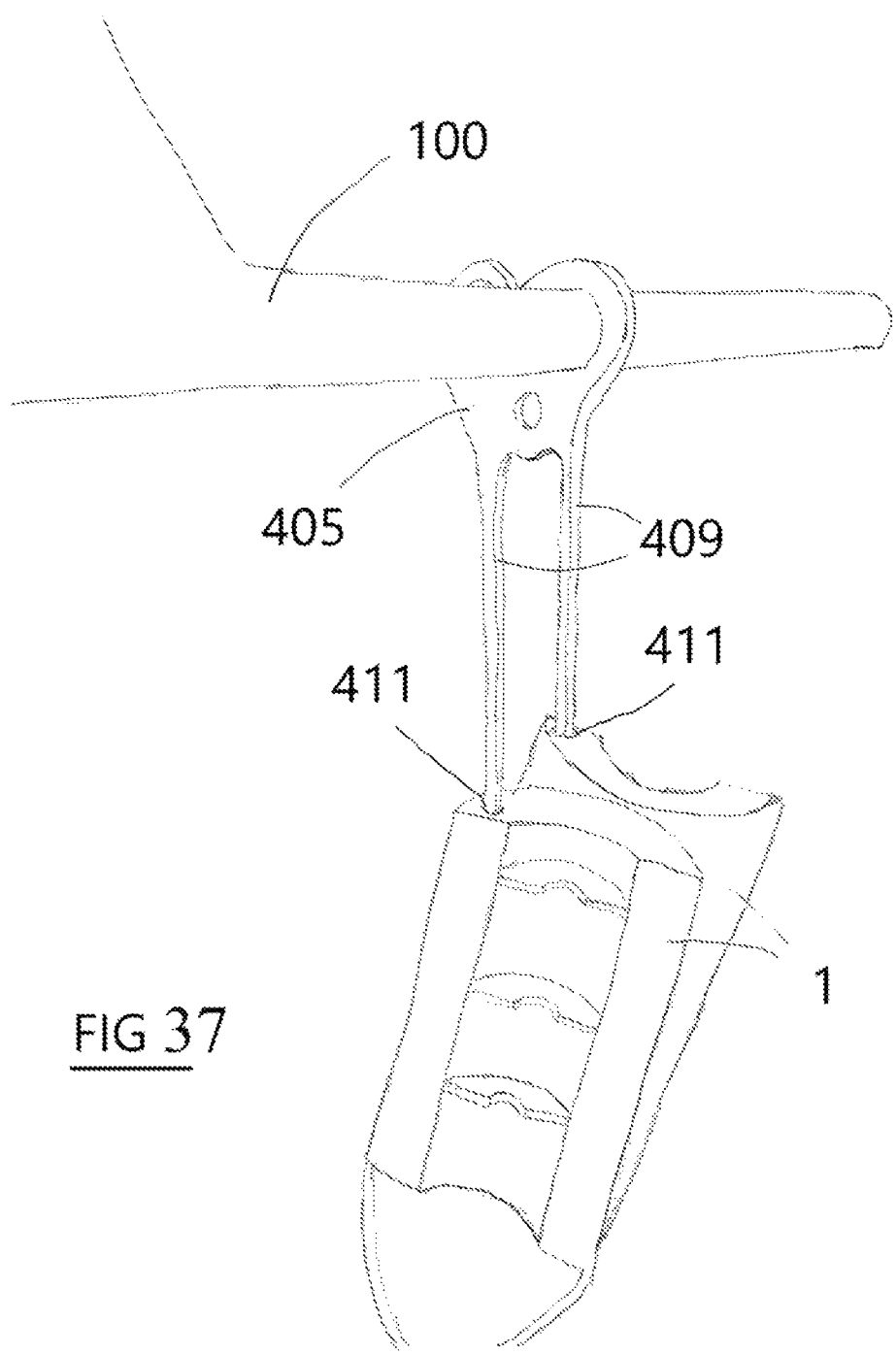
FIG. 37 is a perspective view of the subject bridle holding a separated pitot tube cover to the pitot tube.

FIG. 37 illustrates the components of the pitot cover hanging from the pitot tube 100 after a thermal-ejection.

It should be understood that while apertures 411 are part of the preferred embodiment of the present invention, other means can be used for connecting the bridle 400 to the pitot tube cover 1. Any method that will allow the extended ends of the bridle 410 to be attached to the pitot tube cover 1 in a manner that will allow the pitot tube cover to disengage from the pitot tube, while still being held to either the pitot tube or another part of the vehicle, is appropriate under the concept of the present invention.

While the pitot tube cover of U.S. Pat. No. 11,480,586 is depicted in the drawings, other pitot tube covers can be used with the bridle 405 of the present invention. It should be noted that the retaining bridal 405 can be used with any of the other pitot tube covers depicted in any of FIGS. 1-34. The retaining bridal 405 can be used even if the pitot tube cover does not split into two halves. In such a circumstance, only a single connection to the pitot tube cover 1 would be necessary. While the present invention is best made with a heat-resistant silicon material, other materials can be used, if appropriate for the thermodynamic cycles of the pitot tube cover environment.

The present invention should be construed to include any and all variations, modifications, adaptations, derivations and embodiments that would occur to one skilled in the in the technology of pitot tube covers. Further, the present invention should be limited only by the following claims.

The invention claimed is:

1. A self-disengaging pitot tube cover for a pitot tube, comprising:
   at least two cover sections releasably joined along at least two longitudinal edges, the at least two cover sections defining an outer shell around an internal space for receiving a pitot tube; a latching mechanism configured to releasably hold the at least two cover sections together; and
   a plurality of suspension structures coupled within the internal space and configured to receive the pitot tube, suspend the at least two cover sections over the pitot tube, and prevent the pitot tube from contacting the at least two cover sections.

2. The self-disengaging pitot tube cover of claim 1, wherein:
   the plurality of suspension structures are flexible and each define a bore for receiving the pitot tube therethrough; and
   the bore of at least one of the plurality of suspension structures has a diameter smaller than an outer diameter of the pitot tube such that the at least one of the plurality of suspension structures flexes to enlarge the bore upon entry of the pitot tube; and
   whereby the flexing of the at least one of the plurality of suspension structures provides resistance to unintended removal and aids in self-disengaging upon release of the latching mechanism.

3. The self-disengaging pitot tube cover of claim 2, wherein at least one of the plurality of suspension structures is formed from high temperature silicone.

4. The self-disengaging pitot tube cover of claim 1, wherein at least one of the plurality of suspension structures forms a seal around an outer surface of the pitot tube to prevent contamination of a tip of the pitot tube.

5. The self-disengaging pitot tube cover of claim 1, wherein the latching mechanism includes a thermal actuator responsive to and actuated by heat from the pitot tube.

6. The self-disengaging pitot tube cover of claim 5, wherein at least two of the plurality of suspension structures and a portion of the outer shell form a thermal chamber for isolating the heat from the pitot tube with the thermal actuator.

7. The self-disengaging pitot tube cover of claim 5, wherein the thermal actuator is a thermal reactive glass bulb.

8. The self-disengaging pitot tube cover of claim 5, wherein the thermal actuator is positioned between holding members coupled to adjacent ones of the at least two cover sections, thereby releasable joining the at least two cover sections.

9. The self-disengaging pitot tube cover of claim 5, further comprising a retaining pin for inserting and retaining the thermal actuator within a channel defined by the at least two cover sections.

10. The self-disengaging pitot tube cover of claim 5, wherein the thermal actuator includes a wax that expands upon heating from the pitot tube, thereby activating release of the at least two cover sections.

11. The self-disengaging pitot tube cover of claim 1, wherein the latching mechanism includes a sail operatable to activate release of the at least two cover sections upon movement of the sail in response to applied air pressure.

12. The self-disengaging pitot tube cover of claim 1, further comprising a coupling structure joining the at least two cover sections along at least two other longitudinal edges.

13. The self-disengaging pitot tube cover of claim 12, wherein the coupling structure comprises releasably interlocking members.

14. The self-disengaging pitot tube cover of claim 13, wherein the releasably interlocking members include a cooperating hook and slot.

15. The self-disengaging pitot tube cover of claim 12, wherein the coupling structure comprises a hinge.

16. The self-disengaging pitot tube cover of claim 1, further comprising a plate coupled within the internal space, the plate configured for sealing contact with a tip of the pitot tube to thereby prevent contamination of the tip.

17. The self-disengaging pitot tube cover of claim 16, wherein the plate is formed from a low-friction, high-temperature material.

18. The self-disengaging pitot tube cover of claim 17, wherein the plate is formed from polytetrafluoroethylene.

19. The self-disengaging pitot tube cover of claim 1, wherein the at least two cover sections are formed from a polymer.

20. The self-disengaging pitot tube cover of claim 1, further comprising:
   a battery; and
   a temperature sensor; and
   wherein the latching mechanism includes a shape-memory alloy activated for release by at least the battery and the temperature sensor.

21. The self-disengaging pitot tube cover of claim 1, further comprising:
   a sensor; and
   wherein the latching mechanism is activated for release by at least the sensor.

22. The self-disengaging pitot tube cover of claim 21, wherein the sensor includes a GPS receiver module and is configured to release the latching mechanism when a predetermined speed is reached.

23. The self-disengaging pitot tube cover of claim 1, further comprising a transceiver configured for remote monitoring of the pitot tube cover and for remote control of the latching mechanism.

\* \* \* \* \*